US008622308B1

(12) United States Patent  (10) Patent No.: US 8,622,308 B1
Field et al.  (45) Date of Patent: *Jan. 7, 2014

(54) SYSTEM AND METHOD FOR PROCESSING TRANSACTIONS USING A MULTI-ACCOUNT TRANSACTIONS DEVICE

(75) Inventors: Manning R. Field, Media, PA (US); Walter Brent Reinhard, Lansdale, PA (US); Marcia Keld, Middletown, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 482 days.

This patent is subject to a terminal disclaimer.

(21) Appl. No.: 12/350,015

(22) Filed: Jan. 7, 2009

Related U.S. Application Data

(63) Continuation-in-part of application No. 11/968,018, filed on Dec. 31, 2007, now Pat. No. 7,766,244.

(60) Provisional application No. 61/006,408, filed on Jan. 11, 2008.

(51) Int. Cl.
*G06K 19/06* (2006.01)

(52) U.S. Cl.
USPC ............ 235/492; 235/379; 235/380; 235/487

(58) Field of Classification Search
USPC ............ 235/492, 487, 493, 379, 380; 705/35, 705/39
See application file for complete search history.

(56) References Cited

U.S. PATENT DOCUMENTS

| | | |
|---|---|---|
| 1,985,592 A | 2/1933 | Woodward et al. |
| 2,005,003 A | 6/1935 | Patton et al. |

(Continued)

FOREIGN PATENT DOCUMENTS

| | | |
|---|---|---|
| EP | 421808 | 4/1991 |
| EP | 0665486 | 8/1995 |

(Continued)

OTHER PUBLICATIONS

ABA Banking Journal, The Payment System Gets a New Image, Mar. 1990 acs01038997.

(Continued)

*Primary Examiner* — Michael G Lee
*Assistant Examiner* — Tabitha Chedekel
(74) *Attorney, Agent, or Firm* — Hunton & Williams LLP

(57) ABSTRACT

Various account transaction devices are disclosed. One account transaction device comprises a top portion having a front side and a back side, wherein the front side includes a first account and the back side includes at least one identifier associated with a second account. The device also comprises a bottom portion having a front side and a back side, wherein the front side includes the second account and the back side includes at least one identifier associated with the first account. Also, a hinge connecting the top portion to the bottom portion, wherein the top and second portions are relatively movable between a first closed position where the top portion displays the first account and the bottom portion displays the at least one identifier associated with the first account and a second closed position where the top portion displays the at least one identifier associated with the second account and the bottom portion displays the second account. The customer may selectively determine whether a transaction is to be posted to the first account or the second account at the point of sale, after the transaction, or based upon predetermined rules or selections. Other account transaction devices are disclosed.

20 Claims, 25 Drawing Sheets

(56) References Cited

U.S. PATENT DOCUMENTS

| | | |
|---|---|---|
| 3,653,480 A | 4/1972 | Yamamoto et al. |
| 3,713,235 A | 1/1973 | Roberts |
| 3,938,090 A | 2/1976 | Borison et al. |
| 4,050,375 A | 9/1977 | Orlens |
| D248,203 S | 6/1978 | Morse |
| 4,141,078 A | 2/1979 | Bridges et al. |
| 4,205,780 A | 6/1980 | Burns et al. |
| 4,223,403 A | 9/1980 | Konheim et al. |
| 4,264,808 A | 4/1981 | Owens et al. |
| 4,319,336 A | 3/1982 | Anderson et al. |
| 4,321,672 A | 3/1982 | Braun et al. |
| 4,385,285 A | 5/1983 | Horst et al. |
| 4,396,985 A | 8/1983 | Ohara |
| 4,443,027 A | 4/1984 | McNeely et al. |
| 4,453,074 A | 6/1984 | Weinstein |
| 4,454,414 A | 6/1984 | Benton |
| RE31,692 E | 10/1984 | Tyburski et al. |
| 4,495,018 A | 1/1985 | Vohrer |
| 4,575,621 A | 3/1986 | Dreifus |
| 4,605,820 A | 8/1986 | Campbell, Jr. |
| 4,605,844 A | 8/1986 | Haggan |
| 4,614,861 A | 9/1986 | Pavlov et al. |
| 4,617,457 A | 10/1986 | Myers |
| 4,641,239 A | 2/1987 | Takesako |
| 4,650,981 A | 3/1987 | Foletta |
| 4,661,658 A | 4/1987 | Matyas |
| 4,669,730 A | 6/1987 | Small |
| 4,672,377 A | 6/1987 | Murphy |
| 4,694,397 A | 9/1987 | Grant et al. |
| 4,697,072 A | 9/1987 | Kawana |
| 4,700,055 A | 10/1987 | Kashkashian, Jr. |
| 4,701,601 A | 10/1987 | Francini et al. |
| 4,713,760 A | 12/1987 | Yamada et al. |
| 4,713,761 A | 12/1987 | Sharpe et al. |
| 4,752,676 A | 6/1988 | Leonard et al. |
| 4,752,877 A | 6/1988 | Roberts et al. |
| 4,797,913 A | 1/1989 | Kaplan |
| 4,799,156 A | 1/1989 | Shavit |
| 4,807,177 A | 2/1989 | Ward |
| 4,812,628 A | 3/1989 | Boston et al. |
| 4,817,949 A | 4/1989 | Bachman et al. |
| 4,823,264 A | 4/1989 | Deming |
| 4,845,347 A | 7/1989 | McCrindle |
| 4,859,837 A | 8/1989 | Halpern |
| 4,877,947 A | 10/1989 | Mori |
| 4,891,503 A | 1/1990 | Jewell |
| 4,893,333 A | 1/1990 | Baran et al. |
| D305,887 S | 2/1990 | Nishimura |
| 4,931,793 A | 6/1990 | Fuhrmann et al. |
| 4,939,674 A | 7/1990 | Price et al. |
| 4,948,174 A | 8/1990 | Thomson et al. |
| 4,974,878 A | 12/1990 | Josephson |
| 4,975,841 A | 12/1990 | Kehnemuyi et al. |
| 4,977,501 A | 12/1990 | Lefevre |
| 4,988,849 A | 1/1991 | Sasaki |
| 4,992,646 A | 2/1991 | Collin |
| 4,992,940 A | 2/1991 | Dworkin |
| 5,007,084 A | 4/1991 | Materna et al. |
| 5,023,782 A | 6/1991 | Lutz et al. |
| 5,023,904 A | 6/1991 | Kaplan |
| 5,025,139 A | 6/1991 | Halliburton, Jr. |
| 5,053,607 A | 10/1991 | Carlson |
| 5,054,096 A | 10/1991 | Beizer |
| 5,056,019 A | 10/1991 | Schultz et al. |
| 5,072,380 A | 12/1991 | Randelman et al. |
| 5,080,748 A | 1/1992 | Bonomi |
| 5,097,115 A | 3/1992 | Ogasawara et al. |
| 5,111,395 A | 5/1992 | Smith |
| 5,121,945 A | 6/1992 | Thomson et al. |
| 5,122,950 A | 6/1992 | Mee |
| 5,136,502 A | 8/1992 | Van Remortel et al. |
| 5,173,851 A | 12/1992 | Off et al. |
| 5,175,682 A | 12/1992 | Higashiyama |
| 5,185,697 A | 2/1993 | Jacobs et al. |
| 5,187,750 A | 2/1993 | Behera |
| 5,198,975 A | 3/1993 | Baker et al. |
| 5,220,501 A | 6/1993 | Lawlor |
| 5,224,034 A | 6/1993 | Katz et al. |
| 5,225,978 A | 7/1993 | Peterson |
| 5,231,569 A | 7/1993 | Myatt et al. |
| 5,237,159 A | 8/1993 | Stephens |
| 5,237,620 A | 8/1993 | Deaton |
| 5,257,486 A | 11/1993 | Holmwall |
| 5,265,007 A | 11/1993 | Barnhard, Jr. et al. |
| 5,265,008 A | 11/1993 | Benton et al. |
| 5,276,311 A | 1/1994 | Hennige |
| 5,283,829 A | 2/1994 | Anderson |
| 5,287,269 A | 2/1994 | Dorrough et al. |
| 5,305,196 A | 4/1994 | Deaton et al. |
| 5,311,594 A | 5/1994 | Penzias |
| 5,315,508 A | 5/1994 | Bain et al. |
| 5,321,238 A | 6/1994 | Watanabe |
| 5,326,959 A | 7/1994 | Perazza |
| 5,326,964 A * | 7/1994 | Risser .......................... 235/487 |
| 5,327,508 A | 7/1994 | Deaton et al. |
| 5,336,870 A | 8/1994 | Hughes |
| 5,349,170 A | 9/1994 | Kern |
| 5,350,906 A | 9/1994 | Brody et al. |
| 5,351,187 A | 9/1994 | Hassett |
| 5,352,877 A | 10/1994 | Morley |
| 5,367,581 A | 11/1994 | VanHorn |
| 5,372,386 A | 12/1994 | Mills |
| 5,373,550 A | 12/1994 | Campbell |
| 5,382,784 A | 1/1995 | Eberhardt |
| 5,396,417 A | 3/1995 | Burks et al. |
| 5,402,474 A | 3/1995 | Miller |
| 5,412,190 A | 5/1995 | Kopesec |
| 5,413,341 A | 5/1995 | Lieberman |
| 5,424,938 A | 6/1995 | Wagner |
| 5,428,684 A | 6/1995 | Akiyama et al. |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glaser et al. |
| 5,446,740 A | 8/1995 | Yien |
| 5,448,471 A | 9/1995 | Deaton et al. |
| 5,459,482 A | 10/1995 | Orlen |
| 5,465,206 A | 11/1995 | Hilt et al. |
| 5,477,040 A | 12/1995 | Lalonde |
| 5,479,494 A | 12/1995 | Clitherow |
| 5,481,094 A | 1/1996 | Suda |
| 5,483,445 A | 1/1996 | Pickering |
| 5,484,988 A | 1/1996 | Hills |
| 5,487,100 A | 1/1996 | Kane |
| 5,495,981 A | 3/1996 | Warther |
| 5,500,890 A | 3/1996 | Rogge et al. |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,530,907 A | 6/1996 | Pavey et al. |
| 5,532,464 A | 7/1996 | Josephson et al. |
| 5,532,689 A | 7/1996 | Bueno |
| 5,539,825 A | 7/1996 | Akiyama et al. |
| 5,541,583 A | 7/1996 | Mandelbaum |
| 5,544,043 A | 8/1996 | Miki et al. |
| 5,544,046 A | 8/1996 | Niwa |
| 5,550,734 A | 8/1996 | Tarter |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,038 A * | 12/1996 | Pitroda .......................... 705/41 |
| 5,590,196 A | 12/1996 | Moreau |
| 5,590,197 A | 12/1996 | Chen |
| 5,592,377 A | 1/1997 | Lipkin |
| 5,592,378 A | 1/1997 | Cameron |
| 5,599,528 A | 2/1997 | Igaki |

(56) References Cited

U.S. PATENT DOCUMENTS

| | | |
|---|---|---|
| 5,602,936 A | 2/1997 | Green et al. |
| 5,603,025 A | 2/1997 | Tabb |
| 5,612,868 A | 3/1997 | Off et al. |
| 5,615,109 A | 3/1997 | Eder |
| 5,617,474 A | 4/1997 | Ditzig et al. |
| 5,619,558 A | 4/1997 | Jheeta |
| 5,621,201 A | 4/1997 | Langhans |
| 5,621,812 A | 4/1997 | Deaton et al. |
| 5,638,457 A | 6/1997 | Deaton et al. |
| 5,640,577 A | 6/1997 | Scharmer |
| 5,642,419 A | 6/1997 | Rosen |
| 5,642,485 A | 6/1997 | Deaton et al. |
| 5,644,723 A | 7/1997 | Deaton et al. |
| 5,644,778 A | 7/1997 | Burks et al. |
| 5,649,114 A | 7/1997 | Deaton et al. |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,668,953 A | 9/1997 | Sloo |
| 5,669,528 A | 9/1997 | Romero et al. |
| 5,677,521 A | 10/1997 | Garrou |
| 5,677,955 A | 10/1997 | Doggett et al. |
| 5,679,938 A | 10/1997 | Templeton |
| 5,679,940 A | 10/1997 | Templeton |
| 5,680,459 A | 10/1997 | Hook et al. |
| 5,687,250 A | 11/1997 | Curley et al. |
| 5,687,322 A | 11/1997 | Deaton et al. |
| 5,689,593 A | 11/1997 | Pan et al. |
| 5,692,132 A | 11/1997 | Hogan |
| 5,698,837 A | 12/1997 | Furuta |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,710,886 A | 1/1998 | Christensen et al. |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,717,868 A | 2/1998 | James |
| 5,717,989 A | 2/1998 | Tozzoli et al. |
| 5,724,424 A | 3/1998 | Gifford |
| 5,727,249 A | 3/1998 | Pollin |
| 5,729,594 A | 3/1998 | Klingman |
| 5,748,780 A | 5/1998 | Stolfo |
| 5,751,842 A | 5/1998 | Eccles |
| 5,757,917 A | 5/1998 | Rose et al. |
| 5,770,843 A | 6/1998 | Rose et al. |
| 5,774,553 A | 6/1998 | Rosen |
| 5,783,808 A | 7/1998 | Josephson |
| 5,784,696 A | 7/1998 | Melnikoff |
| 5,787,403 A | 7/1998 | Randle |
| 5,788,285 A | 8/1998 | Wicker |
| 5,789,732 A | 8/1998 | McMahon et al. |
| 5,793,861 A | 8/1998 | Haigh |
| 5,794,221 A | 8/1998 | Egendorf |
| 5,796,827 A | 8/1998 | Coppersmith et al. |
| 5,802,498 A | 9/1998 | Comesanas |
| 5,802,499 A | 9/1998 | Sampson et al. |
| 5,812,988 A | 9/1998 | Sandretto |
| 5,819,236 A | 10/1998 | Josephson |
| 5,819,238 A | 10/1998 | Fernholz |
| 5,823,463 A | 10/1998 | Fissmann et al. |
| 5,826,241 A | 10/1998 | Stein |
| 5,826,245 A | 10/1998 | Sandberg-Diment |
| 5,826,247 A | 10/1998 | Pintsov et al. |
| 5,832,090 A | 11/1998 | Raspotnik |
| 5,832,447 A | 11/1998 | Rieker |
| 5,832,457 A | 11/1998 | O'Brien |
| 5,832,460 A | 11/1998 | Bednar |
| 5,832,464 A | 11/1998 | Houvener et al. |
| 5,832,488 A | 11/1998 | Eberhardt |
| 5,835,580 A | 11/1998 | Fraser |
| 5,835,603 A | 11/1998 | Coutts |
| 5,835,899 A | 11/1998 | Rose et al. |
| 5,842,421 A | 12/1998 | Desilets et al. |
| 5,852,811 A | 12/1998 | Atkins |
| 5,852,812 A | 12/1998 | Reeder |
| 5,859,419 A | 1/1999 | Wynn |
| 5,864,609 A | 1/1999 | Cross et al. |
| 5,870,456 A | 2/1999 | Rogers |
| 5,870,721 A | 2/1999 | Norris |
| 5,870,723 A | 2/1999 | Pare |
| 5,870,725 A | 2/1999 | Belinger et al. |
| 5,873,072 A | 2/1999 | Kight |
| 5,878,141 A | 3/1999 | Daly et al. |
| 5,883,377 A | 3/1999 | Chapin, Jr. |
| 5,883,810 A | 3/1999 | Franklin et al. |
| 5,884,288 A | 3/1999 | Chang |
| 5,884,290 A | 3/1999 | Smorodinsky et al. |
| 5,893,080 A | 4/1999 | McGurl et al. |
| 5,897,625 A | 4/1999 | Gustin |
| 5,898,157 A | 4/1999 | Mangili et al. |
| 5,903,881 A | 5/1999 | Schrader |
| 5,907,142 A | 5/1999 | Kelsey |
| 5,910,896 A | 6/1999 | Hahn-Carlson |
| 5,910,988 A | 6/1999 | Ballard |
| 5,915,246 A | 6/1999 | Patterson et al. |
| 5,917,965 A | 6/1999 | Cahill et al. |
| 5,920,847 A | 7/1999 | Kolling et al. |
| 5,926,745 A | 7/1999 | Threadgill et al. |
| 5,928,082 A | 7/1999 | Clapper |
| 5,930,778 A | 7/1999 | Geer |
| 5,933,812 A | 8/1999 | Meyer et al. |
| 5,940,510 A | 8/1999 | Curry et al. |
| 5,940,811 A | 8/1999 | Norris |
| 5,940,844 A | 8/1999 | Cahill et al. |
| 5,943,656 A | 8/1999 | Crooks |
| 5,945,653 A | 8/1999 | Walker et al. |
| 5,949,044 A | 9/1999 | Walker et al. |
| 5,950,174 A | 9/1999 | Brendzel |
| 5,956,700 A | 9/1999 | Landry |
| 5,960,411 A | 9/1999 | Hartman et al. |
| 5,963,659 A | 10/1999 | Cahill et al. |
| 5,963,925 A | 10/1999 | Kolling et al. |
| 5,966,698 A | 10/1999 | Pollin |
| 5,970,469 A | 10/1999 | Scroggie et al. |
| 5,970,475 A | 10/1999 | Barnes et al. |
| 5,978,780 A | 11/1999 | Watson |
| 5,987,434 A | 11/1999 | Libman |
| 5,987,435 A | 11/1999 | Weiss et al. |
| 5,987,436 A | 11/1999 | Halbrook |
| 5,987,439 A | 11/1999 | Gustin et al. |
| 5,991,749 A | 11/1999 | Morrill, Jr. |
| 5,991,750 A | 11/1999 | Watson |
| 6,000,832 A | 12/1999 | Franklin et al. |
| 6,002,767 A | 12/1999 | Kramer |
| 6,003,762 A | 12/1999 | Hayashida |
| 6,006,084 A | 12/1999 | Miller et al. |
| 6,006,205 A | 12/1999 | Loeb et al. |
| 6,006,208 A | 12/1999 | Forst et al. |
| 6,009,411 A | 12/1999 | Kepecs |
| 6,009,442 A | 12/1999 | Chen et al. |
| 6,012,049 A | 1/2000 | Kawan |
| 6,014,634 A | 1/2000 | Scroggie et al. |
| 6,014,636 A | 1/2000 | Reeder |
| 6,016,482 A | 1/2000 | Molinari et al. |
| 6,016,484 A | 1/2000 | Williams et al. |
| 6,018,718 A | 1/2000 | Walker et al. |
| 6,021,202 A | 2/2000 | Anderson et al. |
| 6,026,388 A | 2/2000 | Liddy et al. |
| 6,029,139 A | 2/2000 | Cunningham et al. |
| 6,029,141 A | 2/2000 | Bezos et al. |
| 6,029,153 A | 2/2000 | Bauchner et al. |
| 6,032,133 A | 2/2000 | Hilt et al. |
| 6,032,134 A | 2/2000 | Weissman |
| 6,032,136 A | 2/2000 | Brake, Jr. et al. |
| 6,032,137 A | 2/2000 | Hallard |
| 6,032,257 A | 2/2000 | Olarig et al. |
| 6,035,281 A | 3/2000 | Crosskey et al. |
| 6,035,285 A | 3/2000 | Schlect et al. |

(56) References Cited

U.S. PATENT DOCUMENTS

| | | | |
|---|---|---|---|
| 6,035,287 A | 3/2000 | Stallaert et al. |
| 6,036,099 A | 3/2000 | Leighton |
| 6,038,553 A | 3/2000 | Hyde, Jr. |
| 6,039,249 A | 3/2000 | Szewczykowski |
| 6,041,312 A | 3/2000 | Bickerton et al. |
| 6,041,315 A | 3/2000 | Pollin |
| 6,044,362 A | 3/2000 | Neely |
| 6,045,039 A | 4/2000 | Stinson et al. |
| 6,047,261 A | 4/2000 | Siefert |
| 6,048,271 A | 4/2000 | Barcelou |
| 6,052,674 A | 4/2000 | Zervides et al. |
| 6,058,307 A | 5/2000 | Garner |
| 6,058,379 A | 5/2000 | Odom et al. |
| 6,058,380 A | 5/2000 | Anderson et al. |
| 6,058,381 A | 5/2000 | Nelson |
| 6,061,660 A | 5/2000 | Eggleston et al. |
| 6,061,665 A | 5/2000 | Bahreman |
| 6,064,764 A | 5/2000 | Bhaskaran et al. |
| 6,064,987 A | 5/2000 | Walker et al. |
| 6,065,675 A | 5/2000 | Teicher |
| 6,067,524 A | 5/2000 | Byerly et al. |
| 6,070,150 A | 5/2000 | Remington et al. |
| 6,070,798 A | 6/2000 | Nethery |
| 6,073,104 A | 6/2000 | Field |
| 6,073,113 A | 6/2000 | Guinan |
| 6,076,072 A | 6/2000 | Libman |
| 6,078,907 A | 6/2000 | Lamm |
| 6,081,790 A | 6/2000 | Rosen |
| 6,085,168 A | 7/2000 | Mori et al. |
| 6,088,683 A | 7/2000 | Jalili |
| 6,088,685 A | 7/2000 | Kiron et al. |
| 6,088,686 A | 7/2000 | Walker et al. |
| 6,091,362 A | 7/2000 | Stilp et al. |
| 6,092,056 A | 7/2000 | Tull, Jr. et al. |
| 6,092,057 A | 7/2000 | Zimmerman et al. |
| 6,098,053 A | 8/2000 | Slater |
| 6,098,070 A | 8/2000 | Maxwell |
| 6,100,120 A | 8/2000 | Yu |
| 6,101,479 A | 8/2000 | Shaw |
| 6,105,007 A | 8/2000 | Norris |
| 6,105,011 A | 8/2000 | Morrison, Jr. |
| 6,108,639 A | 8/2000 | Walker et al. |
| 6,108,641 A | 8/2000 | Kenna et al. |
| 6,108,642 A | 8/2000 | Findley |
| 6,110,044 A | 8/2000 | Stern |
| 6,111,858 A | 8/2000 | Greaves et al. |
| 6,112,085 A | 8/2000 | Garner et al. |
| 6,115,690 A | 9/2000 | Wong |
| 6,119,011 A | 9/2000 | Borst et al. |
| 6,119,106 A | 9/2000 | Mersky et al. |
| 6,119,107 A | 9/2000 | Polk |
| 6,119,933 A | 9/2000 | Wong et al. |
| 6,125,354 A | 9/2000 | MacFarlane et al. |
| 6,125,391 A | 9/2000 | Meltzer et al. |
| 6,128,599 A | 10/2000 | Walker et al. |
| 6,128,602 A | 10/2000 | Northington et al. |
| 6,128,603 A | 10/2000 | Dent et al. |
| 6,129,273 A | 10/2000 | Shah |
| 6,138,118 A | 10/2000 | Koppstein et al. |
| 6,138,911 A | 10/2000 | Fredregill et al. |
| 6,138,917 A | 10/2000 | Chapin, Jr. |
| 6,141,666 A | 10/2000 | Tobin |
| 6,144,726 A | 11/2000 | Cross |
| 6,144,946 A | 11/2000 | Iwamura |
| 6,148,293 A | 11/2000 | King |
| 6,149,055 A | 11/2000 | Gatto |
| 6,149,056 A | 11/2000 | Stinson et al. |
| 6,164,528 A | 12/2000 | Hills et al. |
| 6,169,974 B1 | 1/2001 | Baumgartner et al. |
| 6,173,272 B1 | 1/2001 | Thomas et al. |
| 6,178,408 B1 | 1/2001 | Copple et al. |
| 6,181,837 B1 | 1/2001 | Cahill et al. |
| 6,182,059 B1 | 1/2001 | Angotti et al. |
| 6,185,541 B1 | 2/2001 | Scroggie et al. |
| 6,185,542 B1 | 2/2001 | Moran et al. |
| 6,185,544 B1 | 2/2001 | Sakamoto et al. |
| 6,188,309 B1 | 2/2001 | Levine |
| 6,202,054 B1 | 3/2001 | Lawlor et al. |
| 6,205,433 B1 | 3/2001 | Boesch et al. |
| 6,213,391 B1 | 4/2001 | Lewis |
| 6,223,168 B1 | 4/2001 | McGurl et al. |
| 6,227,447 B1 | 5/2001 | Campisano |
| 6,233,565 B1 | 5/2001 | Lewis et al. |
| 6,233,566 B1 | 5/2001 | Levine et al. |
| 6,236,972 B1 | 5/2001 | Shkedy |
| 6,240,369 B1 | 5/2001 | Foust |
| 6,240,444 B1 | 5/2001 | Fin et al. |
| 6,243,580 B1 | 6/2001 | Garner |
| 6,243,689 B1 | 6/2001 | Norton |
| 6,247,000 B1 | 6/2001 | Hawkins et al. |
| 6,267,292 B1 | 7/2001 | Walker et al. |
| 6,278,981 B1 | 8/2001 | Dembo et al. |
| 6,278,996 B1 | 8/2001 | Richardson et al. |
| 6,279,158 B1 | 8/2001 | Geile et al. |
| 6,282,516 B1 | 8/2001 | Giuliani |
| 6,283,366 B1 | 9/2001 | Hills et al. |
| 6,285,777 B2 | 9/2001 | Kanevsky et al. |
| 6,289,322 B1 | 9/2001 | Kitchen et al. |
| 6,289,324 B1 | 9/2001 | Kawan |
| 6,292,789 B1 | 9/2001 | Schutzer |
| 6,298,335 B1 | 10/2001 | Bernstein |
| 6,301,379 B1 | 10/2001 | Thompson et al. |
| 6,301,567 B1 | 10/2001 | Leong et al. |
| 6,304,858 B1 | 10/2001 | Mosler et al. |
| 6,305,603 B1 | 10/2001 | Grunbok, Jr. et al. |
| 6,308,887 B1 | 10/2001 | Korman et al. |
| 6,321,212 B1 | 11/2001 | Lange |
| 6,324,524 B1 | 11/2001 | Lent et al. |
| 6,327,575 B1 | 12/2001 | Katz |
| 6,332,126 B1 | 12/2001 | Peirce et al. |
| 6,334,108 B1 | 12/2001 | Deaton et al. |
| 6,336,103 B1 | 1/2002 | Baker |
| 6,338,047 B1 | 1/2002 | Wallman |
| 6,338,049 B1 | 1/2002 | Walker et al. |
| 6,341,724 B2 | 1/2002 | Campisano |
| 6,343,279 B1 | 1/2002 | Bissonette et al. |
| 6,344,108 B1 | 2/2002 | Von Medvey et al. |
| 6,349,290 B1 | 2/2002 | Horowitz et al. |
| 6,349,972 B1 | 2/2002 | Geiger et al. |
| 6,351,735 B1 | 2/2002 | Deaton et al. |
| 6,354,491 B2 | 3/2002 | Nichols et al. |
| 6,356,881 B1 | 3/2002 | Milch et al. |
| 6,360,209 B1 | 3/2002 | Loeb et al. |
| 6,363,164 B1 | 3/2002 | Jones et al. |
| 6,363,364 B1 | 3/2002 | Nel |
| 6,363,365 B1 | 3/2002 | Kou |
| 6,366,967 B1 | 4/2002 | Wagner |
| 6,374,235 B1 | 4/2002 | Chen et al. |
| 6,377,935 B1 | 4/2002 | Deaton et al. |
| 6,385,594 B1 | 5/2002 | Lebda et al. |
| 6,390,362 B1 | 5/2002 | Martin |
| 6,393,409 B2 | 5/2002 | Young et al. |
| 6,404,866 B1 | 6/2002 | Hopper et al. |
| 6,405,173 B1 | 6/2002 | Honarvar et al. |
| 6,405,175 B1 | 6/2002 | Ng |
| 6,405,181 B2 | 6/2002 | Lent et al. |
| 6,409,080 B2 | 6/2002 | Kawagishi |
| 6,409,593 B1 | 6/2002 | Petrecca |
| 6,411,806 B1 | 6/2002 | Garner et al. |
| 6,411,942 B1 | 6/2002 | Fujimoto |
| 6,411,947 B1 | 6/2002 | Rice et al. |
| 6,415,259 B1 | 7/2002 | Wolfinger et al. |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,424,947 B1 | 7/2002 | Tsuria et al. |
| 6,424,949 B1 | 7/2002 | Deaton et al. |
| 6,424,951 B1 | 7/2002 | Shurling et al. |
| 6,434,159 B1 | 8/2002 | Woodward et al. |
| 6,434,534 B1 | 8/2002 | Walker et al. |
| 6,446,072 B1 | 9/2002 | Schulze et al. |
| 6,454,647 B1 | 9/2002 | Woodbury, Jr. |
| 6,456,981 B1 | 9/2002 | Dejaeger et al. |
| 6,460,020 B1 | 10/2002 | Pool et al. |

(56) References Cited

U.S. PATENT DOCUMENTS

| | | |
|---|---|---|
| 6,464,134 B1 | 10/2002 | Page |
| 6,485,922 B1 | 11/2002 | Erickson et al. |
| 6,490,568 B1 | 12/2002 | Omara et al. |
| 6,493,685 B1 | 12/2002 | Ensel et al. |
| 6,495,437 B1 | 12/2002 | Yu |
| 6,513,019 B2 | 1/2003 | Lewis |
| 6,516,302 B1 | 2/2003 | Deaton et al. |
| 6,535,896 B2 | 3/2003 | Britton et al. |
| 6,536,663 B1 | 3/2003 | Lozier et al. |
| 6,542,739 B1 | 4/2003 | Garner |
| 6,547,129 B2 | 4/2003 | Nichols et al. |
| 6,554,185 B1 | 4/2003 | Montross et al. |
| 6,560,581 B1 | 5/2003 | Fox et al. |
| 6,561,657 B1 | 5/2003 | Schofield |
| 6,564,189 B1 | 5/2003 | Nycz |
| 6,567,786 B1 | 5/2003 | Bibelnieks et al. |
| 6,567,791 B2 | 5/2003 | Lent et al. |
| 6,571,216 B1 | 5/2003 | Garg et al. |
| 6,574,350 B1 | 6/2003 | Rhoads et al. |
| 6,574,377 B1 | 6/2003 | Cahill et al. |
| 6,578,000 B1 | 6/2003 | Dodrill et al. |
| 6,578,012 B1 | 6/2003 | Storey |
| 6,578,015 B1 | 6/2003 | Haseltine et al. |
| 6,594,640 B1 | 7/2003 | Postrel |
| 6,607,127 B2 | 8/2003 | Wong |
| 6,609,104 B1 | 8/2003 | Deaton et al. |
| 6,609,113 B1 | 8/2003 | O'Leary et al. |
| 6,609,125 B1 | 8/2003 | Layne et al. |
| 6,611,811 B1 | 8/2003 | Deaton et al. |
| 6,611,819 B1 | 8/2003 | Oneda |
| 6,629,081 B1 | 9/2003 | Cornelius et al. |
| 6,636,615 B1 | 10/2003 | Rhoads et al. |
| 6,647,376 B1 | 11/2003 | Farrar et al. |
| 6,658,393 B1 | 12/2003 | Basch et al. |
| 6,661,910 B2 | 12/2003 | Jones et al. |
| 6,662,215 B1 | 12/2003 | Moskowitz et al. |
| D485,573 S | 1/2004 | Li |
| 6,684,195 B1 | 1/2004 | Deaton et al. |
| 6,687,684 B1 | 2/2004 | Whitehouse et al. |
| 6,704,714 B1 | 3/2004 | O'Leary et al. |
| 6,714,919 B1 | 3/2004 | Findley |
| 6,718,313 B1 | 4/2004 | Lent et al. |
| 6,721,715 B2 | 4/2004 | Nemzow |
| 6,721,743 B1 | 4/2004 | Sakakibara |
| 6,728,397 B2 | 4/2004 | McNeal |
| D490,840 S | 6/2004 | Arakaki et al. |
| D491,186 S | 6/2004 | Arakaki et al. |
| D491,953 S | 6/2004 | Arakaki et al. |
| 6,754,640 B2 | 6/2004 | Bozeman |
| D495,736 S | 9/2004 | Scharf |
| D496,365 S | 9/2004 | Liu et al. |
| 6,793,135 B1 | 9/2004 | Ryoo |
| 6,795,809 B2 | 9/2004 | O'Brien et al. |
| 6,795,812 B1 | 9/2004 | Lent et al. |
| 6,804,786 B1 | 10/2004 | Chamley et al. |
| 6,806,145 B2 | 10/2004 | Haukka et al. |
| D498,236 S | 11/2004 | Liu et al. |
| 6,817,008 B2 | 11/2004 | Leford et al. |
| 6,817,521 B1 | 11/2004 | Matada |
| 6,820,058 B2 | 11/2004 | Wood et al. |
| 6,820,061 B2 | 11/2004 | Postrel |
| 6,824,066 B2 | 11/2004 | Weyant |
| 6,825,940 B1 | 11/2004 | Wu et al. |
| 6,826,542 B1 | 11/2004 | Virgin et al. |
| 6,829,586 B2 | 12/2004 | Postrel |
| 6,834,344 B1 | 12/2004 | Aggarwal et al. |
| 6,842,739 B2 | 1/2005 | Postrel |
| 6,856,973 B1 | 2/2005 | Bott |
| RE38,717 E | 3/2005 | Bothwell |
| 6,860,375 B2 | 3/2005 | Hallowell et al. |
| 6,865,547 B1 | 3/2005 | Brake, Jr. et al. |
| 6,874,139 B2 | 3/2005 | Krueger et al. |
| 6,885,994 B1 | 4/2005 | Scroggie et al. |
| 6,886,046 B2 | 4/2005 | Stutz et al. |
| D505,450 S | 5/2005 | Lauer et al. |
| 6,889,198 B2 | 5/2005 | Kawan |
| 6,892,187 B2 | 5/2005 | Phillips et al. |
| 6,901,375 B2 | 5/2005 | Fernandez |
| 6,901,406 B2 | 5/2005 | Nabe et al. |
| 6,912,502 B1 | 6/2005 | Buddle et al. |
| 6,915,271 B1 | 7/2005 | Meyer et al. |
| 6,920,611 B1 | 7/2005 | Spaeth et al. |
| 6,938,156 B2 | 8/2005 | Wheeler et al. |
| RE38,801 E | 9/2005 | Rogers |
| 6,942,569 B2 | 9/2005 | Petracca |
| 6,945,453 B1 | 9/2005 | Schwarz, Jr. |
| 6,947,898 B2 | 9/2005 | Postrel |
| 6,950,881 B1 | 9/2005 | Ndili |
| 6,950,940 B2 | 9/2005 | Wheeler et al. |
| 6,954,896 B1 | 10/2005 | Dodrill et al. |
| 6,961,710 B1 | 11/2005 | Yanagisawa et al. |
| 6,963,857 B1 | 11/2005 | Johnson |
| 6,965,882 B1 | 11/2005 | Lapstun et al. |
| 6,970,259 B1 | 11/2005 | Lunt et al. |
| 6,970,830 B1 | 11/2005 | Samra et al. |
| 6,970,855 B2 | 11/2005 | Das et al. |
| 6,980,970 B2 | 12/2005 | Krueger et al. |
| RE38,957 E | 1/2006 | Laussermair et al. |
| 6,985,879 B2 | 1/2006 | Walker et al. |
| 6,999,938 B1 | 2/2006 | Libman |
| 6,999,943 B1 | 2/2006 | Johnson et al. |
| 7,003,476 B1 | 2/2006 | Samra et al. |
| 7,004,382 B2 | 2/2006 | Sandru |
| 7,006,979 B1 | 2/2006 | Samra et al. |
| 7,010,495 B1 | 3/2006 | Samra et al. |
| 7,014,110 B2 | 3/2006 | Minowa et al. |
| 7,024,374 B1 | 4/2006 | Day et al. |
| 7,024,385 B1 | 4/2006 | Adcock et al. |
| 7,025,256 B1 | 4/2006 | Drummond et al. |
| 7,039,600 B1 | 5/2006 | Meek et al. |
| 7,062,456 B1 | 6/2006 | Riehl et al. |
| 7,068,832 B1 | 6/2006 | Price et al. |
| 7,070,095 B1 | 7/2006 | Gandel et al. |
| 7,072,864 B2 | 7/2006 | Brake, Jr. et al. |
| 7,092,905 B2 | 8/2006 | Behrenbrinker et al. |
| 7,092,916 B2 | 8/2006 | Diveley et al. |
| 7,104,443 B1 | 9/2006 | Paul et al. |
| 7,107,249 B2 | 9/2006 | Dively et al. |
| 7,121,471 B2 | 10/2006 | Beenau et al. |
| 7,133,846 B1 | 11/2006 | Ginter et al. |
| 7,143,063 B2 | 11/2006 | Lent et al. |
| D533,220 S | 12/2006 | Graves et al. |
| 7,146,344 B2 | 12/2006 | Wankmueller |
| 7,155,409 B1 | 12/2006 | Stroh |
| 7,159,116 B2 | 1/2007 | Moskowitz |
| 7,177,836 B1 | 2/2007 | German et al. |
| D538,349 S | 3/2007 | Hollands |
| 7,194,437 B1 | 3/2007 | Britto et al. |
| 7,200,255 B2 | 4/2007 | Jones et al. |
| 7,216,091 B1 | 5/2007 | Blandina et al. |
| 7,228,155 B2 | 6/2007 | Saunders |
| 7,243,839 B2 | 7/2007 | Beck et al. |
| 7,249,112 B2 | 7/2007 | Berardi et al. |
| 7,252,223 B2 | 8/2007 | Schofield |
| D551,705 S | 9/2007 | Mershon |
| 7,266,511 B2 | 9/2007 | Teshima |
| 7,269,575 B1 | 9/2007 | Concannon et al. |
| 7,277,870 B2 | 10/2007 | Mourad et al. |
| 7,287,009 B1 | 10/2007 | Liebermann |
| 7,295,999 B1 | 11/2007 | Simon et al. |
| 7,312,707 B1 | 12/2007 | Bishop et al. |
| 7,313,543 B1 | 12/2007 | Crane et al. |
| 7,315,843 B2 | 1/2008 | Diveley et al. |
| 7,317,823 B1 | 1/2008 | Price et al. |
| 7,337,148 B2 | 2/2008 | Xie et al. |
| 7,346,567 B2 | 3/2008 | Weeks |
| 7,349,884 B1 | 3/2008 | Odom |
| RE40,220 E | 4/2008 | Nichols et al. |
| 7,356,516 B2 | 4/2008 | Richey et al. |
| 7,380,707 B1 | 6/2008 | Fredman |
| 7,392,222 B1 | 6/2008 | Hamilton et al. |
| 7,392,224 B1 | 6/2008 | Bauer et al. |
| 7,398,253 B1 | 7/2008 | Pinnell |
| 7,401,048 B2 | 7/2008 | Rosedale et al. |

(56) References Cited

U.S. PATENT DOCUMENTS

| | | |
|---|---|---|
| 7,471,818 B1 | 12/2008 | Price et al. |
| 7,493,288 B2 | 2/2009 | Biship et al. |
| 7,506,804 B2 | 3/2009 | Zajkowski et al. |
| 7,512,551 B2 | 3/2009 | Postrel |
| 7,523,385 B2 | 4/2009 | Nguyen et al. |
| 7,536,354 B1 | 5/2009 | DeGroeve et al. |
| 7,546,272 B2 | 6/2009 | Loy |
| 7,577,611 B2 | 8/2009 | Heit et al. |
| 7,587,363 B2 | 9/2009 | Cataline et al. |
| 7,640,205 B2 | 12/2009 | Michelassi et al. |
| 7,647,344 B2 | 1/2010 | Skurtovich, Jr. et al. |
| 7,676,409 B1 | 3/2010 | Ahmad |
| 7,680,735 B1 | 3/2010 | Loy |
| 7,686,218 B2 | 3/2010 | Hessburg et al. |
| 7,707,111 B2 | 4/2010 | Brake, Jr. et al. |
| 7,734,545 B1 | 6/2010 | Fogliano et al. |
| 7,743,979 B2 | 6/2010 | Fredman |
| 2001/0011222 A1 | 8/2001 | McLauchlin et al. |
| 2001/0018666 A1 | 8/2001 | Sugiyama et al. |
| 2001/0018739 A1 | 8/2001 | Anderson et al. |
| 2001/0023407 A1 | 9/2001 | Liyanearachchi et al. |
| 2001/0023415 A1 | 9/2001 | Keil |
| 2001/0025253 A1 | 9/2001 | Heintz et al. |
| 2001/0027389 A1 | 10/2001 | Beverina et al. |
| 2001/0027441 A1 | 10/2001 | Wankmueller |
| 2001/0029490 A1 | 10/2001 | Inamochi |
| 2001/0032139 A1 | 10/2001 | Debonnet, Jr. |
| 2001/0034647 A1 | 10/2001 | Marks et al. |
| 2001/0034651 A1 | 10/2001 | Marks et al. |
| 2001/0034663 A1 | 10/2001 | Teveler et al. |
| 2001/0034718 A1 | 10/2001 | Shaked et al. |
| 2001/0037243 A1 | 11/2001 | Rouston et al. |
| 2001/0037299 A1 | 11/2001 | Nichols et al. |
| 2001/0037300 A1 | 11/2001 | Miyazaki et al. |
| 2001/0037309 A1 | 11/2001 | Vrain |
| 2001/0038033 A1 | 11/2001 | Habib |
| 2001/0039511 A1 | 11/2001 | Duckworth et al. |
| 2001/0044747 A1 | 11/2001 | Ramachandran et al. |
| 2001/0044764 A1 | 11/2001 | Arnold |
| 2001/0047322 A1 | 11/2001 | Plate |
| 2001/0047334 A1 | 11/2001 | Nappe et al. |
| 2001/0047342 A1 | 11/2001 | Cuervo |
| 2001/0047489 A1 | 11/2001 | Ito et al. |
| 2001/0049628 A1 | 12/2001 | Icho |
| 2001/0051533 A1 | 12/2001 | Wietzke et al. |
| 2001/0051919 A1 | 12/2001 | Mason |
| 2001/0054003 A1 | 12/2001 | Chien et al. |
| 2002/0002495 A1 | 1/2002 | Ullman |
| 2002/0002513 A1 | 1/2002 | Chiasson |
| 2002/0003169 A1* | 1/2002 | Cooper ............ 235/492 |
| 2002/0004742 A1 | 1/2002 | Willcocks et al. |
| 2002/0007313 A1 | 1/2002 | Mai et al. |
| 2002/0010621 A1 | 1/2002 | Bell et al. |
| 2002/0011517 A1 | 1/2002 | Namekawa et al. |
| 2002/0012445 A1 | 1/2002 | Perry |
| 2002/0013728 A1 | 1/2002 | Wilkman |
| 2002/0023055 A1 | 2/2002 | Antognini et al. |
| 2002/0026365 A1 | 2/2002 | Natanzon |
| 2002/0026394 A1 | 2/2002 | Savage et al. |
| 2002/0032622 A1 | 3/2002 | Petit et al. |
| 2002/0032651 A1 | 3/2002 | Embrey |
| 2002/0038363 A1 | 3/2002 | MacLean |
| 2002/0040344 A1 | 4/2002 | Preiser et al. |
| 2002/0042742 A1 | 4/2002 | Glover et al. |
| 2002/0042774 A1 | 4/2002 | Ortiz et al. |
| 2002/0046106 A1 | 4/2002 | Ishibashi et al. |
| 2002/0046110 A1 | 4/2002 | Gallagher |
| 2002/0046116 A1 | 4/2002 | Hohle et al. |
| 2002/0046169 A1 | 4/2002 | Keresman, III et al. |
| 2002/0047316 A1 | 4/2002 | Chitayat |
| 2002/0049605 A1 | 4/2002 | Hagi |
| 2002/0052778 A1 | 5/2002 | Murphy et al. |
| 2002/0052842 A1 | 5/2002 | Schuba et al. |
| 2002/0052845 A1 | 5/2002 | Nielsen |
| 2002/0055874 A1 | 5/2002 | Cohen |
| 2002/0055907 A1 | 5/2002 | Pater et al. |
| 2002/0059103 A1 | 5/2002 | Anderson et al. |
| 2002/0062253 A1 | 5/2002 | Dosh et al. |
| 2002/0062257 A1 | 5/2002 | Minamishin et al. |
| 2002/0065712 A1 | 5/2002 | Kawan |
| 2002/0065720 A1 | 5/2002 | Carswell et al. |
| 2002/0065735 A1 | 5/2002 | Hatakama et al. |
| 2002/0069104 A1 | 6/2002 | Beach et al. |
| 2002/0069109 A1 | 6/2002 | Wendkos |
| 2002/0069134 A1 | 6/2002 | Solomon |
| 2002/0069158 A1 | 6/2002 | Larkin et al. |
| 2002/0070270 A1 | 6/2002 | Narita et al. |
| 2002/0072931 A1 | 6/2002 | Card |
| 2002/0072974 A1 | 6/2002 | Pugliese et al. |
| 2002/0072976 A1 | 6/2002 | Virtanen et al. |
| 2002/0073019 A1 | 6/2002 | Deaton |
| 2002/0077890 A1 | 6/2002 | LaPointe et al. |
| 2002/0077895 A1 | 6/2002 | Howell |
| 2002/0077904 A1 | 6/2002 | Ali |
| 2002/0077966 A1 | 6/2002 | Harycki et al. |
| 2002/0077978 A1 | 6/2002 | O'Leary et al. |
| 2002/0082920 A1 | 6/2002 | Austin et al. |
| 2002/0082962 A1 | 6/2002 | Farris et al. |
| 2002/0082985 A1 | 6/2002 | MacKay |
| 2002/0084321 A1 | 7/2002 | Martens et al. |
| 2002/0087349 A1 | 7/2002 | Wong |
| 2002/0087415 A1 | 7/2002 | Allen et al. |
| 2002/0087452 A1 | 7/2002 | Megiddo |
| 2002/0087468 A1 | 7/2002 | Ganesan et al. |
| 2002/0087469 A1 | 7/2002 | Ganesan et al. |
| 2002/0091567 A1 | 7/2002 | Royston |
| 2002/0091635 A1 | 7/2002 | Dilip et al. |
| 2002/0099586 A1 | 7/2002 | Bladen et al. |
| 2002/0099601 A1 | 7/2002 | Farrell |
| 2002/0099649 A1 | 7/2002 | Lee et al. |
| 2002/0100803 A1 | 8/2002 | Sehr |
| 2002/0107731 A1 | 8/2002 | Teng |
| 2002/0107770 A1 | 8/2002 | Meyer et al. |
| 2002/0107788 A1 | 8/2002 | Cunningham |
| 2002/0111837 A1 | 8/2002 | Aupperle |
| 2002/0111859 A1 | 8/2002 | Sheldon et al. |
| 2002/0111860 A1 | 8/2002 | Jones |
| 2002/0111861 A1 | 8/2002 | Sakamoto et al. |
| 2002/0111891 A1 | 8/2002 | Hoffman et al. |
| 2002/0116257 A1 | 8/2002 | Helbig |
| 2002/0116266 A1 | 8/2002 | Marshall |
| 2002/0116331 A1 | 8/2002 | Cataline et al. |
| 2002/0120497 A1 | 8/2002 | King |
| 2002/0120537 A1 | 8/2002 | Morea et al. |
| 2002/0120571 A1 | 8/2002 | Maung et al. |
| 2002/0120846 A1 | 8/2002 | Stewart et al. |
| 2002/0123926 A1 | 9/2002 | Bushold et al. |
| 2002/0123934 A1 | 9/2002 | Tanaka et al. |
| 2002/0123946 A1 | 9/2002 | Haworth et al. |
| 2002/0123948 A1 | 9/2002 | Yumoto |
| 2002/0123955 A1 | 9/2002 | Andreski et al. |
| 2002/0128916 A1 | 9/2002 | Beinecke |
| 2002/0128981 A1 | 9/2002 | Kawan et al. |
| 2002/0129221 A1 | 9/2002 | Borgia et al. |
| 2002/0133401 A1 | 9/2002 | Mount et al. |
| 2002/0133461 A1 | 9/2002 | Ramachandran |
| 2002/0138390 A1 | 9/2002 | May |
| 2002/0138398 A1 | 9/2002 | Kalin et al. |
| 2002/0143614 A1 | 10/2002 | MacLean et al. |
| 2002/0143621 A1 | 10/2002 | Donnelly et al. |
| 2002/0143626 A1 | 10/2002 | Voltmer et al. |
| 2002/0145039 A1 | 10/2002 | Carroll |
| 2002/0147633 A1 | 10/2002 | Rafizadeh |
| 2002/0147691 A1 | 10/2002 | Davis et al. |
| 2002/0152116 A1 | 10/2002 | Yan et al. |
| 2002/0152118 A1 | 10/2002 | Hadjigeorgis |
| 2002/0152123 A1 | 10/2002 | Giordano et al. |
| 2002/0152179 A1 | 10/2002 | Racov |
| 2002/0156723 A1 | 10/2002 | Lilly et al. |
| 2002/0161630 A1 | 10/2002 | Kern et al. |
| 2002/0161641 A1 | 10/2002 | Quinlan et al. |
| 2002/0165771 A1 | 11/2002 | Walker et al. |
| 2002/0165808 A1 | 11/2002 | Zamsky et al. |
| 2002/0169658 A1 | 11/2002 | Adler |

(56) References Cited

U.S. PATENT DOCUMENTS

| | | |
|---|---|---|
| 2002/0169671 A1 | 11/2002 | Junger |
| 2002/0169719 A1 | 11/2002 | Dively et al. |
| 2002/0170966 A1 | 11/2002 | Hannigan et al. |
| 2002/0174011 A1 | 11/2002 | Sanchez et al. |
| 2002/0174018 A1 | 11/2002 | Bunger et al. |
| 2002/0178025 A1 | 11/2002 | Hansen et al. |
| 2002/0178056 A1 | 11/2002 | Lim |
| 2002/0178071 A1 | 11/2002 | Walker et al. |
| 2002/0178112 A1 | 11/2002 | Goeller et al. |
| 2002/0178117 A1 | 11/2002 | Maguire et al. |
| 2002/0184123 A1 | 12/2002 | Sijacic et al. |
| 2002/0184145 A1 | 12/2002 | Sijacic et al. |
| 2002/0184151 A1 | 12/2002 | Maloney |
| 2002/0188478 A1 | 12/2002 | Breeland et al. |
| 2002/0188509 A1 | 12/2002 | Ariff et al. |
| 2002/0188511 A1 | 12/2002 | Johnson et al. |
| 2002/0188565 A1 | 12/2002 | Nakamura et al. |
| 2002/0194071 A1 | 12/2002 | Yoshizaki et al. |
| 2002/0194081 A1 | 12/2002 | Perkowski |
| 2002/0194096 A1 | 12/2002 | Falcone et al. |
| 2002/0194117 A1 | 12/2002 | Nabe et al. |
| 2002/0194119 A1 | 12/2002 | Wright et al. |
| 2002/0198803 A1 | 12/2002 | Rowe |
| 2002/0198807 A1 | 12/2002 | Kobayashi et al. |
| 2002/0198817 A1 | 12/2002 | Dhir |
| 2002/0198822 A1 | 12/2002 | Munoz et al. |
| 2002/0198830 A1 | 12/2002 | Randell et al. |
| 2002/0199182 A1 | 12/2002 | Whitehead |
| 2003/0004794 A1 | 1/2003 | Hamilton |
| 2003/0004803 A1 | 1/2003 | Glover et al. |
| 2003/0004809 A1 | 1/2003 | Palcic et al. |
| 2003/0004874 A1 | 1/2003 | Ludwig et al. |
| 2003/0005288 A1 | 1/2003 | Moskowitz et al. |
| 2003/0009374 A1 | 1/2003 | Moodie et al. |
| 2003/0009379 A1 | 1/2003 | Narasimhan et al. |
| 2003/0009393 A1 | 1/2003 | Norris |
| 2003/0018523 A1 | 1/2003 | Rappaport et al. |
| 2003/0018557 A1 | 1/2003 | Gilbert et al. |
| 2003/0018567 A1 | 1/2003 | Flitcroft et al. |
| 2003/0023557 A1 | 1/2003 | Moore |
| 2003/0028481 A1 | 2/2003 | Flitcroft et al. |
| 2003/0028483 A1 | 2/2003 | Sanders et al. |
| 2003/0033252 A1 | 2/2003 | Buttridge et al. |
| 2003/0036952 A1 | 2/2003 | Panttaja et al. |
| 2003/0037002 A1 | 2/2003 | Higgins et al. |
| 2003/0040927 A1 | 2/2003 | Sato et al. |
| 2003/0040959 A1 | 2/2003 | Fei et al. |
| 2003/0040964 A1 | 2/2003 | Lacek |
| 2003/0046218 A1 | 3/2003 | Albanese et al. |
| 2003/0046249 A1 | 3/2003 | Wu |
| 2003/0048888 A1 | 3/2003 | Hopper et al. |
| 2003/0050831 A1 | 3/2003 | Klayh |
| 2003/0055675 A1 | 3/2003 | Klein Twennaar |
| 2003/0061093 A1 | 3/2003 | Todd |
| 2003/0061097 A1 | 3/2003 | Walker et al. |
| 2003/0061098 A1 | 3/2003 | Meyer |
| 2003/0065618 A1 | 4/2003 | VanDeBoe, Jr. |
| 2003/0065805 A1 | 4/2003 | Barnes, Jr. |
| 2003/0069780 A1 | 4/2003 | Hailwood et al. |
| 2003/0069808 A1 | 4/2003 | Cardno |
| 2003/0074290 A1 | 4/2003 | Clore |
| 2003/0083933 A1 | 5/2003 | McAlear |
| 2003/0088462 A1 | 5/2003 | Carrither et al. |
| 2003/0088470 A1 | 5/2003 | Cuervo |
| 2003/0097298 A1 | 5/2003 | Klimpl et al. |
| 2003/0097335 A1 | 5/2003 | Muskowitz et al. |
| 2003/0101131 A1 | 5/2003 | Warren et al. |
| 2003/0105641 A1 | 6/2003 | Lewis |
| 2003/0105688 A1 | 6/2003 | Brown et al. |
| 2003/0105689 A1 | 6/2003 | Chandak et al. |
| 2003/0110070 A1 | 6/2003 | De Goeij |
| 2003/0110136 A1 | 6/2003 | Wells et al. |
| 2003/0110442 A1 | 6/2003 | Battle |
| 2003/0115100 A1 | 6/2003 | Teicher |
| 2003/0120544 A1 | 6/2003 | Gritzbach et al. |
| 2003/0120686 A1 | 6/2003 | Kim et al. |
| 2003/0125969 A1 | 7/2003 | Kizer et al. |
| 2003/0126011 A1 | 7/2003 | Bryman et al. |
| 2003/0130895 A1 | 7/2003 | Antonucci et al. |
| 2003/0130919 A1 | 7/2003 | Templeton et al. |
| 2003/0130945 A1 | 7/2003 | Force et al. |
| 2003/0130952 A1 | 7/2003 | Bell et al. |
| 2003/0135464 A1 | 7/2003 | Mourad et al. |
| 2003/0144902 A1 | 7/2003 | Bowie |
| 2003/0144942 A1 | 7/2003 | Sobek |
| 2003/0144952 A1 | 7/2003 | Brown et al. |
| 2003/0149629 A1 | 8/2003 | Claridge et al. |
| 2003/0158776 A1 | 8/2003 | Landesmann |
| 2003/0158782 A1 | 8/2003 | Thomson et al. |
| 2003/0158811 A1 | 8/2003 | Sanders et al. |
| 2003/0158818 A1 | 8/2003 | George et al. |
| 2003/0171992 A1 | 9/2003 | Blagg et al. |
| 2003/0172039 A1 | 9/2003 | Guy et al. |
| 2003/0187787 A1 | 10/2003 | Freund |
| 2003/0187789 A1 | 10/2003 | Karas et al. |
| 2003/0191710 A1 | 10/2003 | Green et al. |
| 2003/0195805 A1 | 10/2003 | Storey |
| 2003/0200107 A1 | 10/2003 | Allen et al. |
| 2003/0200141 A1 | 10/2003 | Robison |
| 2003/0200142 A1 | 10/2003 | Hicks et al. |
| 2003/0200144 A1 | 10/2003 | Antonucci et al. |
| 2003/0205617 A1 | 11/2003 | Allen et al. |
| 2003/0208400 A1 | 11/2003 | Kuo et al. |
| 2003/0208421 A1 | 11/2003 | Vicknair et al. |
| 2003/0208439 A1 | 11/2003 | Rast |
| 2003/0208441 A1 | 11/2003 | Poplawski et al. |
| 2003/0212630 A1 | 11/2003 | Kahr |
| 2003/0213843 A1 | 11/2003 | Jackson |
| 2003/0216964 A1 | 11/2003 | MacLean et al. |
| 2003/0216967 A1 | 11/2003 | Williams |
| 2003/0216998 A1 | 11/2003 | Chang et al. |
| 2003/0217003 A1 | 11/2003 | Weinflash et al. |
| 2003/0217005 A1 | 11/2003 | Drummond et al. |
| 2003/0217329 A1 | 11/2003 | Good |
| 2003/0218066 A1 | 11/2003 | Fernandes et al. |
| 2003/0220834 A1 | 11/2003 | Leung et al. |
| 2003/0220863 A1 | 11/2003 | Holm et al. |
| 2003/0225618 A1 | 12/2003 | Hessburg et al. |
| 2003/0225619 A1 | 12/2003 | Dokken et al. |
| 2003/0225663 A1 | 12/2003 | Horan et al. |
| 2003/0229525 A1 | 12/2003 | Callahan et al. |
| 2003/0229590 A1 | 12/2003 | Byrne et al. |
| 2003/0233255 A1 | 12/2003 | Dirienzo |
| 2003/0233278 A1 | 12/2003 | Marshall |
| 2003/0233305 A1 | 12/2003 | Solomon |
| 2003/0236679 A1 | 12/2003 | Galves et al. |
| 2003/0236704 A1 | 12/2003 | Antonucci |
| 2003/0236712 A1 | 12/2003 | Antonucci et al. |
| 2003/0236747 A1 | 12/2003 | Sager |
| 2003/0237046 A1 | 12/2003 | Parker et al. |
| 2004/0002916 A1 | 1/2004 | Timmerman et al. |
| 2004/0006487 A1 | 1/2004 | Tari |
| 2004/0010419 A1 | 1/2004 | Sinnott |
| 2004/0010447 A1 | 1/2004 | Asayama |
| 2004/0010462 A1 | 1/2004 | Moon et al. |
| 2004/0010465 A1 | 1/2004 | Michalski et al. |
| 2004/0015394 A1 | 1/2004 | Mok et al. |
| 2004/0015414 A1 | 1/2004 | Sidlo et al. |
| 2004/0019522 A1 | 1/2004 | Bortolin et al. |
| 2004/0019561 A1 | 1/2004 | Isturiz et al. |
| 2004/0019605 A1 | 1/2004 | Keown et al. |
| 2004/0029569 A1 | 2/2004 | Khan et al. |
| 2004/0030637 A1 | 2/2004 | Robison et al. |
| 2004/0039686 A1 | 2/2004 | Klebanoff |
| 2004/0039691 A1 | 2/2004 | Barratt et al. |
| 2004/0039693 A1 | 2/2004 | Nauman et al. |
| 2004/0044575 A1 | 3/2004 | Bakker et al. |
| 2004/0044577 A1 | 3/2004 | Sisko et al. |
| 2004/0044606 A1 | 3/2004 | Buttridge et al. |
| 2004/0044951 A1 | 3/2004 | Repko et al. |
| 2004/0049425 A1 | 3/2004 | Bakker et al. |
| 2004/0049455 A1 | 3/2004 | Mohsenzadeh |
| 2004/0049456 A1 | 3/2004 | Dreyer |
| 2004/0054581 A1 | 3/2004 | Redford et al. |

(56) References Cited

U.S. PATENT DOCUMENTS

| | | |
|---|---|---|
| 2004/0054604 A1 | 3/2004 | Frejlev et al. |
| 2004/0064371 A1 | 4/2004 | Crapo |
| 2004/0064401 A1 | 4/2004 | Palaghita et al. |
| 2004/0064409 A1 | 4/2004 | Kight et al. |
| 2004/0078324 A1 | 4/2004 | Lonnberg et al. |
| 2004/0078328 A1 | 4/2004 | Talbert et al. |
| 2004/0078332 A1 | 4/2004 | Ferguson et al. |
| 2004/0083170 A1 | 4/2004 | Barn et al. |
| 2004/0083183 A1 | 4/2004 | Hardesty et al. |
| 2004/0088218 A1 | 5/2004 | Abraham et al. |
| 2004/0088221 A1 | 5/2004 | Katz et al. |
| 2004/0094624 A1 | 5/2004 | Fernandes et al. |
| 2004/0103431 A1 | 5/2004 | Davenport et al. |
| 2004/0111363 A1 | 6/2004 | Trench et al. |
| 2004/0111366 A1 | 6/2004 | Schneider |
| 2004/0111371 A1 | 6/2004 | Friedman |
| 2004/0117249 A1 | 6/2004 | Wang et al. |
| 2004/0118914 A1 | 6/2004 | Smith et al. |
| 2004/0122734 A1 | 6/2004 | Schleicher et al. |
| 2004/0122736 A1 | 6/2004 | Strock et al. |
| 2004/0124246 A1* | 7/2004 | Allen et al. .................. 235/492 |
| 2004/0128195 A1 | 7/2004 | Sorem |
| 2004/0128248 A1 | 7/2004 | Fujihara et al. |
| 2004/0133516 A1 | 7/2004 | Buchanan et al. |
| 2004/0138991 A1 | 7/2004 | Song et al. |
| 2004/0139001 A1 | 7/2004 | Henriques et al. |
| 2004/0143491 A1 | 7/2004 | Steinberg |
| 2004/0143526 A1 | 7/2004 | Monasterio et al. |
| 2004/0143544 A1 | 7/2004 | Lilge et al. |
| 2004/0148200 A1 | 7/2004 | Hodges |
| 2004/0149544 A1 | 8/2004 | Dal Ferro |
| 2004/0158522 A1 | 8/2004 | Brown et al. |
| 2004/0159700 A1 | 8/2004 | Khan et al. |
| 2004/0162761 A1 | 8/2004 | Comer |
| 2004/0167815 A1 | 8/2004 | DeLaHunt |
| 2004/0169088 A1* | 9/2004 | Nelms et al. .................. 235/493 |
| 2004/0172358 A1 | 9/2004 | Lent et al. |
| 2004/0177036 A1 | 9/2004 | Nutahara et al. |
| 2004/0181441 A1 | 9/2004 | Fung et al. |
| 2004/0186770 A1 | 9/2004 | Pettit et al. |
| 2004/0186773 A1 | 9/2004 | George et al. |
| 2004/0193485 A1 | 9/2004 | Ilberg |
| 2004/0193489 A1 | 9/2004 | Boyd et al. |
| 2004/0193540 A1 | 9/2004 | Brown et al. |
| 2004/0199406 A1 | 10/2004 | Owens et al. |
| 2004/0201735 A1 | 10/2004 | Baron |
| 2004/0204992 A1 | 10/2004 | Doerwald et al. |
| 2004/0205023 A1 | 10/2004 | Hafer et al. |
| 2004/0210481 A1 | 10/2004 | Quintan et al. |
| 2004/0210498 A1 | 10/2004 | Freund |
| 2004/0210505 A1 | 10/2004 | Pourhamid |
| 2004/0210531 A1 | 10/2004 | Barron et al. |
| 2004/0215507 A1 | 10/2004 | Levitt et al. |
| 2004/0219971 A1 | 11/2004 | Ciancio et al. |
| 2004/0228514 A1 | 11/2004 | Houle et al. |
| 2004/0230481 A1 | 11/2004 | Bushold et al. |
| 2004/0232223 A1 | 11/2004 | Beenau et al. |
| 2004/0236688 A1 | 11/2004 | Bozeman |
| 2004/0238620 A1 | 12/2004 | Cohagan et al. |
| 2004/0238622 A1 | 12/2004 | Freiberg |
| 2004/0239481 A1 | 12/2004 | Beenau |
| 2004/0242308 A1 | 12/2004 | Gray |
| 2004/0243424 A1 | 12/2004 | Jeong |
| 2004/0243465 A1 | 12/2004 | Manners |
| 2004/0243468 A1 | 12/2004 | Cohagan et al. |
| 2004/0243506 A1 | 12/2004 | Das |
| 2004/0249689 A1 | 12/2004 | Naraki et al. |
| 2004/0249710 A1 | 12/2004 | Smith et al. |
| 2004/0249712 A1 | 12/2004 | Brown et al. |
| 2004/0249764 A1 | 12/2004 | Delitz et al. |
| 2004/0252012 A1 | 12/2004 | Beenau et al. |
| 2004/0254837 A1 | 12/2004 | Roshkoff |
| 2004/0260607 A1 | 12/2004 | Robbins et al. |
| 2005/0004839 A1 | 1/2005 | Bakker et al. |
| 2005/0004864 A1 | 1/2005 | Lent et al. |
| 2005/0006286 A1 | 1/2005 | Fery et al. |
| 2005/0021363 A1 | 1/2005 | Stimson et al. |
| 2005/0021405 A1 | 1/2005 | Agarwal |
| 2005/0021457 A1 | 1/2005 | Johnson et al. |
| 2005/0021466 A1 | 1/2005 | Buchanan et al. |
| 2005/0023346 A1 | 2/2005 | Bakker et al. |
| 2005/0033619 A1 | 2/2005 | Barnes et al. |
| 2005/0033637 A1 | 2/2005 | Underwood |
| 2005/0033690 A1 | 2/2005 | Antognini et al. |
| 2005/0035192 A1 | 2/2005 | Bonalle et al. |
| 2005/0035847 A1 | 2/2005 | Bonalle et al. |
| 2005/0040227 A1 | 2/2005 | Schwarz |
| 2005/0040242 A1 | 2/2005 | Beenau et al. |
| 2005/0049965 A1 | 3/2005 | Jen |
| 2005/0055254 A1 | 3/2005 | Schmidtberg et al. |
| 2005/0055270 A1 | 3/2005 | Broe |
| 2005/0065877 A1 | 3/2005 | Cleary et al. |
| 2005/0071225 A1 | 3/2005 | Bortolin et al. |
| 2005/0071226 A1 | 3/2005 | Nguyen et al. |
| 2005/0071227 A1 | 3/2005 | Hammad et al. |
| 2005/0075889 A1 | 4/2005 | Gomes et al. |
| 2005/0075947 A1 | 4/2005 | Bell et al. |
| 2005/0077349 A1 | 4/2005 | Bonalle et al. |
| 2005/0080672 A1 | 4/2005 | Courtion et al. |
| 2005/0086103 A1 | 4/2005 | Agura et al. |
| 2005/0086166 A1 | 4/2005 | Monk et al. |
| 2005/0086178 A1 | 4/2005 | Xie et al. |
| 2005/0091104 A1 | 4/2005 | Abraham |
| 2005/0091138 A1 | 4/2005 | Awatsu |
| 2005/0091156 A1 | 4/2005 | Hailwood et al. |
| 2005/0096976 A1 | 5/2005 | Nelms |
| 2005/0097033 A1 | 5/2005 | Pretell et al. |
| 2005/0097034 A1 | 5/2005 | Loeger et al. |
| 2005/0097046 A1 | 5/2005 | Singfield |
| 2005/0097050 A1 | 5/2005 | Orcutt |
| 2005/0102178 A1 | 5/2005 | Phillips et al. |
| 2005/0102188 A1 | 5/2005 | Hutchison et al. |
| 2005/0102228 A1 | 5/2005 | Srinivasan et al. |
| 2005/0108090 A1 | 5/2005 | Takeda et al. |
| 2005/0108102 A1 | 5/2005 | York |
| 2005/0108151 A1 | 5/2005 | York |
| 2005/0108152 A1 | 5/2005 | Tsao Lee et al. |
| 2005/0114367 A1 | 5/2005 | Serebrennikov |
| 2005/0114883 A1 | 5/2005 | Nagai et al. |
| 2005/0116024 A1 | 6/2005 | Beenau et al. |
| 2005/0119938 A1 | 6/2005 | Smith et al. |
| 2005/0125292 A1 | 6/2005 | Kassab et al. |
| 2005/0125295 A1 | 6/2005 | Tidwell et al. |
| 2005/0125296 A1 | 6/2005 | Tidwell et al. |
| 2005/0125315 A1 | 6/2005 | Munoz et al. |
| 2005/0125337 A1 | 6/2005 | Tidwell et al. |
| 2005/0125338 A1 | 6/2005 | Tidwell et al. |
| 2005/0125339 A1 | 6/2005 | Tidwell et al. |
| 2005/0125350 A1 | 6/2005 | Tidwell et al. |
| 2005/0125351 A1 | 6/2005 | Tidwell et al. |
| 2005/0125360 A1 | 6/2005 | Tidwell et al. |
| 2005/0131761 A1 | 6/2005 | Trika et al. |
| 2005/0131792 A1 | 6/2005 | Rowe |
| 2005/0133590 A1 | 6/2005 | Rettenmyer et al. |
| 2005/0137982 A1 | 6/2005 | Michelassi et al. |
| 2005/0144059 A1 | 6/2005 | Schuessler |
| 2005/0144071 A1 | 6/2005 | Monahan et al. |
| 2005/0144074 A1 | 6/2005 | Fredregill et al. |
| 2005/0144105 A1 | 6/2005 | Czyzewski |
| 2005/0144143 A1 | 6/2005 | Freiberg |
| 2005/0149386 A1 | 7/2005 | Agura et al. |
| 2005/0149393 A1 | 7/2005 | Leof |
| 2005/0149440 A1 | 7/2005 | Michelassi et al. |
| 2005/0154664 A1 | 7/2005 | Guy et al. |
| 2005/0159986 A1 | 7/2005 | Breeland et al. |
| 2005/0160003 A1 | 7/2005 | Berardi et al. |
| 2005/0160051 A1 | 7/2005 | Johnson |
| 2005/0167342 A1 | 8/2005 | Vullriede et al. |
| 2005/0167488 A1 | 8/2005 | Higgins et al. |
| 2005/0171839 A1 | 8/2005 | Corriere |
| 2005/0171842 A1 | 8/2005 | Tien et al. |
| 2005/0171847 A1 | 8/2005 | Ling |
| 2005/0171898 A1 | 8/2005 | Bishop et al. |
| 2005/0171901 A1 | 8/2005 | Rosenblatt et al. |

(56) References Cited

U.S. PATENT DOCUMENTS

| | | |
|---|---|---|
| 2005/0177480 A1 | 8/2005 | Huang |
| 2005/0177503 A1 | 8/2005 | Thomas |
| 2005/0177523 A1 | 8/2005 | Weiss et al. |
| 2005/0179251 A1 | 8/2005 | Wagoner et al. |
| 2005/0182654 A1 | 8/2005 | Abolfathi et al. |
| 2005/0182735 A1 | 8/2005 | Zager et al. |
| 2005/0187820 A1 | 8/2005 | Mohan |
| 2005/0189427 A1 | 9/2005 | Brown et al. |
| 2005/0192862 A1 | 9/2005 | Modi |
| 2005/0197904 A1 | 9/2005 | Baron et al. |
| 2005/0199705 A1 | 9/2005 | Beck et al. |
| 2005/0199708 A1 | 9/2005 | Friedman |
| 2005/0199709 A1 | 9/2005 | Linlor |
| 2005/0203765 A1 | 9/2005 | Maritzen et al. |
| 2005/0203824 A1 | 9/2005 | Freud et al. |
| 2005/0203857 A1 | 9/2005 | Friedman |
| 2005/0205666 A1 | 9/2005 | Ward et al. |
| 2005/0209917 A1 | 9/2005 | Anderson et al. |
| 2005/0209954 A1 | 9/2005 | Asher et al. |
| 2005/0209955 A1 | 9/2005 | Underwood et al. |
| 2005/0216346 A1 | 9/2005 | Kusumoto et al. |
| 2005/0216888 A1 | 9/2005 | Drummond et al. |
| 2005/0222906 A1 | 10/2005 | Chen |
| 2005/0228751 A1 | 10/2005 | Keown et al. |
| 2005/0234769 A1 | 10/2005 | Jain et al. |
| 2005/0234771 A1 | 10/2005 | Register et al. |
| 2005/0234773 A1 | 10/2005 | Hirst et al. |
| 2005/0234789 A1 | 10/2005 | Czyzewski et al. |
| 2005/0234833 A1 | 10/2005 | VanFleet et al. |
| 2005/0240474 A1 | 10/2005 | Li |
| 2005/0240477 A1 | 10/2005 | Friday et al. |
| 2005/0242179 A1 | 11/2005 | Warwick |
| 2005/0246289 A1 | 11/2005 | Alexander et al. |
| 2005/0246627 A1 | 11/2005 | Sayed |
| 2005/0251446 A1 | 11/2005 | Jiang et al. |
| 2005/0251470 A1 | 11/2005 | Sultivan |
| 2005/0256794 A1 | 11/2005 | Colby |
| 2005/0256802 A1 | 11/2005 | Ammermann et al. |
| 2005/0261916 A1 | 11/2005 | McCall et al. |
| 2005/0261955 A1 | 11/2005 | Humble et al. |
| 2005/0261995 A1 | 11/2005 | Phelan |
| 2005/0267800 A1 | 12/2005 | Tietzen et al. |
| 2005/0269396 A1 | 12/2005 | Schofield |
| 2005/0273386 A1 | 12/2005 | Weidner |
| 2005/0273387 A1 | 12/2005 | Previdi |
| 2005/0273425 A1 | 12/2005 | Yamazaki |
| 2005/0278215 A1 | 12/2005 | Seele, Jr |
| 2005/0283429 A1 | 12/2005 | Bates et al. |
| 2005/0283437 A1 | 12/2005 | McRae et al. |
| 2005/0288998 A1 | 12/2005 | Venna et al. |
| 2005/0289003 A1 | 12/2005 | Thompson et al. |
| 2005/0289051 A1 | 12/2005 | Allin et al. |
| 2006/0004629 A1 | 1/2006 | Neemann et al. |
| 2006/0004650 A1 | 1/2006 | Mittenzwei et al. |
| 2006/0010033 A1 | 1/2006 | Thomas |
| 2006/0010034 A1 | 1/2006 | Sparks |
| 2006/0011719 A1 | 1/2006 | Lehtonen et al. |
| 2006/0015463 A1 | 1/2006 | Gupta et al. |
| 2006/0020507 A1 | 1/2006 | Sagey |
| 2006/0026073 A1 | 2/2006 | Kenny et al. |
| 2006/0026092 A1 | 2/2006 | Klein et al. |
| 2006/0031718 A1 | 2/2006 | Thornhill et al. |
| 2006/0035444 A1 | 2/2006 | Nakamura et al. |
| 2006/0036553 A1 | 2/2006 | Gupta et al. |
| 2006/0039733 A1 | 2/2006 | Meyerhofer |
| 2006/0041540 A1 | 2/2006 | Shannon et al. |
| 2006/0047573 A1 | 3/2006 | Mitchell et al. |
| 2006/0053056 A1 | 3/2006 | Alspach-Goss et al. |
| 2006/0064329 A1 | 3/2006 | Abolfathi et al. |
| 2006/0080230 A1 | 4/2006 | Freiberg |
| 2006/0080243 A1 | 4/2006 | Kemper et al. |
| 2006/0080254 A1 | 4/2006 | Chigira et al. |
| 2006/0095350 A1 | 5/2006 | Hall et al. |
| 2006/0095358 A1 | 5/2006 | Viarengo et al. |
| 2006/0106650 A1 | 5/2006 | Bush |
| 2006/0106717 A1 | 5/2006 | Randle et al. |
| 2006/0116903 A1 | 6/2006 | Becerra |
| 2006/0131869 A1 | 6/2006 | Brignull |
| 2006/0136335 A1 | 6/2006 | Ferguson, III |
| 2006/0143077 A1 | 6/2006 | Prorock |
| 2006/0143117 A1 | 6/2006 | Chigira et al. |
| 2006/0149671 A1 | 7/2006 | Nix et al. |
| 2006/0155554 A1 | 7/2006 | Mo |
| 2006/0161478 A1 | 7/2006 | Turner et al. |
| 2006/0161501 A1 | 7/2006 | Waserstein et al. |
| 2006/0167989 A1 | 7/2006 | Bashen et al. |
| 2006/0178986 A1 | 8/2006 | Giordano et al. |
| 2006/0206427 A1 | 9/2006 | Love et al. |
| 2006/0251478 A1 | 11/2006 | Desmeules |
| 2006/0259364 A1 | 11/2006 | Strock et al. |
| 2006/0259390 A1* | 11/2006 | Rosenberger .................. 705/35 |
| 2006/0282389 A1 | 12/2006 | Gupte |
| 2006/0287953 A1 | 12/2006 | Chauhan |
| 2007/0005498 A1 | 1/2007 | Cataline et al. |
| 2007/0078719 A1 | 4/2007 | Schmitt et al. |
| 2007/0118470 A1 | 5/2007 | Warren et al. |
| 2007/0138255 A1 | 6/2007 | Carreon et al. |
| 2007/0156530 A1 | 7/2007 | Schmitt et al. |
| 2007/0198404 A1 | 8/2007 | Hirka |
| 2007/0265924 A1 | 11/2007 | Schwarz |
| 2007/0288334 A1 | 12/2007 | Creedle et al. |
| 2008/0010202 A1 | 1/2008 | Schwarz |
| 2008/0116283 A1 | 5/2008 | Newbrough et al. |
| 2008/0133350 A1 | 6/2008 | White et al. |
| 2008/0177659 A1 | 7/2008 | Lacey et al. |
| 2008/0193008 A1 | 8/2008 | Mount et al. |
| 2008/0262915 A1 | 10/2008 | Gojkovic et al. |
| 2009/0043651 A1 | 2/2009 | Schwarz |
| 2009/0112639 A1 | 4/2009 | Robinson |
| 2009/0171778 A1 | 7/2009 | Powell |
| 2009/0313110 A1 | 12/2009 | Asai et al. |
| 2010/0057551 A1 | 3/2010 | Blaisdell |
| 2010/0057553 A1 | 3/2010 | Ameiss et al. |
| 2010/0153199 A1 | 6/2010 | Ahmad |

FOREIGN PATENT DOCUMENTS

| | | |
|---|---|---|
| EP | 1014318 | 6/2000 |
| JP | 2000029963 | 1/2000 |
| JP | 2001-266039 | 9/2001 |
| JP | 2002-24618 | 1/2002 |
| JP | 2002-056063 | 2/2002 |
| JP | 2002-083241 | 3/2002 |
| JP | 2002-087536 | 3/2002 |
| JP | 2002-508547 | 3/2002 |
| JP | 2002-140505 | 5/2002 |
| WO | WO 91/16691 | 10/1991 |
| WO | WO 93/08545 | 4/1993 |
| WO | WO 94/28497 | 12/1994 |
| WO | WO 96/08783 | 3/1996 |
| WO | WO 96/12242 A1 | 4/1996 |
| WO | WO 97/14108 | 4/1997 |
| WO | WO 97/45796 | 12/1997 |
| WO | WO 97/45814 | 12/1997 |
| WO | WO 98/09260 | 3/1998 |
| WO | WO 99/10823 | 3/1999 |
| WO | WO 99-54841 | 10/1999 |
| WO | WO 00/18060 | 3/2000 |
| WO | WO 00/39979 | 7/2000 |
| WO | WO 01/75730 A2 | 10/2001 |
| WO | WO 02/063432 A2 | 8/2002 |
| WO | WO 2004/079603 | 9/2004 |
| WO | WO 2008/021381 | 2/2008 |
| WO | WO 2008/021382 | 2/2008 |

OTHER PUBLICATIONS

ABA Banking Journal, Wholesale lockbox imaging, Feb. 1, 1993 acs01039331.

Alleman, Risk Assessment—Risk Assessment Template for Software Development or Acquisition Projects, Revision D, Niwot Ridge Consulting, Feb. 20, 2001.

(56) References Cited

OTHER PUBLICATIONS

Andersen Consulting, Image-based transaction processing—The banking industry's challenge for the 1990s and beyond, American Bankers Association, 1989 acs01039270.
Anonymous, Brink's Selects NetDeposit as Remote Capture Partner, Today, Oct. 2004, vol. 26, Iss. 5, p. 8.
Anonymous, Chase offers image lockbox for Europe, Bank Systems & Technology, Aug. 1997 acs01039336.
Arend, Bank Applications Fuel Optical Storage Market, ABA Banking Journal, Oct. 1991 acs01039000.
Aubert et al., Assessing the Risk of IT Outsourcing, Proceedings of the 31st Hawaii International Conference on System Sciences, 1998, pp. 685-692.
Bank News, Opening the mail—Simultaneous Image Capture, BN New Solutions, Oct. 1996 ACS01066104.
Buckley et al., Processing Noisy Structured Textual Data Using a Fuzzy Matching Approach Application to Postal Address Errors, Soft Computing, BNS, XP-001132075 pp. 195-205 (11 pages) Dec. 2000.
Business Publications, Chapter Reports Texas Chapter, Work Process Improvement Today, Apr. 1998 ACS01066110.
Business Publications, Wassau Financial Systems' ImageRPS and OPEX Interface a Perfect Math, Work Process Improvement Today, Dec. 1997 acs01066108.
Business Wire, 1A Corp. wins contract with comerica to install the first digital all items archive, one of nation's top 25 bank holding companies expects to streamline operations, Jan. 9, 1997 acs01039033.
Business Wire, Alabama department of revenue selects Unisys for imaging solution to speed tax returns, save taxpayers money, Sep. 6, 1995 acs01039064.
Business Wire, BancTec selects alchemy CD-Based archival solution for remittance processing system, May 6, 1998 acs01039047.
Business Wire, Caere introduces the Model 1800 document remittance processor, Oct. 19, 1995 acs01039057.
Business Wire, Crestar to introduce new advanced cash management system based on IA Corp. software, Oct. 28, 1996 acs01039059.
Business Wire, DMP and IMR Partner to develop electronic archiving solution for wholesale Lockboxes and remittance processing, Mar. 24, 1998 acs01039040.
Business Wire, IA announces installation at QuestPoint of first client/server cash management system with check image storage compatible with IBM, NCR and Unisys, May 29, 1997 acs01039044.
Business Wire, IA Corp. announces new CheckVision products new CheckVision archive software supports short, Apr. 1, 1996 acs01039339.
Business Wire, IA Corp. shows complex transaction processing software Work vision at AIIM, plus Check Vision and Remit Vision application frameworks for new advanced banking services, Apr. 14, 1997, acs01039025.
Business Wire, IA Corporation becomes a major player in image-based cash management solutions, Nov. 24, 1995 acs01039052.
Business Wire, IA presents new advanced cash management software at TMA to link banks and their corporate customers, Nov. 18, 1996 acs01039049.
Business Wire, IA's remit vision adopted by Harris Bank for CD-ROM and online customer viewing of check and remittance documents, May 28, 1996 acs01039042.
Business Wire, NCR introduces 7780 item processing system image-based system scans and reads documents, Mar. 11, 1992, acs01039038.
Business Wire, Shawnut bank provides lockbox customers real-time, on-line electronic exception processing, 1A Corp's image-based lockbox system cuts processing time from days to minutes, Jan. 9, 1996 acs01039031.
Business Wire, State of Minnesota using AT&T imaging solution to reengineer sales tax paying process, Apr. 18, 1994 acs01039027.
Card Flash Daily Payment Card News, www.cardweb.com, printed Sep. 23, 2004.
Clements, Harsh Truth Your Investments Likely Won't Make Any Money, Investors are Going Nowhere Fast, The Wall Street Journal, Nov. 27, 2002.
Fitch, Image Technology Brings Lockbox Breakthroughs, Corporate Cashflow Magazine, Sep. 1995 acs01039344.
Friis, M. William Goodbye to paper? ABA Banking Journal, Mar. 1989 acs01037874.
Goodson, BankSery Thomson Alliance Supports Bankserv's Echeck Service, Worldwide Videotext Update, Boston, May 1, 2000, vol. 19, Iss. 5, p. 1.
Grading System and Other Regulations—Course Information Suite, Programs of Study, 1997-1999, University of Illinois at Urbana-Champaign, at courses.illinois.edu/cis/programs/urbana/1999/gradings_system.html, (6 pgs).
IEM Product Description, Opex Image Export Module, Opex Process, Jun. 24, 1998 ACS01066106.
Jensen, U.S. Bank Effectively Manages Complexity, Business Publications, May/Jun. 2006 acs01039400.
Jensen, U.S. Bank Effectively Manages Complexity, Business Publications, May/Jun. 2006, acs01039398.
Jensen, U.S. Bank Effectively Manages Complexity, Data-Intensive Government Services Application, Business Publications, May/Jun. 2006 acs01039402.
Joachim, Sparing Paper Checks That Last Trip to the Bank, The New York Time, Nov. 9, 2008, p. C6.
JP Morgan Chase, Chase Image-Enables NY Wholesale Lockbox Facility with Vicor Technology, Chase Press Release, Aug. 31, 1999 acs01039406.
Keeton, Bank of America Completes its Rollout of 'Paperless' Processing of Payments, Wall Street Journal, Nov. 1, 1999 acs01039334 (Vicor 2007).
Khoury, Sarkis, International Banking a Special Look at Foreign Banks in the US, J. Intl Business Studies, vol. 10, No. 3, (Winter 1979), pp. 36-52.
Laryea, Payment for Paperless Trade—Are the Viable Alternatives to the Documentary Credit?, Law and Policy in International Business, Fall 2001, vol. 33, No. 1, pp. 3-49.
Malykhina, Cell Phone Software Formats Checks for Online Banking, InformationWeek, Jan. 24, 2008 (www.informationweek.com/story/showArticle.jhtml?articleID=205917977).
Marjanovic, NationsBank offers lockbox imaging, Business & Company Resource Center, American Banker, vol. 160, n126, Jul. 3, 1995 acs01039350.
Matyas, Digital Signatures—An Overview, Computer Networks 3, pp. 87-94 (1979).
McKendrick, Not Yet a Sign of the Times, Credit Card Management, Apr. 1999 (5 pages).
Mead, Two Banks' Imaging Deals Target Fee Revenue Increases, The American Banker, May 9, 1997 acs01039019.
Miller, Online Auctions, Que, pp. 271-272, (date unknown).
Moyer, Bank of Montreal to Install Imaging System by Unisys for Retail Lockbox Services, The American Banker, Oct. 22, 1996 acs01039023.
Moyer, KeyCorp Joins Trend to Check Imaging for Lockbox, The American Banker, Aug. 23, 1996 acs01039004.
National Automated Clearing House Association (NACHA), Business-to-Business EIPP Presentment Models and Payment Options Part One—Presentment Models, Jan. 2001, Counsel for Electronic Billing and Payment, (cebp.nacha.org).
Non-Final Office Action Summary in U.S. Appl. No. 09/809494 mailed Mar. 9, 2006.
Patterson, Overcoming the Float Time in Electronic Payment Use, Network World, Aug. 28, 1989, Opinion, Electronic Funds Transfer, p. 31 (2 pages).
Phillips Business Information, NationsBank rolls out first wholesale lockbox imaging, Item Processing Report, Potomac, Aug. 3, 1995 acs01039351.
PR Newswire, Kelly Services Implements Image-Based Billing System for Customers, PR Newswire, Financial News, May 13, 1991 (1 page).
PR Newswire, PNC Bank Adds Chicago to National Lockbox Network, Nov. 5, 1997.
Price et al., U.S. Appl. No. 60/133,577, filed May 11, 1999.

(56) References Cited

OTHER PUBLICATIONS

Schutzer, Get Ready for Electronic Commerce, ABA Banking Journal, Jun. 1995 acs01038994.
Shannon, John, Shannon, New lockbox platform due out at NationsBank, Bank Systems & Techology, vol. 35, Iss. 2, Feb. 1998 acs01039384.
Stanley et al., Bank of America Provides Nationwide Iimage Lockbox Services, Bank of America Press Release, Oct. 20, 1999 acs01039405.
Tauhert, Lockbox Solutions Reengineer Payments, Insurance & Technology, Aug. 1996 acs01039337.
Theisen, Retail Lockbox Check Conversion, Today, Boston, Dec. 2002, vol. 24, Iss. 6, p. 34 (6 pages).
Tsay, Electronic Data Interchange—A Challenge for Management Accountants, CMA ManageMent Accounting Magazine, Aug. 1993, p. 19-22.
Urrows et al., Automated Imaging in Financial Services, Document Image Automation, Sep.-Oct. 1991, vol. 11 No. 5, p. 259.
USPTO Classification Section for Class 705—Data Processing Financial, Business Practice, Management or Costs/Price Determination, Mar. 25, 2009 (4 page).
West, The Real Scoop About Merchant Account Rates & Fees, CDGcommerce, Jun. 21, 2004.
Hunt, Robert M., An Introduction to the Economics of Payment Card Networks.
Annual Report Pursuant to Sectin 13 or 15(d) of The Securities Exchange Act of 1934, Form 10-K, Intelidata Technologies Corporation, Fiscal Year Ended Dec. 31, 2001.
Blockbuster running test of a stored value card, The American Banker, Sep. 1, 1995.
CES/NaBANCO introduces stored value card technology blockbuster video is first merchant partner, Business Wire, Inc., Jan. 15, 1996.
Anonymous, Chase Manhattan introduces new FEDI payables product, ProQuest document ID: 7806951, ISSN/ISBN: 02686635, May 1995.
Bills, Chase Pact Done, What's Next for Web Vendors?, The American Banker, Technology Section, Jun. 3, 2002, p. 23.
Reinbach, Chase steps up treasury system, ProQuest documednt ID 8723558, ISSN/ISBN: 10459472, Nov. 1995.
Anonymous, Chasing the global trend, Cash Management News, proQuest document ID 9319923, ISSN/ISBN: 02686635, Dec. 1995.
Malhotra, Clearing House Enumerates e-Payments Ills, The American Banker, vol, 167, No. 154, Aug. 23, 2002.
Marjanovic, Corporate Services: Chase Gears Up Global Payments System Series: 16, The American Banker, vol. 160, Issue 174, Sep. 11, 1995, p. 41.
Gluck, Creating a Global Cash-Management Game Plan, Bank Systems & Technology, Feb. 1997, p. 28.
Lamond, Credit Card Transactions Real World and Online, Paying by Credit Card-Real World and Online, http://www.virtualschool.edu/mon/ElectronicProperty/klamond/credit, printed Jul. 8, 2005, 17 pages.
Lamond, Keith, Credit Card Transactions Real World and Online, http://www.virtualschool.edu/mon/ElectronicProperty/klamond/credit_card.htm, pp. 1-17, printed Jul. 8, 2005.
Dialog file 20, #10279554; Offer: Book Yourself Free Cassettes; Mar. 25, 2000; Birmingham Post, p. 16.
Du Pont's Electronic Payments, Corporate EFT Report, v9, n1, Dialog file 636, Accession No. 01066902, Jan. 11, 1989.
Carreker, Electronic check presentment: Capturing new technology, http://proquest.umi.com, Banking Management, Rolling Meadows: vol. 71, Issue 2, Mar./Apr. 1995, p. 32, 5 pages.
Fidelity Helps Fund Sellers Trim the Taxes They'll Owe, The Wall Street Journal, Nov. 7, 2002.
First Data markets stored-value cards, Cards International, Jan. 30, 1996, p. 5.
Norris, First data unit develops blockbuster cash card, Omaha World Hearld Sunrise Edition, Business Section, Jan. 19, 1996, p. 16.
Harsh Truth: Your Investments Likely Won't Make Any Money. Money, Initial Launch to 200 Credit Unions, USA Today.com, Jun. 27, 2002.
Decovny, Net Scope, Banking Technology, May 1997.
Nokia Announces the World's First NFC Enabled Mobile Product for Contactless Payment and Ticketing, PRNewswire, Feb. 9, 2005.
Armstrong, Douglas, Norwest eases difficulty of Interstate banking Bank's customers may use the same account number at any branch.
Goode, On Profit, Loss and the Mysteries of the Mind, The New York Times, Nov. 5, 2002.
Anonymous, Operating in a multi-currency environment, ProQuest document ID 9215937, ISSN/ISBN 09589309, Oct. 1995.
Maher and Troutman, Payor's Prescription for Painless Migration to Electronic Healthcare Payments and Remittance Advices, PNC Bank, Dec. 2001.
Maturi, Richard, Personal Finance; When you Need to Send Cash in a Flash.
Press Release, Mar. 5, 2004, Payment Data Systems Files Patent on Debit Card Payment Solution, American City Business Journals, Inc., Mar. 5, 2004.
Maher and Troutman, Provider's Prescription for Painless Migration to Receipt of Electronic Healthcare Payments and Remittance Advices, PNC Bank, Dec. 2001.
Anonymous, Systems spell change for foreign exchange, Global Investor, ProQuest document ID 1056152B, ISSN/ISBN: 09513604, Nov. 1996.
French, Tech Stocks: Market Movers, Investors Worry CheckFree Being Chased from Its Own Game, http://www.thestreet.com, Jun. 20, 2002.
Technology, In Brief Wachovia-InteliData Deal, May 7, 2002.
Zuckerman, The Hedge-Fund Craze, The Wall Street Journal, Jun. 12, 2002.
McDonald, The Stars in the Sky Flicker, and Fund Stars Do the Same, The Wall Street Journal, Jan. 15, 2003.
Anonymous, Visa & Carnegie Mellon Plan Online Payment Scheme, Newsbyte News Network, Feb. 15, 1995.
Financial News, Wells Fargo Rolls Out Nationwide Lockbox Check Conversion, PR Newswire Association, Apr. 22, 2003.
Terrie Miller and Henry Yan, When Custody Governs, Benefits Canada, Toronto, Feb. 1998, vol. 22, Issue 2, p. 33, 5 pages.

* cited by examiner

SYSTEM AND METHOD FOR PROCESSING TRANSACTIONS USING A MULTI-ACCOUNT TRANSACTIONS DEVICE

RELATED APPLICATIONS

This application claims priority to United States provisional patent application titled "System and Method for Processing Transactions Using Multi-Account Transactions Device," filed on Jan. 11, 2008, and assigned Application Ser. No. 61/006,408. This application is also a continuation-in-part of, and claims priority to, United States utility patent application titled "System and Method for Processing Transactions Using a Multi-Account Transactions Device," filed on Dec. 31, 2007, and assigned application Ser. No. 11/968,018.

This application is also related to the following United States patent applications and patents: (1) the application titled "Multiple Account Advanced Payment Card And Method of Routing Card Transactions," filed on Jul. 24, 2002 and assigned Ser. No. 10/201,589 (provisional: 60/307,179, filed on Jul. 24, 2001) and all applications that claim priority thereto, (2) the application titled "Selectable Multi-Purpose Card," filed on Dec. 6, 2000 and assigned application Ser. No. 09/730,399 (now issued U.S. Pat. No. 6,631,849), and all patents and patent applications that claim priority thereto, and (3) design patent application Ser. Nos. 29/303,981 (titled "Folding Transaction Device"), 29/303,983 (titled "Pivoting Transaction Device"), 29/303,978 (now issued as D576,671) (titled "Overlapping Transaction Device"), and 29/303,976 (titled "Transaction Device"), all filed on Feb. 21, 2008.

The drawings and specifications of the above patent applications are hereby incorporated by reference in their entirety.

FIELD OF THE INVENTION

The present invention relates to systems and methods for processing transactions using a multi-account transactions device. More particularly, the present invention relates to systems and methods that enable customers of a financial institution, for example, to selectively determine which account(s) are to be used for a given transaction, wherein such selection may occur before, during, or after the transaction has been processed and posted to a particular account(s).

BACKGROUND

Many point-of-sale and other financial transactions take place using card transactions. In these transactions, to provide payment a card user typically presents a credit card, a bank, debit or automated teller machine (ATM) card, or possibly a stored value card. The cards presented are conventionally of one and only one of these types. In addition, the cards presented typically access only a single account.

For example, a user may present a credit card to pay from a credit account maintained by the issuer of the card. The credit card is typically embossed with a unique account number, the cardholder's name, and the expiration date of the card. Data is also encoded on a magnetic stripe on the card. The data identifies the cardholder's account and may be accessed by magnetic card readers connected to a credit card processing system.

An ATM card is used in similar manner. The ATM card is a plastic card that is typically embossed with an account number and the holder's name. The ATM card also includes data encoded on a magnetic stripe of the card. The data identifies the cardholder's account and may be accessed by a magnetic card reader to use the card.

A stored value card is typically used to pay for a specific product or service. The stored value card includes data regarding a limited use account that is limited to providing payment for a specific product or service or for products and services at a specific merchant. The data permits processing equipment at the point of sale to determine the value of funds in the account.

In a typical card payment transaction, for example a credit card transaction, a buyer presents a credit card to a merchant at the point of sale. The apparatus at the point of sale reads account information from the card and passes this information along through a chain of processors where approval is obtained and the transaction posted and charged to the customer's account. The card holder's credit account balance is increased by an amount equal to the amount of the transaction. A similar process occurs for debit or stored value card transactions, except of course the transaction amount is immediately deducted from the card holder's account that is associated with the debit or stored value card.

Typically, once a transaction has been charged and posted to a particular account, the card holder must make payment on the account in order to clear the balance. For debit and stored value transactions this occurs immediately, whereas for credit transactions interest may accrue on outstanding balances until such time as full payment is made. In either case, current systems and methods do not permit the card holder to selectively transfer some or all of the outstanding balances in a given account, such as a credit account, for example, to another account, such as a debit account, for example, on a transaction by transaction basis to achieve a benefit, obtain a reward or better organize and administer the card holder's transactions and payments.

SUMMARY OF THE INVENTION

According to various embodiments, the systems and methods described herein may, among other things, allow a customer of a financial institution, for example, to enter into purchase transactions with a single card or other device and selectively determine which account(s) the transaction is to be applied to. In some embodiments, customers may control transaction spending and payments by allocating purchases to particular account(s) at the point-of-sale (POS), then selectively reallocating some or all of the transaction amounts to other account(s) on an ongoing and as needed basis. In some embodiments, the systems and methods described herein may allow card holders, for example, to allocate purchases when and where they spend into meaningful categories of their choosing. For example, select transactions can be paid immediately (e.g., through a debit account), while other transactions are paid at the end of the month (e.g., processed at the POS through a credit account). The customer may, in some embodiments, select which account(s) a transaction(s) should be applied to after the transaction has been entered into. That is, the customer may select the appropriate accounts after the point-of-sale, such as, for example, a few days after the transaction when the customer has had time to consider which account(s) would be better to use for the transaction.

For example, a customer may have three accounts: (1) a business account, (2) a personal or home account, and (3) an entertainment account. For each given transaction the customer enters into, the appropriate account(s) may be selected, either by the customer: (1) at the POS (e.g., the customer swipes a corresponding card, magnetic stripe or initiates another account identifier corresponding to the desired account(s)), (2) according to rules and parameters that may have been predetermined by the card holder, merchant, financial institution, or any other individual or entity that may be involved in the processing of customer transactions), or (3) after the transaction is entered into e.g., after the point-of-sale or online transaction). In some embodiments, more than one account may be selected. Once accounts are selected, the transaction amount is processed and posted accordingly. In some embodiments, the accounts and/or applications associated with a particular card or device are all maintained by a single or any number of financial institutions, such as a bank, for example. In some embodiments, the accounts and/or applications associated with a particular card or device are all maintained by any number of financial institutions. For example, a customer may have multiple credit card accounts (with the same or different financial institutions) that the customer may desire to use for different transactions. Using the systems and methods described herein, the customer may selectively determine which transactions should be applied to which credit card accounts. The different credit card accounts may, for example, have varying rates (e.g., a business account may have a lower rate than a personal account) or rewards program associated therewith. For example, if a customer has a credit card with a rewards program that would reward more points for a certain type of transaction, the customer may wish to use that account over another credit card that has a rewards program that would not reward as much.

Similarly, a customer may have a plurality of accounts having different currencies (e.g, a German bank account, a U.S. bank account and a Mexican bank account). Using the systems and methods described herein, a customer may select accounts based on the currency of the transaction, which account would offer the best exchange rate or any other factor or consideration that may go into selecting an account to use for a given transaction. For example, a transaction made in Germany may be applied to the German account. Alternatively, a transaction made in Germany may be applied to the U.S. account if the applicable exchange rate makes it desirable for the customer to make payment in dollars rather than in deutsche marks.

After the transaction has been processed and/or posted, the customer may selectively reallocate some or all of a transaction amount, for example, to another account(s). For example, if the purchase of a $100.00 fax machine was initially charged to the card holder's personal or home account, the various systems and methods described herein may permit the card holder, for example, to select another account (e.g., the business account) to which some or all of the $100.00 should be transferred to. In some embodiments, the card holder may make the selection upon realizing the expense relates to his business and therefore should be transferred to the corresponding account(s). In some embodiments, the card holder may request transfer after the transaction amount has been processed an posted to an initial account. In some embodiments, the transfer request to the business account may be initiated by rules or parameters that direct transfer to particular accounts based on particulars of the transactions, such as, for example, the transaction date, transaction amount, merchant, product or service purchased, or any other data or information that may relate to a given transactions. If a customer does not make an account selection by a particular time (e.g., within 1 week of entering into a transaction), the transaction may be posted to a buffer, holding, default or temporary account. The buffer, holding or temporary account may be pre-determined by the customer, such as, for example, the customer's debit or savings account. This way, if the customer forgets to make an account designation after entering into a transaction, the transaction amount may be posted to the customer's debit or savings account. The customer may, of course, subsequently change the account if desired.

In some embodiments, account selection may be processed on an item-by-item basis, such as, for example, on the basis of the particular product(s) or service(s) purchased. For example, if a customer purchases clothing, electronic audio equipment and office supplies at a particular retailer, the systems and methods described herein may select an appropriate account(s) to which the transactions should be processed based on the identity of the retailer, while in some embodiments account(s) may be selected on an item-by-item basis. Thus, the clothing portion of the transaction may be assigned to the personal or home account, the electronic audio equipment may be assigned to the entertainment account, and the office supplies may be assigned to the business account. In some embodiments, account selection may be made by the card holder or other individual or entity with knowledge of the transaction amounts for each item purchased, while in some embodiments account(s) are selected based on transaction data or information that may be used to identify particular items or services purchased, such as for example, the SKU or other identifier.

The systems and methods described herein may also provide purchase perks. For example, a customer may be rewarded reward points or other value for selecting an account at the point-of-sale rather than making the selection after the transaction (e.g. later that day or week after the transaction). Other value that the customer may be provided include a lower purchase rate (e.g., a 5% rate for selecting the account at the POS, whereas a 10% rate would apply for selecting the account after the POS. Likewise, a customer may be charged a fee for making an account selection after the point-of-sale. For example, the customer may be charged a $1.00 for being able to select the account anytime within a week after the transaction. The fee may be increased if the customer fails to make the selection within a week. Other fee arrangements are of course possible.

In some embodiments, the various systems and methods described herein may incorporate a physical device (e.g., card, RFID, biometric, or other identifier) that enables a customer to selectively determine which account(s) a transaction is to be posted to. In some embodiments, the physical device may comprise portions that are interconnected by a hinge such that the two portions can fold upon themselves. In some embodiments, the device may include a closing mechanism that can keep the two portions of the device in a closed (e.g., a locked) position. In some embodiments, the thickness of the closed card is similar to current cards (e.g., each portion of the card is half as thick as current cards). In some embodiments, each portion of the device may have multiple account identifiers (e.g., magnetic stripes) on either side, for example, that can be initiated to designate the corresponding account(s). For example, a card holder or merchant may initiate (e.g., swipe a magnetic stripe) at least one account identifier to designate at least one account to which the transaction should be posted.

In some embodiments, metallic substrates may be used to shield cards and expose only one stripe at a time. In some embodiments, an interface may allow the consumer to color-code cards or account identifiers, enabling one to be for social transactions and the other for business purposes, for example. Alternatively, one could be credit and the other debit. Cards may also be customized to a particular card holder's needs and preferences.

In some embodiments, particular cards may have sub-categories associated with it. For example, a card or device may have associated with the following types or categories of accounts: personal, business expense, small business, fuel/transportation, charity, entertainment, food, children, or any other type or category of account that a user may designate or desire to utilize and implement. The designation of categories may of course change as the user's needs evolve. In some embodiments, thresholds can be established for particular cards. For example, the user may specify that an account devoted to entertainment be capped at a certain threshold so that the user may control frivolous or non-essential spending. A transaction may be declined if it goes beyond the threshold. In some embodiments, a user may be alerted when a set threshold is being approached. In some embodiments, a user may be recognized for complying with or staying within predetermined thresholds. For example, a user may be rewarded with discounts or other incentives or promotions for not surpassing the thresholds. Other limitations may of course be imposed, such as, for example, date/time parameters on when certain accounts may be used, merchants where accounts may be used at, and the types of products or services that can be purchased with certain accounts. Other parameters are of course possible.

In some embodiments, the systems and methods described herein may provide certain attributes as well as alerts or notifications to a user. For example, in some embodiments, the various systems and methods described herein may contain the following alert/notifications or attributes: (1) ability to set personal allowances that trigger status alerts on the go; (2) ability to compare spending patterns over time; (3) beat your best—a feature that brings a playful tone to self check-ins (you vs. you); (4) ability to benchmark you vs. (aspirational others); (5) metrics for gauging progress; and (6) ability to choose between debit or credit (pay now vs. pay later).

In some embodiments, the various devices disclosed herein may also incorporate buckets or sub-accounts that a user may selectively engage to conduct a particular transaction or transactions. For example, a magnetic strip described herein may contain any number of buckets, each of which may be specifically designated for select transaction(s). For example, a bucket may correspond to gasoline purchases, while another may be designated for purchases for a particular person or individual, small business, etc. Any designation or category is of course possible. In some embodiments, a bucket may be a stand-alone account, or may comprise a sub-account of a designated account. For example, a particular account may be associated with any number of buckets or sub-accounts that may be used for particular or designated transactions. As used herein, the term account may correspond to an account, bucket or sub-account.

According to one embodiment of the systems and methods described herein, a multi-account transaction device is provided. The multi-account transaction device, comprising: a top portion having a front side and a back side, wherein the front side includes a first account and the back side includes at least one identifier associated with a second account; a bottom portion having a front side and a back side, wherein the front side includes the second account and the back side includes at least one identifier associated with the first account; and a hinge connecting the top portion to the bottom portion, wherein the top and second portions are relatively movable between a first closed position where the top portion displays the first account and the bottom portion displays the at least one identifier associated with the first account and a second closed position where the top portion displays the at least one identifier associated with the second account and the bottom portion displays the second account. The customer may selectively determine, before, during or after a transaction, an initial account selection to which the transaction is to be posted. The customer may subsequently change the initial account selection.

In another embodiment of the systems and methods described herein, a multi-account transaction device. The device comprising: a top portion having a front side and a back side, wherein the front side includes account information and the back side includes a first identifier associated with a first account number and a second identifier associated with a second account number, and wherein the top portion further comprises a window; a bottom portion having a front side and a back side, wherein the front side includes the first account number and the second account number and the back side includes additional account information; and a pivoting means connecting the top portion to the bottom portion, wherein the top and second portions are relatively movable between a first position where the first account number is displayed through the window of the top portion and the back side of the top portion displays the first identifier and a second position where the second account number is displayed through the window of the top portion and the back side of the top portion displays the second account number and the back side of the top portion displays the second identifier. The customer may selectively determine, before, during or after a transaction, an initial account selection to which the transaction is to be posted. The customer may subsequently change the initial account selection.

In still another embodiment of the systems and methods described herein, a multi-account transaction device is provided. The device comprising: a top portion having a front side and a back side, wherein the front side includes account information and the back side includes a first identifier associated with a first account number and a second identifier associated with a second account number; a bottom portion having a front side and a back side, wherein the front side includes the first account number and the second account number and the back side includes additional account information; and a sliding means connecting the top portion to the bottom portion, wherein the top and second portions are relatively movable between a first position where the first account number is displayed by the front side of the bottom portion and the back side of the top portion displays the first identifier and a second position where the second account number is displayed by the front side of the back portion and the back side of the top portion displays the second account number and the back side of the top portion displays the second identifier. The customer may selectively determine, before, during or after a transaction, an initial account selection to which the transaction is to be posted. The customer may subsequently change the initial account selection.

In another embodiment of the invention, a transaction device is provided. The transaction device comprising: a display screen; a interaction element for enabling a user to cycle through a plurality of accounts and select at least one account to use in a transaction, wherein the at least one account is selected at the point of sale, after the transaction, or based upon predetermined rules or selections; an input/output element for permitting communication with a terminal or device; and at least one storage device for storage account or transaction particulars. The customer may, for example, selectively determine, before, during or after a transaction, an initial account selection to which the transaction is to be posted. The customer may subsequently change the initial account selection Other embodiments may also be considered.

DETAILED DESCRIPTION OF EXEMPLARY EMBODIMENTS

Figure 1:
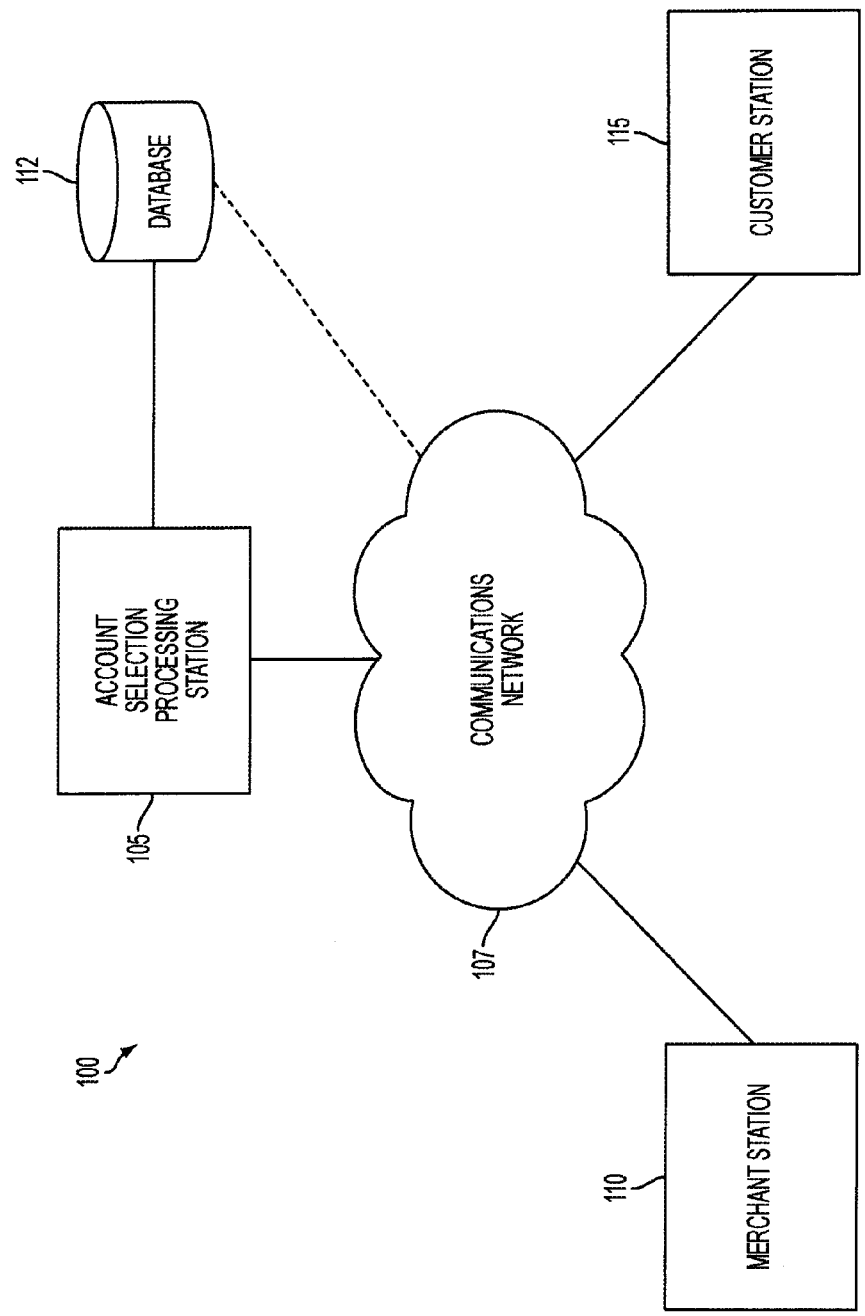
FIG. 1 shows an exemplary system 100 for processing transactions, according to various embodiments of the invention.

Reference will now be made to the present preferred embodiments of the invention, examples of which are illustrated in the accompanying drawings in which like reference characters refer to corresponding elements.

While the exemplary embodiments illustrated herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Among many potential uses, the systems and methods described herein may be used to: (1) induce customer loyalty by providing flexible payment and account selection options; (2) allow customers to make purchases and enter into transactions using a single financial instrument and selectively determine which account(s) a particular transaction should be posted to; (3) allow merchants, banks, financial service providers, instrument issuers or other entity a system and method for dynamically selecting account(s) to which a customer's transactions should be posted based on, for example, predetermined rules or parameters; (4) allow card holders, for example, the ability to change their minds on which accounts a particular transaction should be posted to, even after the transaction has already been posted to an account; (5) allow card holders, for example, the ability to predetermine rules or parameters setting forth to which accounts particular transactions should be posted to; (6) allow card holders, for example, to selectively designate portions of a transaction (e.g., transaction amount) to select account(s); (7) provide a user with relevant alerts and notifications. Other uses are possible.

FIG. 1 illustrates a system 100 for processing transactions, according to one embodiment of the invention. System 100 may comprise a account selection processing station 105 for processing transactions associated with any number of account(s). In some embodiments, transactions may be posted to accounts based upon direction of a customer or another or dynamically based on any data or information that may readily be used to determine appropriate accounts to which a transaction should be posted to. In some embodiments, account selection processing station 105 may be administered by a bank or other financial institution that issues and administers transaction devices, such as cards, for example, (e.g., a card-issuer), a merchant or vendor that sponsors or accepts transaction devices (e.g., a sponsor), or any individual, entity or third party that accepts, coordinates, manages or administers customer use of transaction devices or other instruments to conduct transactions. In some embodiments, account selection processing station 105 may maintain or have access to particulars about customers, transaction particulars, transaction histories, account balances, merchants, and any data and information that may be used to selectively determine particular accounts to which a transaction should be posted to, according to the systems and methods described herein. In some embodiments, account selection processing station 105 may comprise a central headquarters or distributed network or repository of the various features and functions of the systems and methods described herein, and may be maintained by or in conjunction with any party or entity that administers the coordination of data and information in connection with the processing of transactions according to the systems and methods described herein.

Account selection processing station 105 may comprise a single server or engine (as shown). In another embodiment, account selection processing station 105 may comprise a plurality of servers or engines, dedicated or otherwise, which may further host modules for performing desired system functionality. Account selection processing station 105, for example, may host one or more applications or modules that function to permit interaction between the users of system 100 (e.g., card holders, customers, merchants, the administrator of account selection processing station 105, and any other relevant parties) as it relates to exchanging and processing of data and information related to the processing of transactions and the selection of accounts as described herein, for example. For instance, account selection processing station 105 may include an administration module that serves to permit interaction between the system 100 and the individual (s) or entity(ies) charged with administering system 100 or account selection processing station 105. Such an administration module may enable the agent of account selection processing station 105, for example, to input information related to transaction types, account categories, customer information, including but not limited to rules and parameters used to determine which accounts a particular transaction should be posted to. Such rules and parameters may comprise variables that define, for example, a particular type or pool of transactions that are eligible to be processed by a particular account or accounts. Thus, if a customer spends a certain amount on purchases relating to business or office equipment, the transaction amount may be processed by and posted to an account designated for business or office expenses. Other examples are of course possible.

According to various embodiments, an agent of account selection processing station 105 may interface with a graphical user interface (or GUI) to input, among other things: (1) data or information (e.g., terms, words, phrases, or digits) that enable the systems and methods described herein to process transactions and designate accounts to which transactions should be posted, (2) data or information that enable the systems and methods described herein to receive card holder designations that specify accounts to which a transaction should be posted or to which a balance should be transferred, (3) data or information that enable the systems and methods described herein to process transaction information provided by merchants which relate to a customer specific purchases;

and (4) rules, parameters and algorithms used to determine the processing and posting of transactions to particular accounts. An agent of account selection processing station 105 may also input information or data regarding how customers, transactions, transactions devices, accounts, products or services, or any other data or information used by the systems and methods described herein are stored (e.g., categorized) in a database 112, for example. Other modules may permit processing of the various features and functionality described herein for processing transactions (See FIG. 2 for modules associated with account selection processing station 105).

Account selection processing station 105 may include, for instance, a workstation or workstations running the Microsoft Windows™ XP™ operating system, Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

Data and information maintained by account selection processing station 105 may be stored and cataloged in database 112 which may comprise or interface with a searchable database. Database 112 may comprise, include or interface to a relational database. Other databases, such as a query format database, a Standard Query Language (SQL) format database, a storage area network (SAN), or another similar data storage device, query format, platform or resource may be used. Database 112 may comprise a single database or a collection of databases, dedicated or otherwise. In one embodiment, database 112 may store or cooperate with other databases to store the various data and information described herein. In some embodiments, database 112 may comprise a file management system, program or application for storing and maintaining data and information used or generated by the various features and functions of the systems and methods described herein. In some embodiments, database 112 may store, maintain and permit access to customer information, transaction information, account information, and general information used to process transactions as described herein. In some embodiments, database 112 is connected directly to account selection processing station 105, which, in some embodiments, it is accessible through a network, such as communication network 107, for example.

Account selection processing station 105 may, in some embodiments, be accessed via a communication network 107. Communications network 107 may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network 107 may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network 107 may comprise a satellite communications network, such as a direct broadcast communication system (DBS) having the requisite number of dishes, satellites and transmitter/receiver boxes, for example. Communications network 107 may also comprise a telephone communications network, such as the Public Switched Telephone Network (PSTN). In another embodiment, communication network 120 may comprise a Personal Branch Exchange (PBX), which may further connect to the PSTN.

As shown in FIG. 1, merchant station 110 and customer station 115 may communicate with account selection processing station 105 via communication network 107. Merchant station 110 may comprise, for example, a station utilized by an agent of a merchant to interact or communicate with its customers or account selection processing station 105. For example, merchant station 110 may comprise a call center facility or station of a card issuer or sponsor that is manned by an operator to receive calls from card members. In some embodiments, merchant station 110 may comprise a point-of-sale system or engine that processes merchant transactions with a customer and which may further cooperate or interact with external systems which carry out card and other transactions (e.g., credit card transactions), including without limitation, for example, account selection processing station 105. In some embodiments, merchant station 110 may comprise or host web sites or web pages of a merchant that the merchant's customers may access to interact with the merchant, such as to make purchases and inquiries.

Customer station 115 may, in some embodiments, enable a customer of a merchant, a holder of a transactions device, or any other person or entity that may utilize the systems and methods described herein to inquire about or purchase products, services or subscribe to or enroll in a transactions device (collectively, "customer") to interact and communicate with a merchant as represented by merchant station 110, for example, or with account selection processing station 105 in connection with the various features and functionality described herein. For example, customer station 115 may enable a customer to call or access the web site or page of a merchant, for example, to browse and possibly purchase a product, or to communicate with account selection processing station 105, such as by transmitting a desired account(s) designation that may be used to generate allocate transaction particulars as described herein, for example.

In some embodiments, customer station 115 may comprise any terminal (e.g., a typical home or personal computer system, telephone, personal digital assistant (PDA) or other like device) whereby a customer may interact with a network, such as communications network 107, for example, that is responsible for transmitting and delivering data and information used by the various systems and methods described herein. Customer station 115 may comprise or include, for instance, a personal or laptop computer, a telephone, or PDA. Customer station 115 may include a microprocessor, a microcontroller or other general or special purpose device operating under programmed control. Customer station 115 may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. Customer station 115 may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Customer station 115 may also include a network-enabled appliance, a browser-equipped or other network-enabled cellular telephone, or another TCP/IP client or other device.

Figure 2:
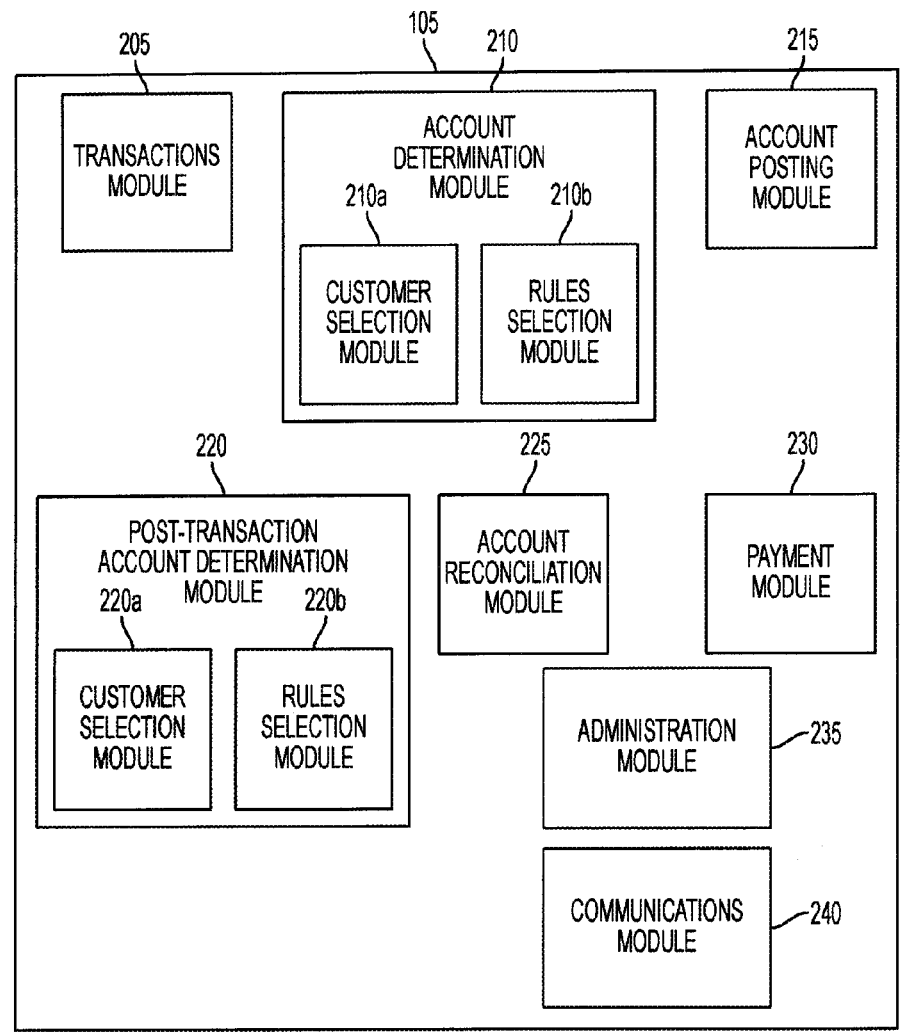
FIG. 2 illustrates various exemplary modules that may be associated with account selection processing station 105, according to various embodiments of the invention.

FIG. 2 illustrates exemplary modules that may be associated with account selection processing station 105 for carrying out (or administering) the various functions and features of the embodiments described herein. Other features and functionality are of course possible. While the modules may not be used in all embodiments to perform some or all of the functions of the present invention, they are nonetheless presented as possible embodiments:

Transactions module 205 may, in some embodiments, receive transaction data and information from particular merchants through which customers are making purchases or otherwise entering into transactions, such as, for example, through a transactions device as described herein. For example, transactions module 205 may cooperate or interact with a merchant system and/or a card processing system to receive particulars on transactions, such as date of transaction, name of merchant, cost of transaction, product or service purchased or sold (e.g., via a SKU, UPC or other identifier), or any other data or information that may relate to a transaction. The data and information received through transactions module 205 may be referenced or accessed by the various systems and methods described herein (including the other modules in FIG. 2) to carry out the features and functionality set forth herein, such as, for example, determining which account(s) a transaction or its particulars should be posted to.

Account determination module 210 may, in some embodiments, determine particular account(s) to which a transaction or its particulars should be posted. In some embodiments, account determination module 210 may permit account determination to be made by a customer or dynamically based on transaction data or information received from transaction module 205, for example, in both cases at the time of the transaction or thereafter. Thus, customer selection module 210*a* may, in some embodiments, receive customer designations that indicate at least one account to which a particular transaction or its particulars should be posted to. For example, a customer at a merchant's location may—before, during or after the transaction is entered into (e.g., a card is swiped, an RFID is read/initiated, typed in at POS, speak it, at self-checkout, or any other activity that results in execution of a transaction occurs)—transmit data or information that specifies at least one account to which the transaction or parts of the transaction should be posted.

In some embodiments, rule selection module 210*b* may dynamically designate such account designations based upon predetermined rules or parameters, transaction history or the customer account-designation history. Thus, a customer may designate account designation preferences that are stored and referred to whenever a transaction occurs. For example, a customer may designate that accounts be designated based on any particular of a transaction, such as, for example, merchant name, date/time of transaction, transaction amount, product or service purchased, or any other data or information that may be used to designate accounts. In some embodiments, accounts may be dynamically selected based on demonstrated customer designation habits or history. Thus, if a customer's purchases at a particular establishment during a weekday are always charged to a particular account or account(s), the system and methods described herein may dynamically post future such transactions to those account(s). In some embodiments, rule selection module 210*b* may be used to select buffer or temporary accounts to which a transaction gets posted if the customer does not make an affirmative selection within a certain period or time. For example, if a customer does not make an account selection by a particular time (e.g., within 1 week of entering into a transaction), the transaction may be posted to a buffer, holding or temporary account. The buffer, holding or temporary account may be predetermined by the customer, such as, for example, the customer's debit or savings account. This way, if the customer forgets to make an account designation after entering into a transaction, the transaction amount may be posted to the customer's debit or savings account. The customer may, of course, subsequently change the account if desired.

In some embodiments, account determination module 210 may—by itself or via communications module 240—transmit transaction-related communications or interfaces to a customer. For example, a customer entering into a transaction may receive a communication at a terminal associated with the customer, such as, for example, the customer's computer, PDA, cell phone, mobile communication device, or any other like device or terminal. The communication may inform the customer about the transaction, and/or request additional instruction on how to proceed with the transaction (e.g., to which account(s) the transaction should be posted to). For example, the customer may be offered a series of accounts and/or actions that the customer may initiate, such as, for example, the ability to select an account(s) to which the transaction should be posted, whether rewards should be used to pay for the transaction, the ability to indicate that the transaction does not belong to the customer, an ability to split ticket (e.g., divide among more than one account), or any other like options. Upon viewing the communication, the customer may make the requisite selections and transmit the selections back to account determination module 240, for example. In some embodiments, the communication may simply inform the customer of how the transaction is being processed (e.g., to which account(s) it is being posted), such as when pre-determined rules or selections are in place for determining which account(s) a particular transaction should be posted to. An embodiment of such a communication is represented below:

Hi Manning Field, based on your rules/selection, this transaction should go to your:
[X] Business Account
[ ] Personal Account
[ ] Entertainment Account
[ ] Charge my rewards balance
[ ] Take me to the Full Menu
[ ] Misc. I will decide later or split ticket
[ ] Not my transaction
[Send to Chase]

In some embodiments, particular cards may have sub-categories associated with it. For example, a card or device may have associated with the following types or categories of accounts: personal, business expense, small business, fuel/transportation, charity, entertainment, food, children, or any other type or category of account that a user may designate or desire to utilize and implement. The designation of categories may of course change as the user's needs evolve. In some embodiments, thresholds can be established for particular cards. For example, the user may specify that an account devoted to entertainment be capped at a certain threshold so that the user may control frivolous or non-essential spending. A transaction may be declined if it goes beyond the threshold. In some embodiments, a user may be alerted when a set threshold is being approached. In some embodiments, a user may be recognized for complying with or staying within predetermined thresholds. For example, a user may be rewarded with discounts or other incentives or promotions for not surpassing the thresholds. Other limitations may of course be imposed, such as, for example, date/time parameters on when certain accounts may be used, merchants where accounts may be used at, and the types of products or services that can be purchased with certain accounts. Other parameters are of course possible.

In some embodiments, the systems and methods described herein may provide certain attributes as well as alerts or notifications to a user. For example, in some embodiments, the various systems and methods described herein may contain the following alert/notifications or attributes: (1) ability to set personal allowances that trigger status alerts on the go; (2) ability to compare spending patterns over time; (3) beat your best—a feature that brings a playful tone to self check-ins (you vs. you); (4) ability to benchmark you vs. (aspirational others); (5) metrics for gauging progress; (6) ability to choose between debit or credit (pay now vs. pay later); and (7) ability to see the different rewards that would be earned upon selecting different account(s) for a particular transaction. The alert/notification feature of the systems and methods claimed herein may be performed by any of the various modules described herein.

Account posting module 215 may, in some embodiments, post transaction or parts of transactions to designated accounts. For example, account posting module 215 may interact or cooperate with the external systems of a bank or other entity that administers accounts, for example, to ensure that transactions or parts of transactions are posted to the proper accounts. In some embodiments, account posting module 215 may interact or cooperate with account determination module 210 or post-transaction account determination module 220 to receive customer or dynamically designated account selections.

Post-transaction account determination module 220 may, in some embodiments, receive and process account designations after a transaction or part of a transaction has been posted to an account. For example, a week after a transaction has been posted to a customer's credit account, for example, the customer may decide to transfer the balance from his credit account to his debit account for immediate payment. The customer may request the transfer by interacting with customer selection module 220a via client station 115 or other access means. In some embodiments, the customer may interact with a graphical user interface of account selection processing station 105 that enables the customer to selectively designate accounts after a transaction has occurred and been posted to at least one account. In some embodiments, post-transaction designations may be made by communicating with a customer service representative of station 105, or by making designations on the customer monthly account statement and returning such marked-up statement to the administrator of station 105 or agent thereof. In some embodiments, post-transaction designations may be made dynamically via rule selection module 220b, based on, for example, any particular of a transaction, such as, for example, merchant name, date/time of transaction, transaction amount, product or service purchased, or any other data or information that may be used to designate accounts. In some embodiments, post-transaction designations may be made via email, instant messaging, MMS, SMS, or any other form of communication.

In some embodiments, post-transaction designations may be made according to rules or parameters. For example, if an account balance has remained in a given account for a long period of time, the systems and methods described herein may prompt or query the account holder whether the balance needs to be moved to another account, such as, for example, a debit account where payment may be made immediately. Alternatively, funds from an account may be moved to another account to pay off a balance. Similarly, if a transaction with a given merchant remains in an account for period of time without payment being made, the various systems and methods described herein may remind the user of the outstanding balance and propose a payment schedule.

Account reconciliation module 225 may, in some embodiments, reconcile accounts based on account selections and designations. Thus, if a customer transfers some or all of a balance from his credit account to his debit account, account reconciliation module 225 may ensure that the proper balances are reflected in the two accounts after the transfer is effected. In some embodiments, account reconciliation module 225 may interact or cooperate with account posting module 215 (or external systems of account administrators, for example) in performing account reconciliation features and functionality.

Payment module 230 may, in some embodiments, receive and process payments from a customer, such as, for example, user of the transactions device. For example, the user of the device may make payment on any balances that have accrued on transactions conducted with the device. Such payments may be made on a periodic basis, such as daily, weekly, or monthly, for example. In addition, such payments may comprise a minimum payment towards the balance or the entire amount due and owing. In some embodiments, payment module 230 may interact or cooperate with external payment processors associated with a bank or other individual or entity that administers accounts to which payments are posted as described herein.

Administration module 235 may, in some embodiments, enable an administrator of account selection processing station 105, for example, to interact with the various modules, features and functionality described herein. For example, an agent of account selection processing station 105 may interact with administration module 235 to input, revise and remove data and information used by the various systems and methods described herein, such as, for example, customer information, benefit or reward information, transaction history information, merchant information, or any other data or information that may be used to perform the various features and functionality described herein. In some embodiments, administration module 235 may enable an administrator of account selection processing station 105 to establish parameters or rules associated with the various features and functionality described herein. For example, an administrator may establish limits, caps, delays, rules or fees associated with a customer's use of the features and functionality described herein. A customer may also be required to pay a fee to be able to be able to process transactions and select accounts as described herein. Such a fee may be, for example, annually or monthly imposed or may be charged on a one-time or per-transaction basis. In some embodiments, the fee may comprise a monetary amount or any other form of measurable value.

Communications module 240 may, in some embodiments, enable communication with a customer in connection with the various and functionality described herein. For example, Communications module 240 may transmit messages or alerts to customers which relate to transactions conducted with the various transaction devices described herein. Communications module 240 may transmit such messages or alerts via any form of communication network, such as, for example, a data communications network, a telephone network, or any other network that may be used to transmit messages or alerts. Such messages or alerts may comprise snail mail, email, facsimile transmissions, instant messages, audio or voice mail, or any other form of communication. In some embodiments, communications module 240 may also receive customer selections or input provided in response to such messages or alerts, such as, for example, particular account selections to which a particular transaction should be posted to. In some embodiments, communications module 240 may cooperate with any of the other modules set forth in FIG. 2 to generate and transmit messages or alerts, and to receive customer selections or inputs based on such messages or alerts.

Figure 3:
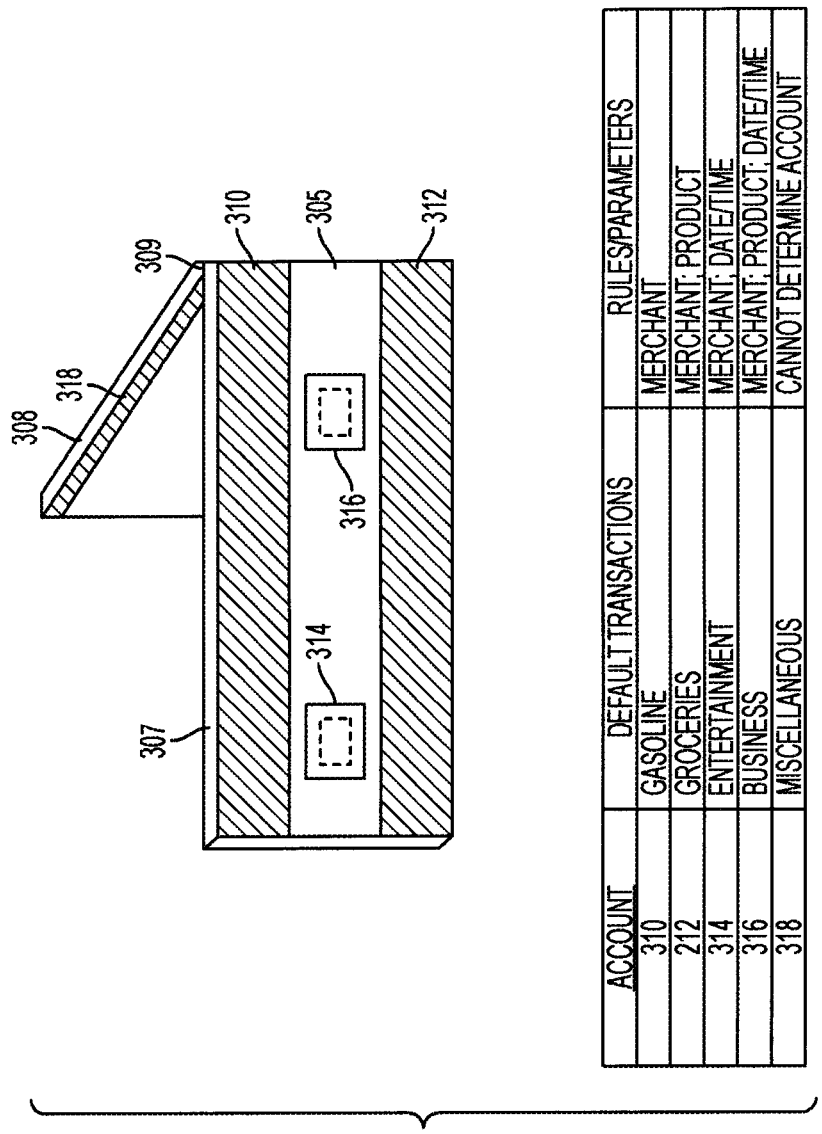
FIG. 3 illustrates an multi-account transaction device, according to various embodiments of the invention.

FIG. 3 illustrates a transactions device 305 for processing transactions and selecting accounts to which particular transactions are to be posted, according to an embodiment of the systems and methods described herein. As shown, a transactions device 305 is associated with account identifiers 310, 312, 314, 316, and 318, each of which may correspond to or be associated a particular account or accounts. In some embodiments, transactions device 305 may comprise a card (e.g., credit card, debit card, or stored value card), RFID, biometric, instrument, identifier or other characteristic or item that may be used by a user or another to conduct transactions. In some embodiments, transactions device 305 may be issued to a customer by a financial institution (e.g., a bank), a merchant, an administrator of station 105 or system 100, a sponsor of the device, or any other individual or entity. As shown, device 305 may comprise a top portion 307 and a bottom portion 308 that are connected together via a hinge element 309. The top and bottom portions may be selectively positioned so that desired account identifiers are exposed and available for initiation. Thus, if the bottom portion is completely closed against the top portion, account identifier 318 (e.g., the magnetic stripe) would not be exposed and therefore would not be available for the customer to swipe at a point-of-sale and initiate a transaction. Alternatively, if device is open, the customer will be able to access a greater number of accounts through account identifiers 312-318, for example. In some embodiments, device 305 may include a lock (not shown) that operates to lock the two portions of the device 305 in a closed position. In some embodiments, the total width of the device 305 in a closed position is equivalent to current or traditional cards, such as credit, debit, ATM or other like cards or devices.

The types of accounts accessible by via device 305 may comprise, for example, a line of credit account, checking account, money market account, debit account, savings account, or any other account that may be used to enter into transactions. In some embodiments, a user of device 305 may initiate any number of accounts associated with device 305 for use in a given transaction, either at the time of the transaction of thereafter. As shown in FIG. 3 account 310 is a dedicated gasoline account; account 312 is a dedicated groceries account; account 314 is a dedicated entertainment account; account 316 is a dedicated business account; and account 318 is a miscellaneous account. In some embodiments, which account(s) are used for a given transaction may depend on which account(s) the customer specifically designates at the POS, such as, for example, which one the customer initiates through a POS of sale device or identifies to the merchant representative. In some embodiments, account (s) may be selected based on particular rules or parameters that determine which accounts are applicable. For example, as shown in FIG. 3, account 310 may be initiated based on the merchant identity; account 312 on the basis of merchant or product identity; account 314 on the basis of merchant identity or date/time of transaction; account 316 on the basis of merchant or product identity or date/time of transaction; and account 318 only if another appropriate account cannot be determined. For example, if a given transaction occurred at an Amoco™ gas station, for example, the user's account 310 may be designated as the appropriate account based in the name of the merchant. In some embodiments, account determination may occur at the time of the transaction, such as, for example, after the an account identifier is initiated or identified. Thus, if the customer approaches the gas station attendant to pay for the transaction and initiates account 314, the various systems and methods may dynamically override the customer's selection (or prompt the customer for clarification or to confirm the selection) and post the transaction to the account 310 which is dedicated to gasoline transactions.

In some embodiments, a device 305 may have only one account identifier (e.g., only one magnetic stripe or one RFID) through which all transactions are initiated. Thus, once a transaction is entered into (e.g., once the magnetic stripe is swiped through a POS device or account number or card provided to the merchant representative), the various systems and methods described herein may identify the appropriate accounts to which the transaction should be posted. For example, upon receiving transaction data and information relating to a customer's transactions over a period of time, account selection processing station 105 may process the data and information and allocate transactions or portions of transactions according to rules or parameters corresponding to the particular customer, such as those set forth in FIG. 3, for example. In some embodiments, the rules or parameters may be predetermined, established by the customer, a merchant(s), an administrator of the systems and methods described herein, an issuer or sponsor of device 305, for example, or any other individual or entity that may specify or define particular account selection rules or parameters.

Figure 4:
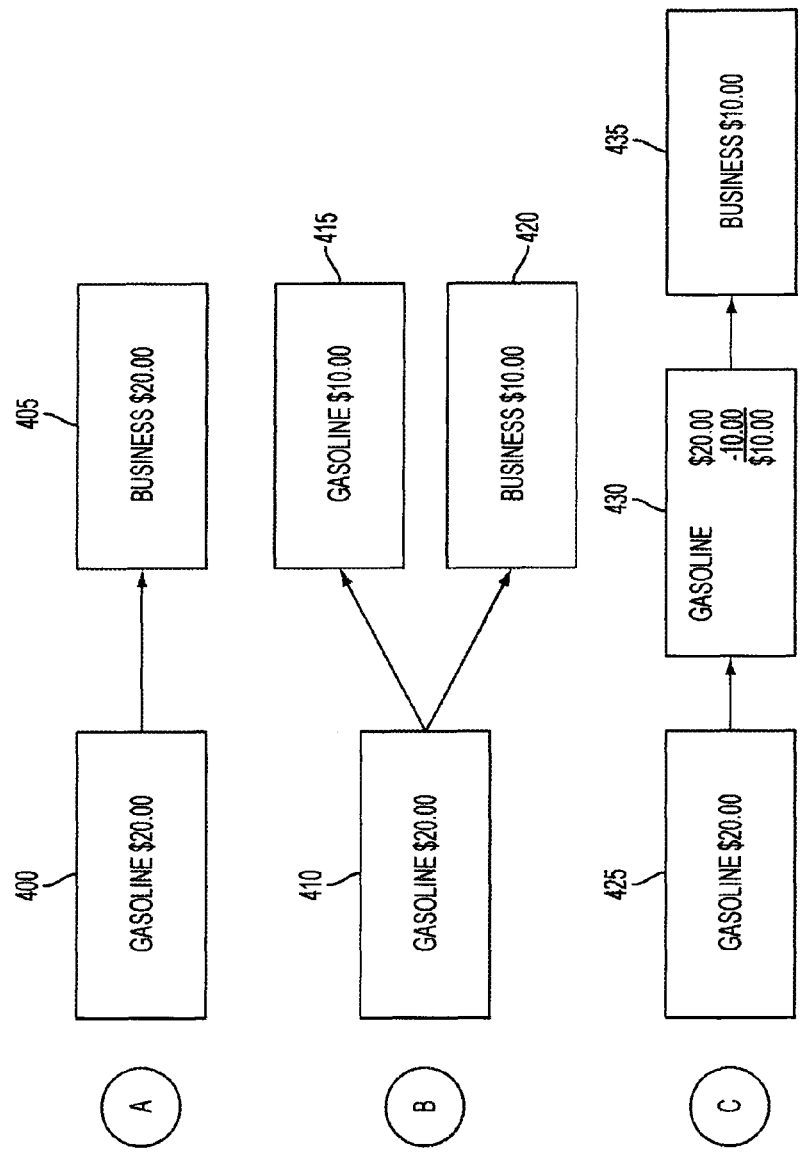
FIG. 4 illustrates several account selection schemes, according to various embodiments of the invention.

FIG. 4 illustrates three process flows A-C depicting various schemes for selecting accounts according to various embodiments of the systems and methods described herein. The examples shown are based on use of device 305 and its accounts as described in FIG. 3. In scheme A, a twenty dollar transaction at a gasoline station may initially be posted to account 310, as shown at 400. The transaction may be posted to the account once: (1) the customer provides the merchant representative with an account number corresponding to account 310; (2) the customer or the merchant representative swipes device 305 (or more particularly the account identifier corresponding to account 310); or (3) rules or parameters corresponding to device 305, the user, the merchant, the issuer or any other individual or entity may require, recommend or designate account 310. The initial posting of the transaction may of course be changed by the customer or dynamically according to rules or parameters. For example, a few days after entering into the transaction, the customer may decide to switch the balance to his business account because the gasoline was used for business purposes. To do so, the customer may make such designation by interacting with an interface associated with station 105, for example, or contacting a service representative of station 105. In some embodiments, if a customer does not make a selection by a particular period of time, the transaction may be posted to a buffer, temporary or default account as described herein. Other methods for designating accounts are possible.

Scheme B shows the initial transaction being broken up based on amount of transaction. Thus, if the customer used half of the gasoline for personal use and the other half for business purposes, he may designate that $10.00 be posted to the business account as shown in 420. Scheme C shows the user applying a $10 payment to the balance in the gasoline account 310 (at step 430) and thereafter transferring the remaining balance to business account 316. In some embodiments, the $10 payment may be made after the balance is transferred to the business account. In some embodiments, post-transaction designations may be made according to rules or parameters. For example, if an account balance has remained in a given account for a long period of time, the systems and methods described herein may prompt or query the account holder whether the balance needs to be moved to another account, such as, for example, a debit account where payment may be made immediately. Similarly, if a transaction with a given merchant remains in an account for period of time without payment being made, the various systems and methods described herein may remind the user of the outstanding balance and propose a payment schedule.

Figure 5:
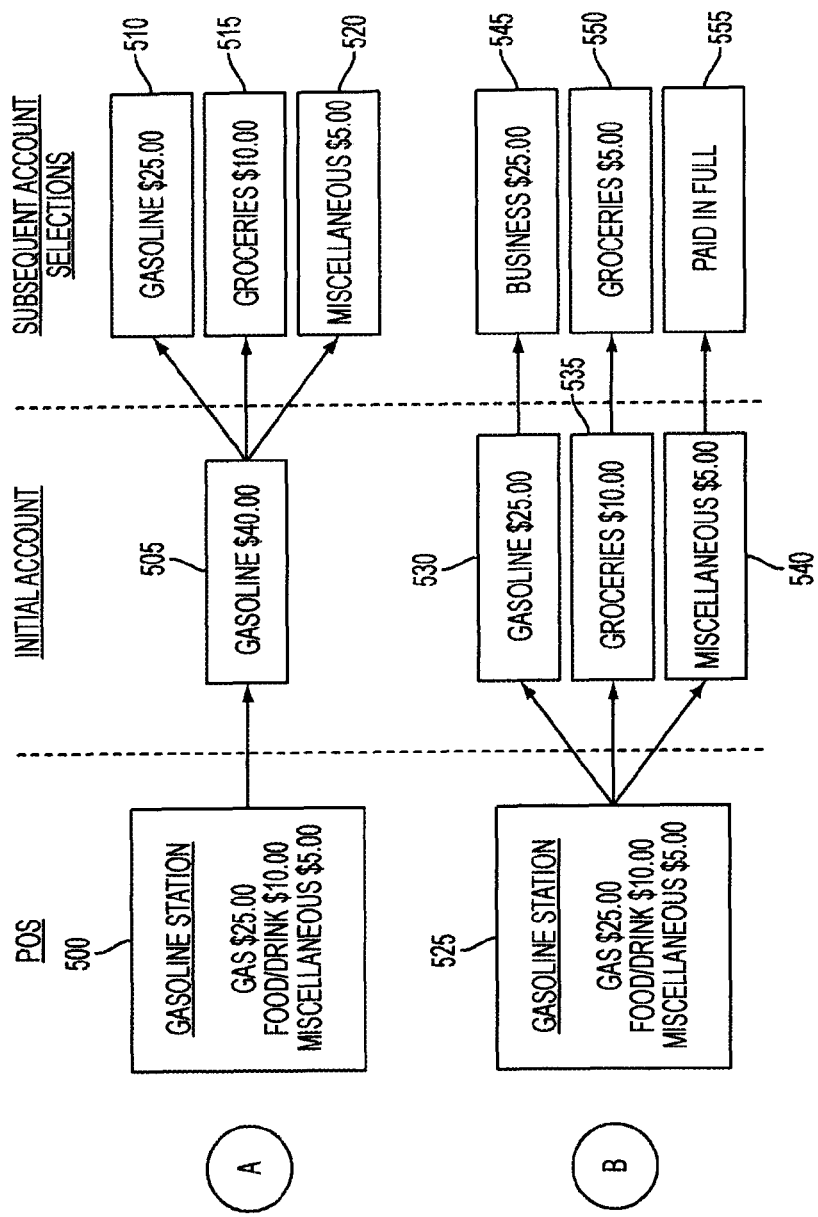
FIG. 5 illustrates several account selection schemes, according to various embodiments of the invention.

FIG. 5 illustrates two process flows A and B depicting various schemes for selecting accounts based on particulars of the goods or services purchased, according to various embodiments of the systems and methods described herein. The examples shown are based on use of device 305 and its accounts as described in FIG. 3. In scheme A, a $40 transaction at a gasoline station may break down as follows: $25 for gasoline; $10 for food and drink; and $5 for miscellaneous items. As shown in 505, the initial account selected may comprise account 310 to which the entire $40 amount will be posted. The initial selection may be made by the customer or rules and parameters that designate the account based on the merchant's identity, for example. Subsequently, the customer may designate certain portions of the transaction that should be posted to different accounts. Thus, $10 should be posted to account 312 (groceries), $5 to account 318 miscellaneous, and the remaining $25 should remain in account 310. In scheme B, the initial account designations are based on the identity of the good or service purchased. Thus, $25 to account 310; $10 to account 312 and $5 to account 318. Subsequently, the customer may re-designate or pay accounts according to his needs. Thus, the $25 may be transferred to account 316 (business), half of the balance in account 312 is paid, and the miscellaneous balance is paid in full. As in scheme A, the initial account selections may be made by the customer or according to rules and parameters that designate account(s) based on the merchant's identity, for example, and other transaction particulars. The above schemes are intended as examples an do not limit the types of schemes that are possible using the systems and methods described herein.

Figure 6:
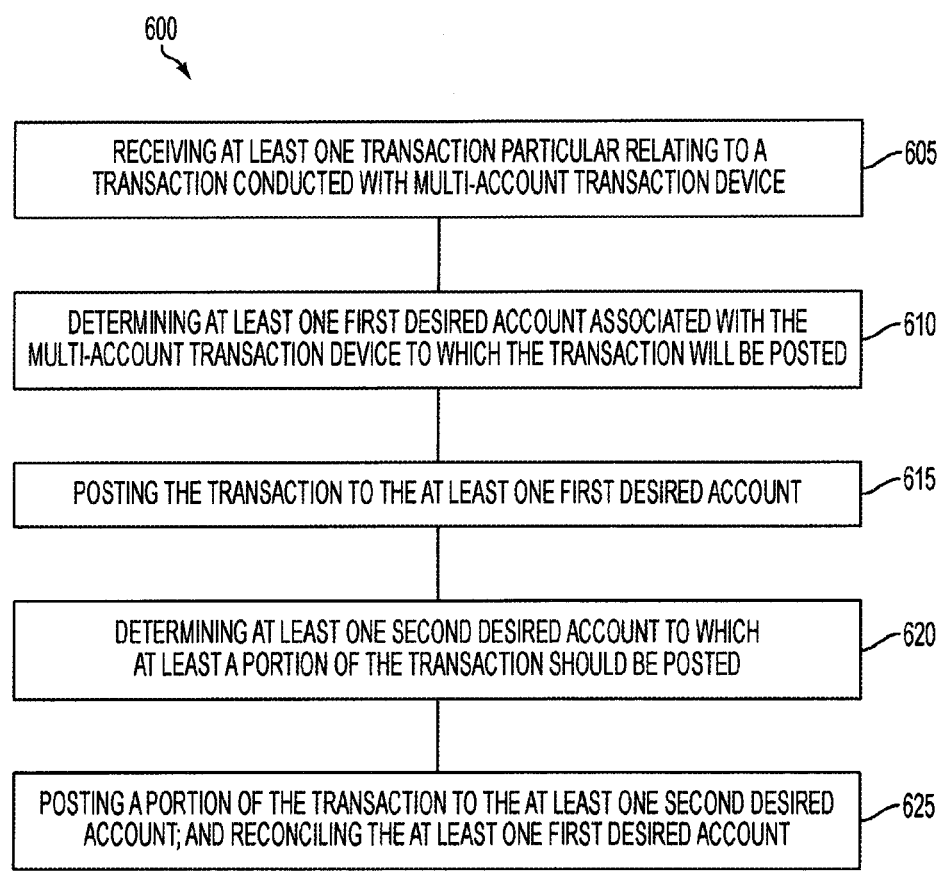
FIG. 6 illustrates a process flow 600 for selecting account (s), according to various embodiments of the invention.

FIG. 6 illustrates a process flow 600 for processing transactions using a multi-account transaction device. At step 605, at least one transaction particular relating to a transaction conducted with a multi-account transaction device is received. In some embodiments, the transaction particular is received from a merchant or an agent or system that processes transactions on behalf of merchants or other entities. At step 610, at least one first desired account associated with the multi-account transaction device to which the transaction will be posted is determined. At step 615, the transaction is posted to the at least one first desired account. At step 620, at least one second desired account designation to which at least a portion of the transaction should be posted is received. At step 625, the at least a portion of the transaction is posted to the at least one second desired account. At step 630, the at least one first desired account are reconciled.

FIGS. 7-24 illustrate various embodiments of cards or transaction devices that may be used to perform or initiate some or all of the features and functionality described herein. In some embodiments, for example, the cards and devices described in FIGS. 7-24 may be used to perform the features and functionality described in FIGS. 1-6 above.

Figure 7:
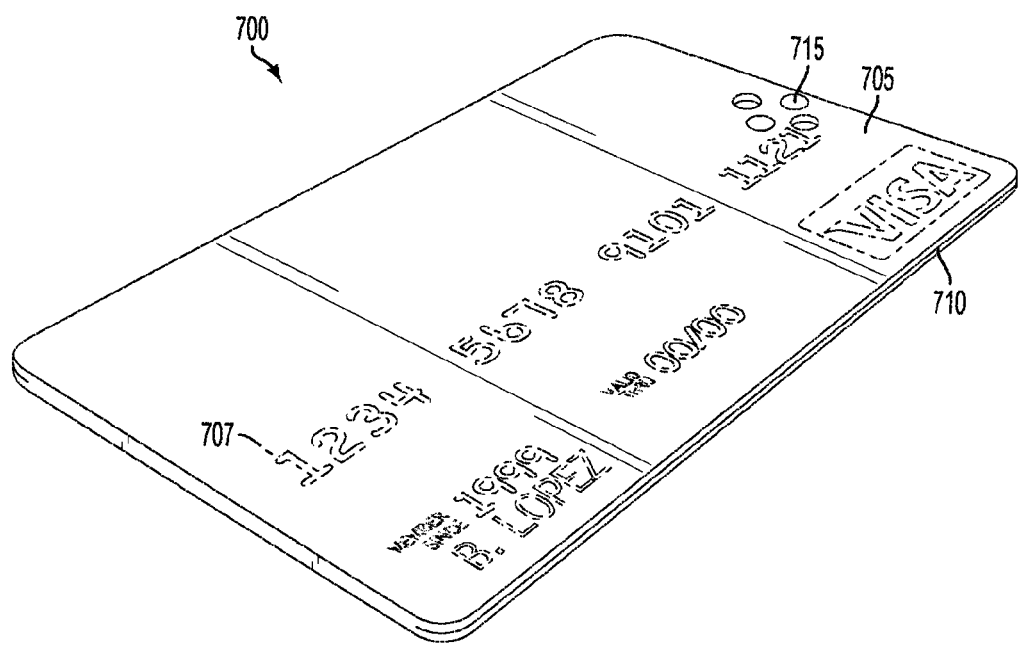
FIGS. 7-25 each illustrate a multi-account transaction device, according to various embodiments of the invention.

FIG. 7 illustrates a transaction device 700 according to one embodiment of the systems and methods described herein. As shown, transaction device 700 may comprise a top portion having a face 705 and a bottom portion with a face 710. Transaction device 700 may also, in some embodiments, comprise a lock 715 which secures the top portion 705 to the bottom portion 710 when the device 700 is in a closed position. In some embodiments, the top portion 705 may include information 707, such as an account number (e.g., which is shown as ending in 1121), card holder name and other relevant information. Device 700 may be made of any strong, rigid material, such as plastic, for example. Other materials are of course possible.

Figure 8:
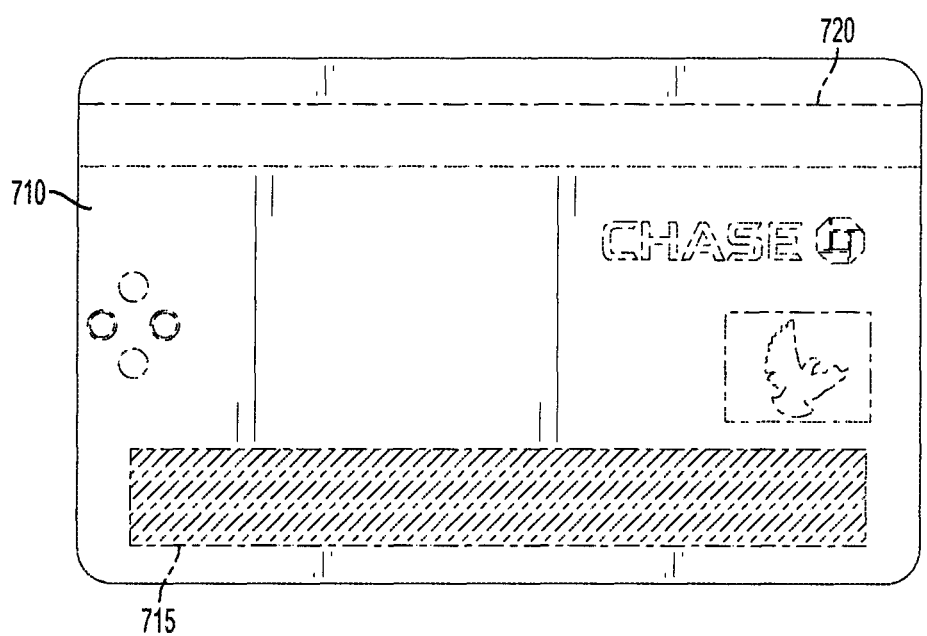

FIG. 8 illustrates the bottom portion 710 of device 700. As shown, bottom portion 710 may comprise a signature block 715 for the card holder to sign his or her name, as well as a magnetic strip 720 which may store data and other information about the account or card holder, for example.

Figure 9:
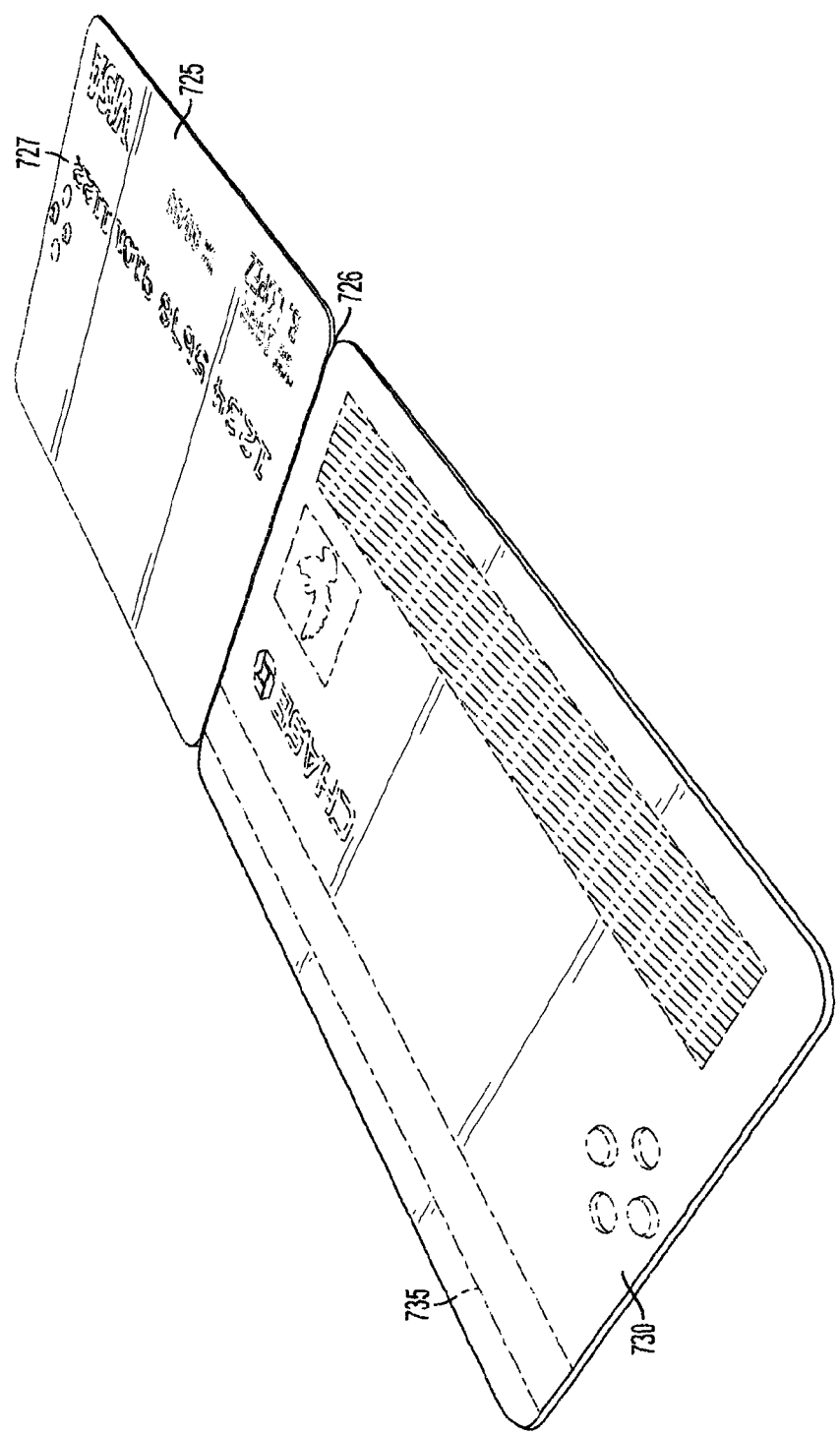
Figure 10:
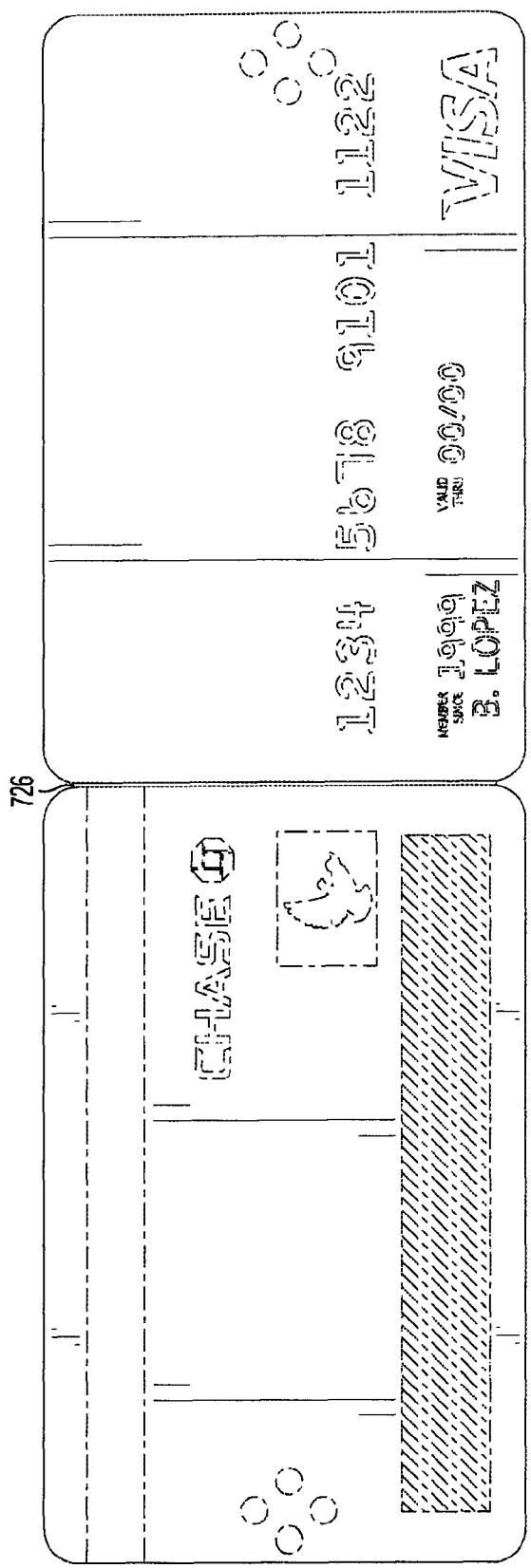

FIGS. 9 and 10 illustrate transaction device 700 in a fully opened position. As shown, device 700 includes a hinge 726 that connects the two portions. In some embodiments, hinge 726 may comprise a thin, flexible film that connects the two portions of transaction device 700. In some embodiments, the hinge may be made of a fabric or other flexible material, such as, for example, a heavy duty fabric. In some embodiments, the hinge may be made of a plastic or flexible metal or alloy material, for example. Device 700 is shown as including a face 725 which include information 727, such as an account number (e.g., which is shown as ending in 1122), card holder name and other relevant information. Device 700 may also include a face 730 which may include a signature block for the card holder to sign his or her name, as well as a magnetic strip 735 which may store data and other information about the account or card holder, for example. In some embodiments, face 725 is the opposite side of top portion 705 which includes the account number ending in 1121, whereas face 730 is the opposite side of the bottom portion 710 which includes the magnetic strip 720.

Figure 11:
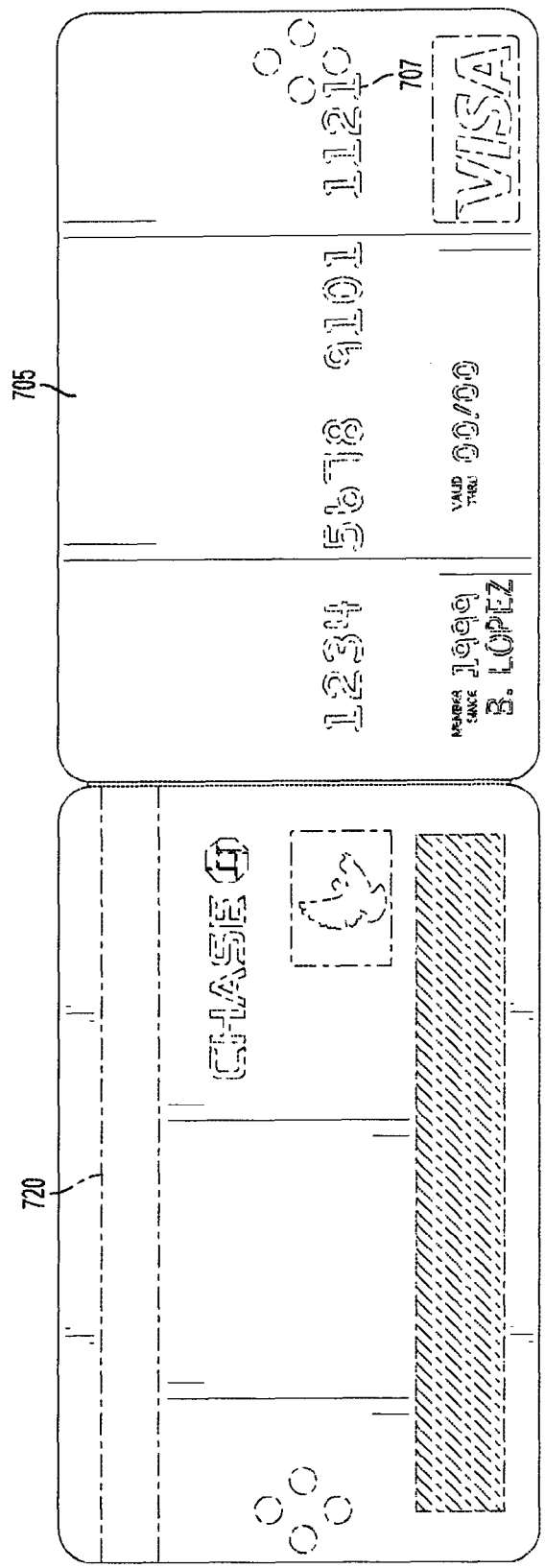
Figure 12:
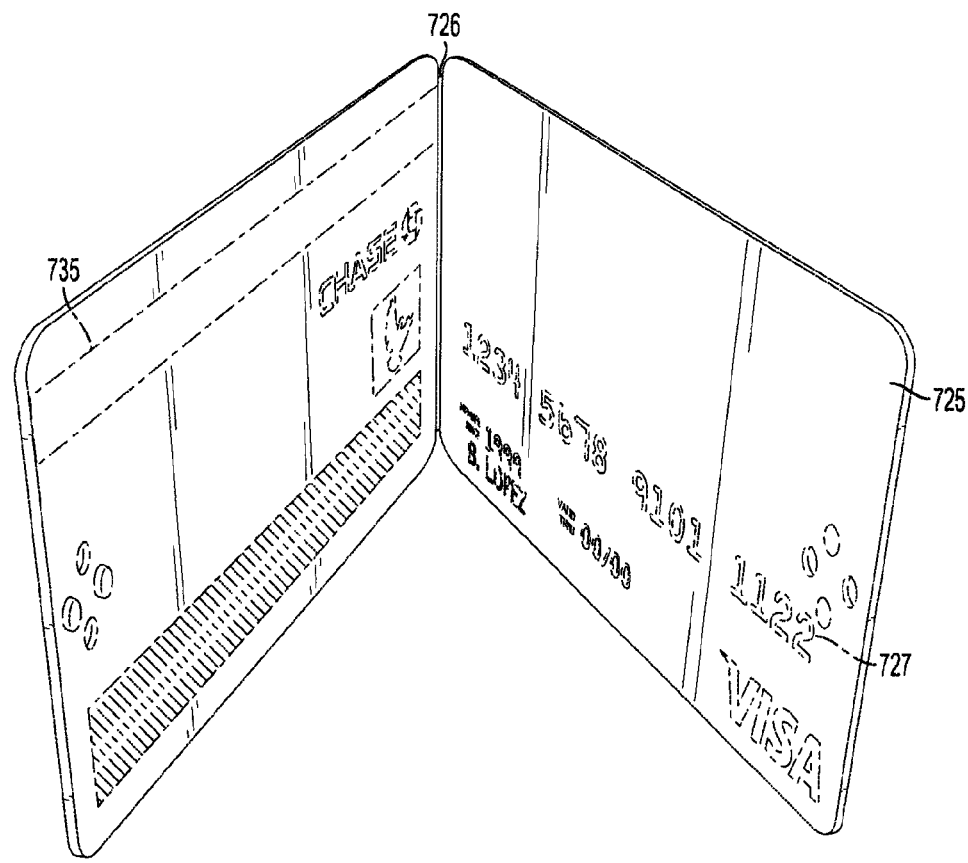

FIG. 11 illustrates a top view of device 700 showing faces 705 and 710, which include the account number ending in 1121 and the magnetic strip 720, respectively. FIG. 12 illustrates the opening and closing functionality of device 700 showing the hinge 726. In some embodiments, the two portions of device 700 may be closed in such a manner that faces 705 and 710 form a transaction device whereby the account number ending with 1121 and the magnetic strip 720 are exposed on the front and back respectively. In some embodiments, the two portions of device 700 may be closed in such a manner that faces 725 and 730 form a transaction device whereby the account number ending with 1122 and the magnetic strip 735 are exposed on the front and back respectively.

Figure 13:
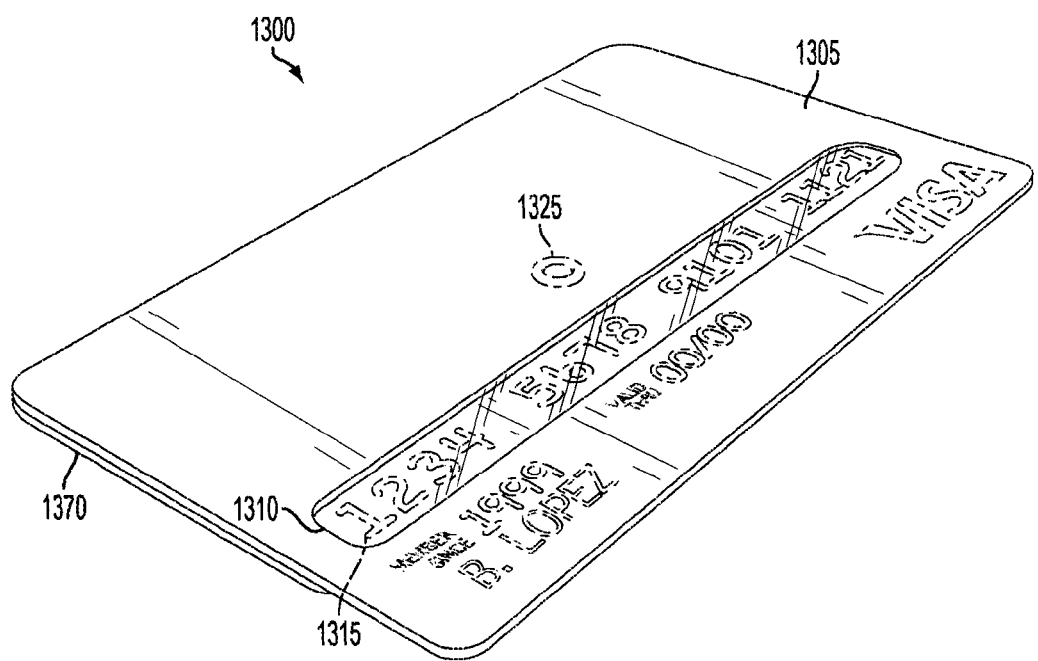

FIG. 13 illustrates a transaction device 1300 containing a top portion 1305 and a bottom portion 1320. Top portion 1305 includes a window cut-out 1310, which in some embodiments, may have a clear or translucent film or layer, through which an account number (e.g., ending in 1121), for example, may be visible. In some embodiments, the account number may be marked on the face of bottom portion 1320. Top portion 1305 may also have information such as the card holder's name and other related information. In some embodiments, the two portions of device 1300 may be retained by a rivet 1325 or other retention device, such that the top and bottom portions may rotate relative to each other. In some embodiments, the top portion is wider than the bottom portion, as shown, while in some embodiments they are the same width. Likewise, the top and bottom portions may be of the same or differing lengths. In some embodiments, the thickness may be in compliance with a required standard or norm, such as, for example an ISO standard. As shown in FIG. 13, device 1300 is in a first position where the account number ending in 1121 is shown through window 1310.

Figure 14:
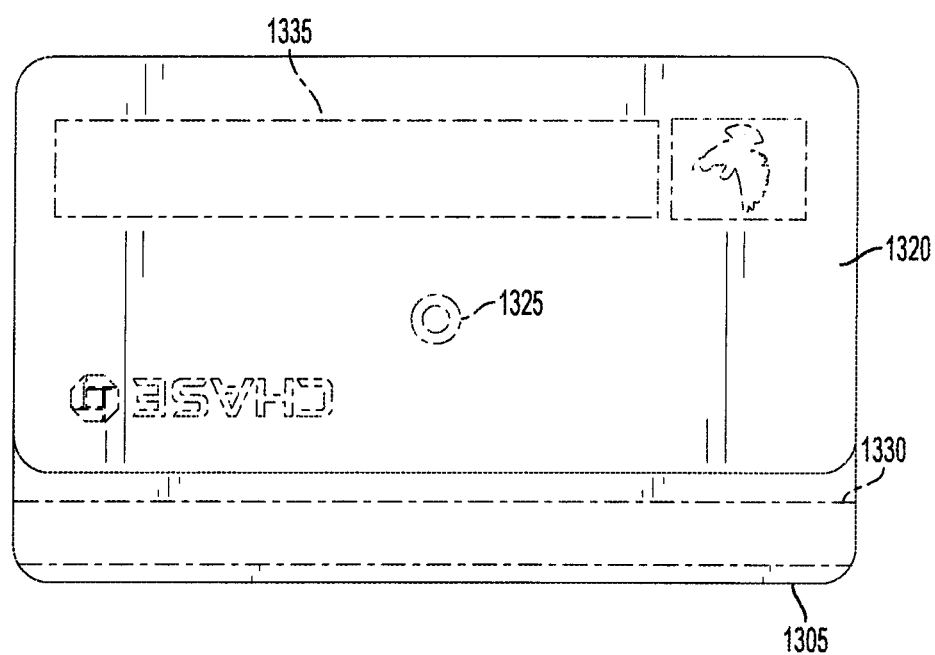

FIG. 14 illustrates the back view of the device 1300. As shown, portion 1305 has a magnetic strip 1330 disposed thereon. In some embodiments, magnetic strip 1330 correspond to the account 1315 (e.g., which ends in 1121) shown through the window 1310 in FIG. 13. As shown, the back of portion 1320 may have a signature block 1335 and a portion of the rivot 1325 or other form of retention.

Figure 15:
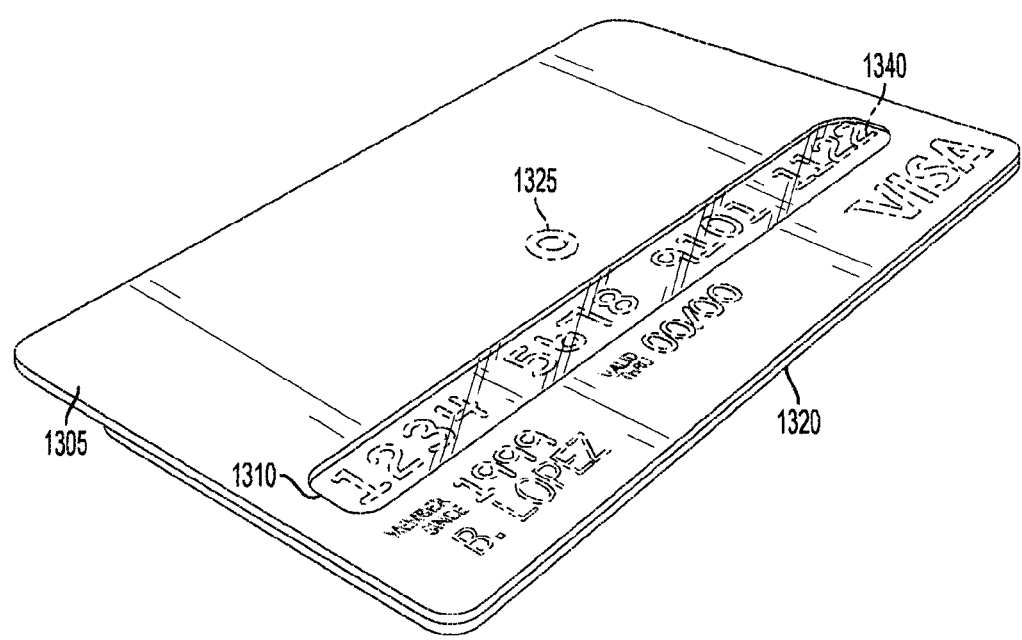
Figure 16:
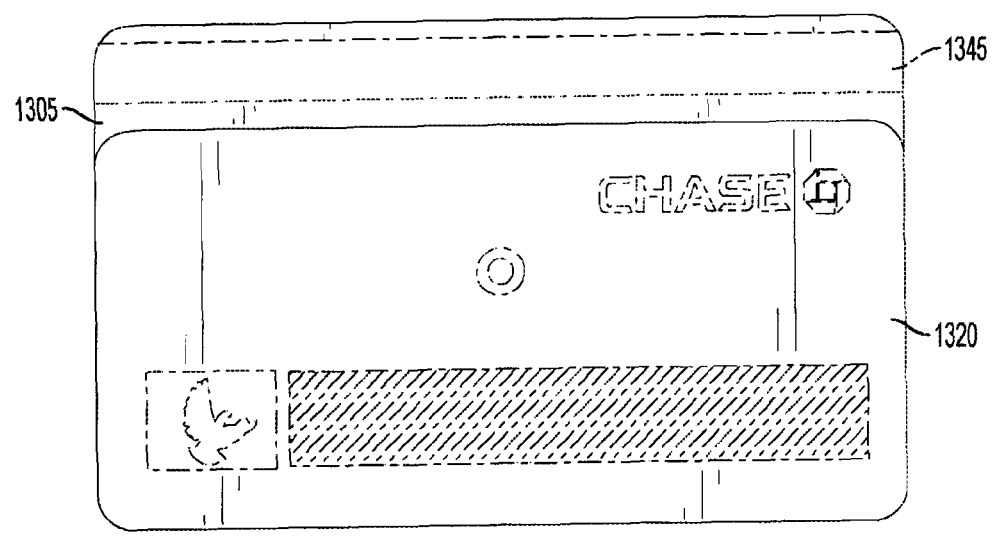
Figure 17:
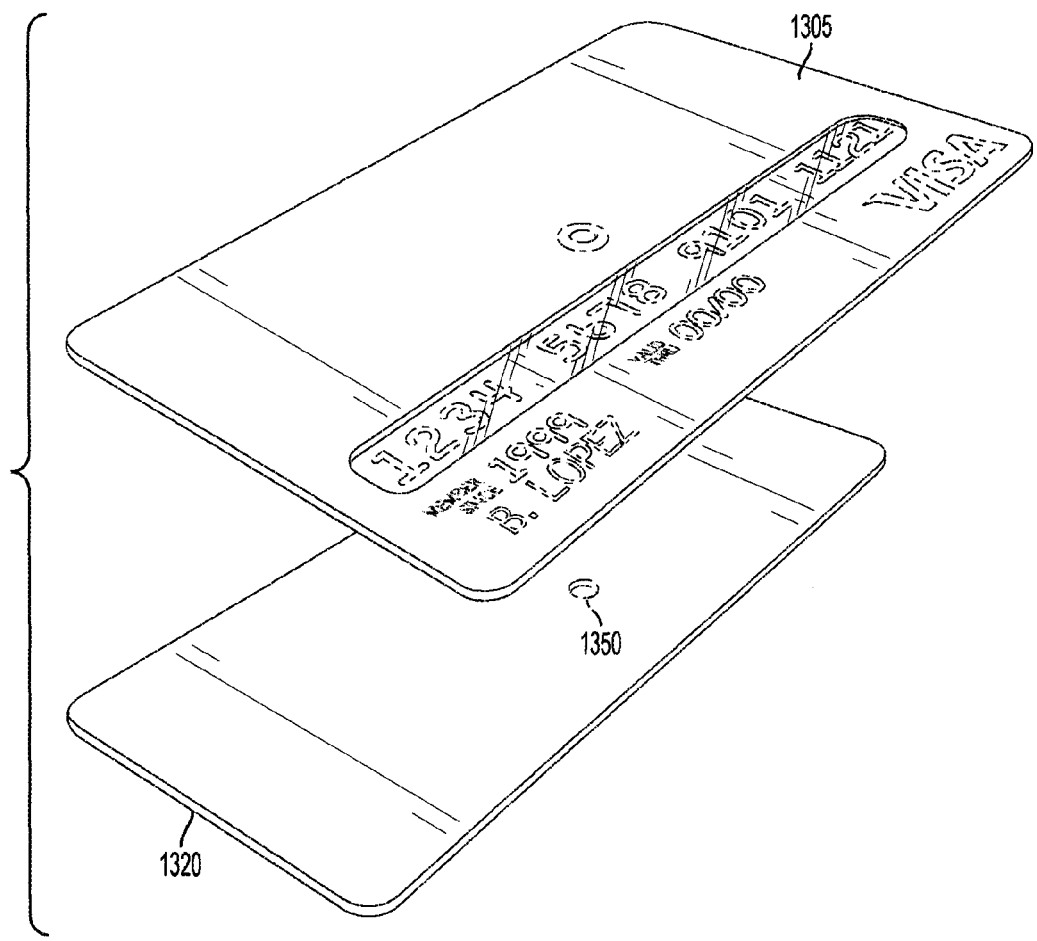

FIG. 15 illustrates device 1300 in a second position where the account number shown through window 1310 ends in 1122. The second position may be achieved by rotating the bottom portion relative to the top portion 180 degrees. Doing so would result in an account ending in 1122 appearing through window 1310. FIG. 16 illustrates the back view of device 1300 in the second position. Shown is a magnetic strip 1345 which corresponds to the account number ending in 1122 which appears through the window 1310 in FIG. 15. Also shown is the back of portion 1320 which may, in some embodiments, include a signature block and other information. FIG. 17 illustrates an exploded view of device 1300 showing top portion 130 and bottom portion 1320. Also shown is an opening 1350 in the bottom portion 1320 through which rivot 1325 may be placed to permit the relative rotational movement between the two portions.

Figure 18:
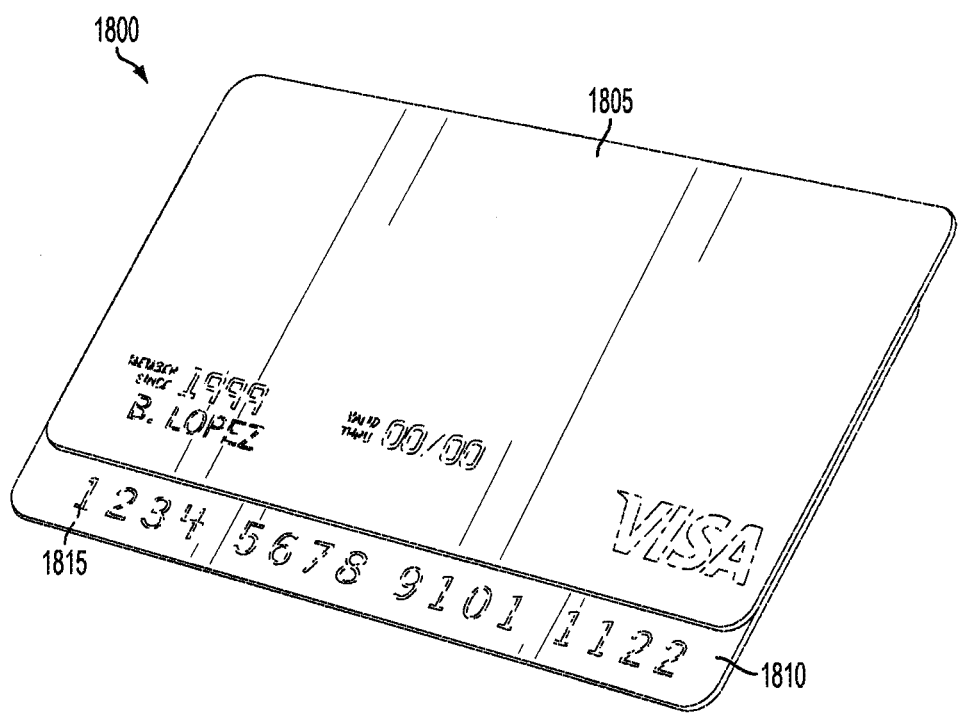
Figure 19:
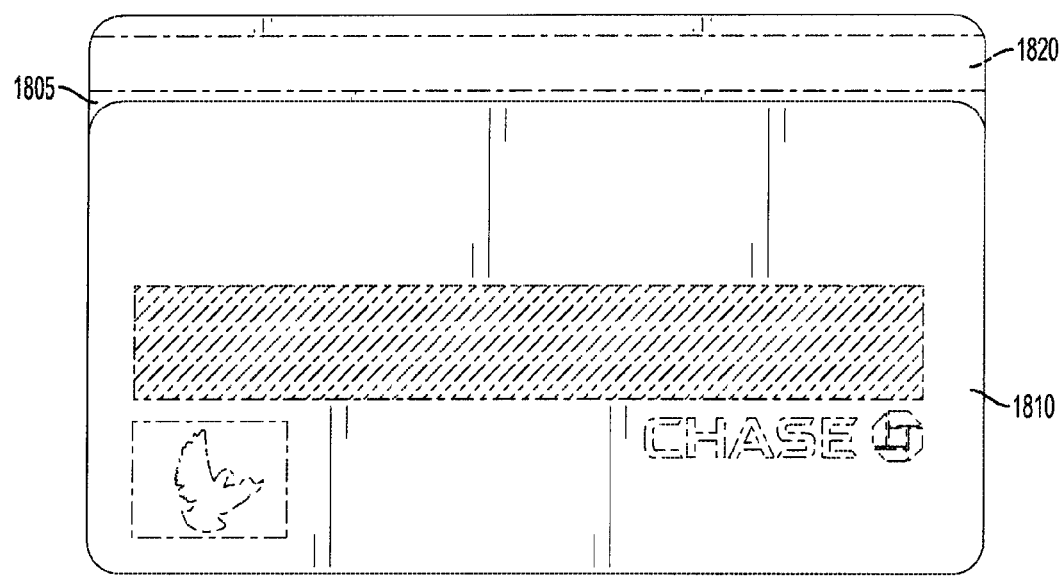

FIG. 18 illustrates a transaction device 1800 which includes a top portion 1805 and a bottom portion 1810. In some embodiments, top portion 1805 may include information about an account or card holder, while the bottom portion may include an account number 1815 (e.g., the account number shown ends in 1122.) The top portion and the bottom portions may slide relative to each other so as to display different account numbers. As shown, device 1800 is in a first position where an account ending in 1122 is shown. FIG. 19 illustrates the back view of device 1800 in the first position showing a magnetic strip 1820 disposed on the back of top portion 1805. The back of bottom portion 1810 may include a signature block and other relevant information.

Figure 20:
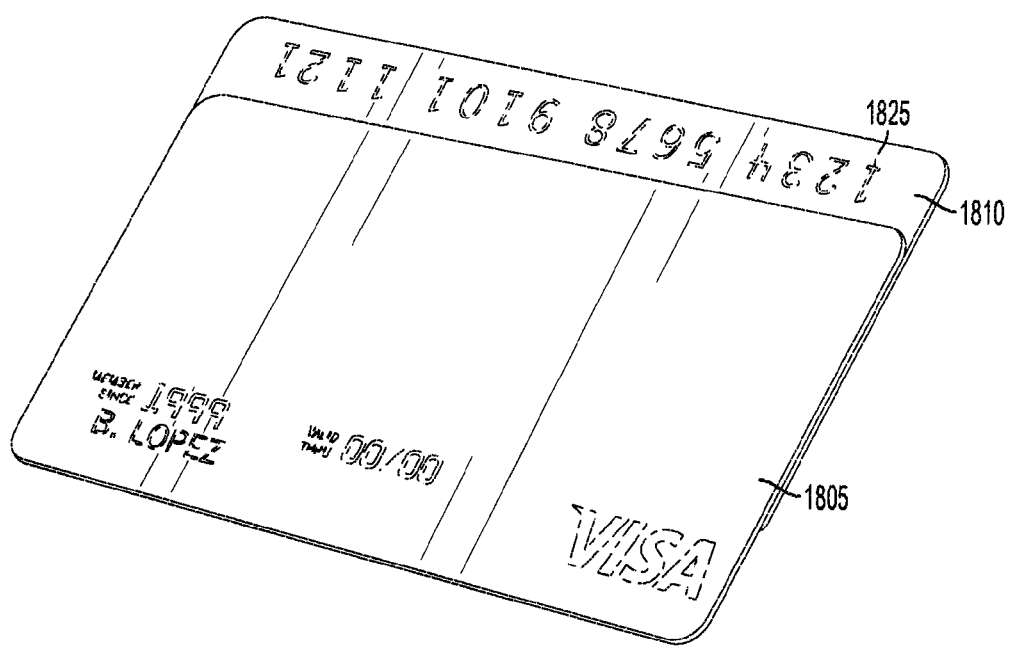
Figure 21:
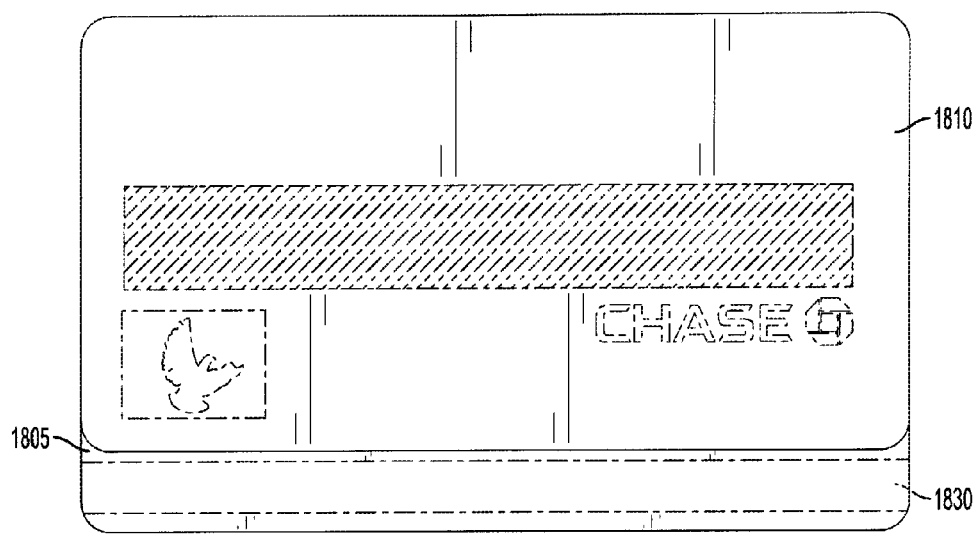

FIG. 20 illustrates the device 1800 in a second position which is achieved by sliding the top portion down relative to the bottom portion 1810. Doing so reveal an account number ending in 1121, as shown. FIG. 21 illustrates a magnetic strip 1830 which may be associated with the account number ending in 1121. The back of bottom portion 1810 may include a signature block and other relevant information.

Figure 22:
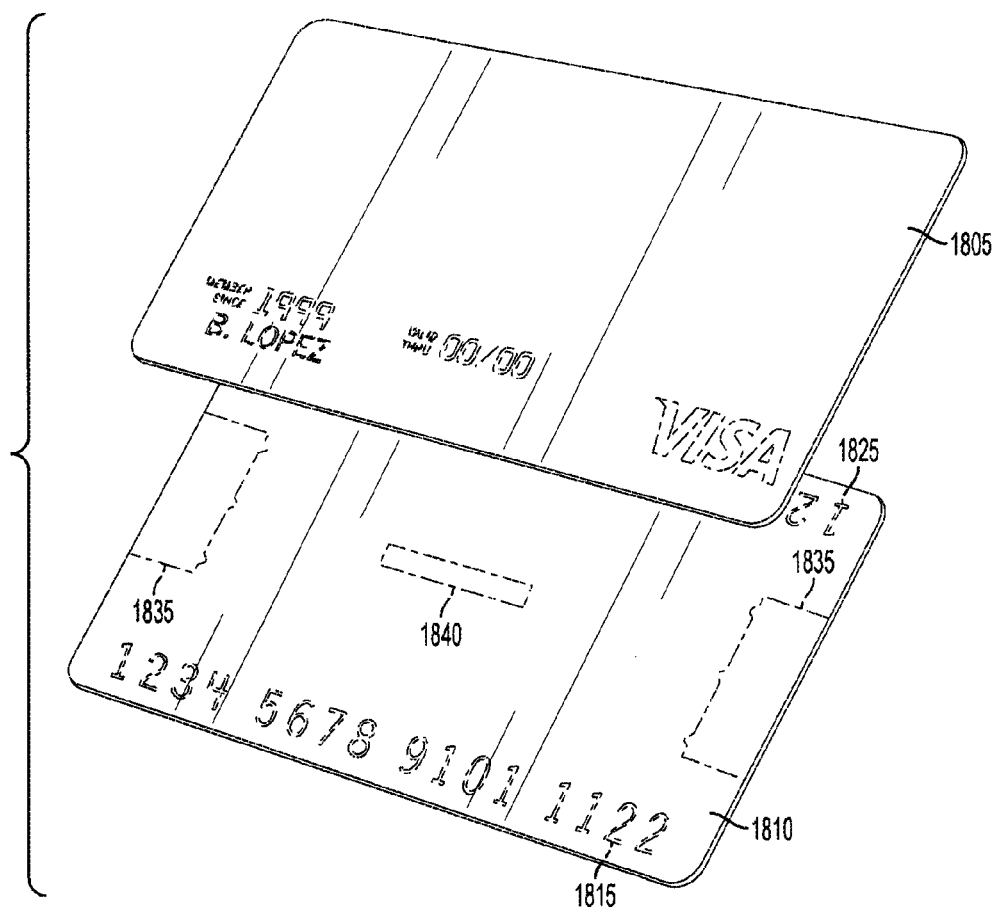
Figure 23:
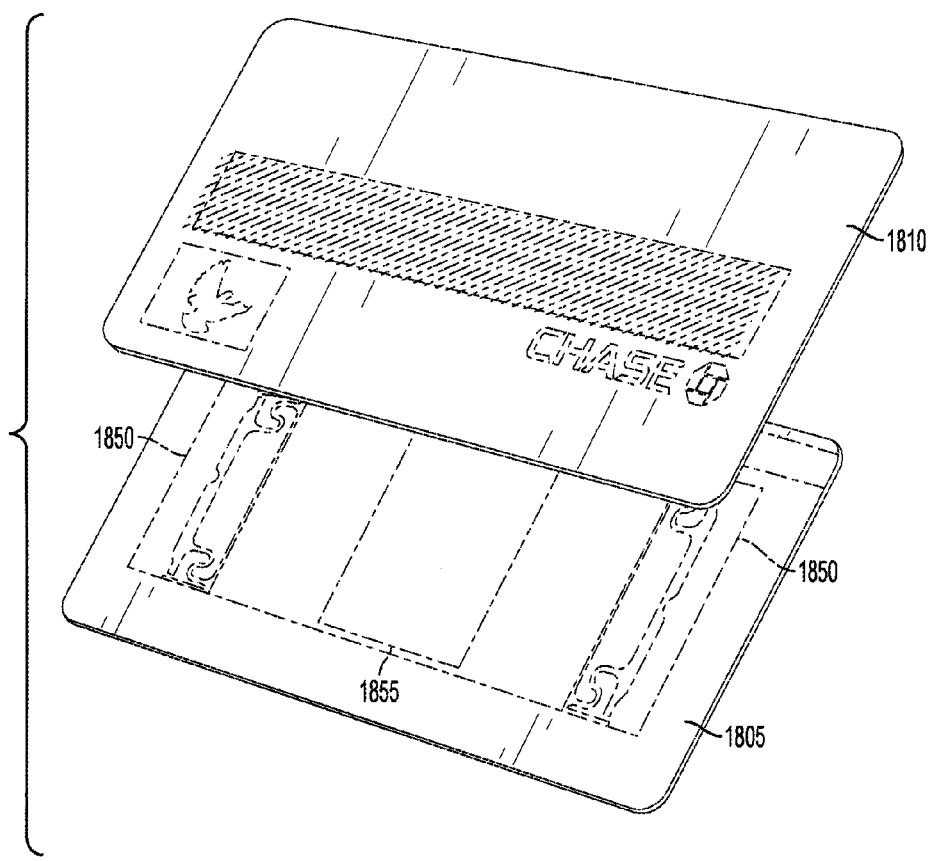

FIGS. 22 and 23 respectively depict exploded views of device 1800 such that the components which permit the relative sliding of portions 1805 and 1810. As shown notches 1835 and rails 1850 cooperate so as to permit top portion 1805 and bottom portion 1810 to slide relative to each other. In particular, rails 1850 are received by notices 1835 to retain portions 1805 and 1810 in a secure but slidable position. In some embodiments, notches 1835 and rails 1850 may be structured so that the card can snap or click into the first position or the second position, so as to ensure the position is securely maintained. In some embodiments, rail 1840 and rail 1855 may be provided to further secure the relative positioning of portions 1805 and 1810.

Figure 24:
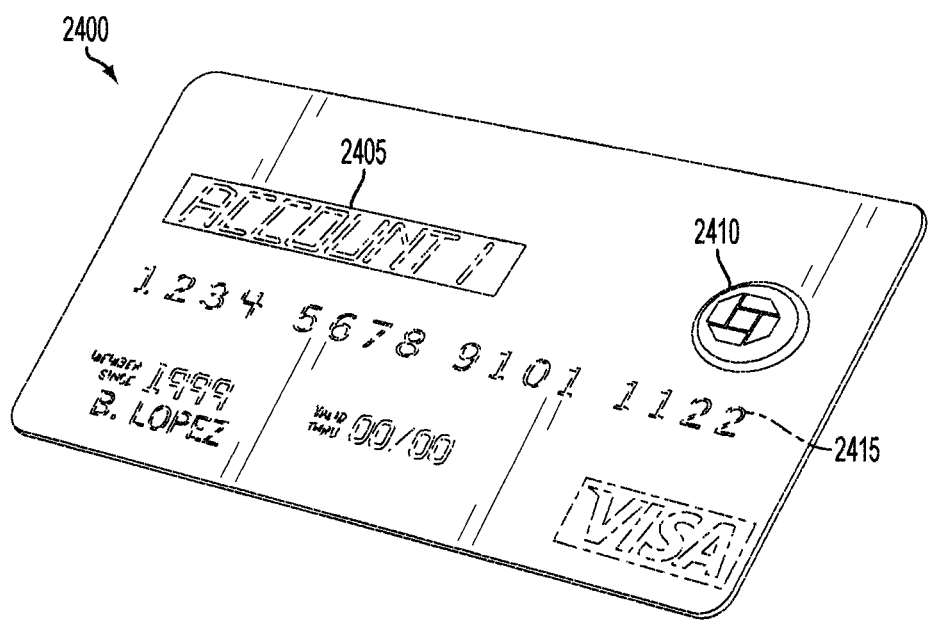

FIG. 24 illustrates one embodiment of a transaction device 2400 that includes a display screen or portion 2405, an interaction button or element 2410 and an account number or identifier 2415. In some embodiments, device 2400 may further comprise a process or storage element (neither of which is shown) which stores particulars on accounts, such as for example, available balances, associated designations or categories, or any other particular that may be associated with accounts. In some embodiments, a customer may select an account to conduct transactions by initiating interaction button or element 2410 to cycle through the various accounts that are available to the customer. Details of the various accounts may be viewed through the display screen or portion 2405. For example, as the customer cycles through the various accounts, the selected account information will appear on display screen or portion 2405. In some embodiments, the information appearing on display screen or portion 2405 may comprise an account, bucket or sub-account number, while in other embodiments, it may comprise a description of an account, bucket or sub-account's designation or category. For example, descriptions such as entertainment, household expenses, business, and other like descriptions may appear on screen 2405 as the customer cycles through the options. The account associated with the description appearing on the screen 2405 will be the one that is used to conduct a transaction. In some embodiments, the appropriate account information or details is communicated via a magnetic stripe, RFID or other component which may convey account details at the point-of-sale or during the transaction.

In some embodiments, a customer may designate the available account(s) at the time the customer applies for the transaction device, or any other time thereafter. For example, when opening an account or accounts that will be accessible with the transaction device 2400, the customer may specify how many accounts he wants access to as well as provide descriptors that may be used to readily identify the types of transactions that a particular account may be used for. A customer may designate, for example, an account for gasoline, an account for entertainment purposes, an account that accumulates rewards or other promotion credit, an account for business, etc.

In some embodiments, a customer may reset, re-designate or classify accounts after obtaining the device for use. For example, a customer may use wi-fi, RFID or other form of communication to reset account particulars. In some embodiments, the card member can go on the customer's dedicated or other appropriate web site, for example, to set up new rules, change rules, see the suggested rules based on the customer's past experience. The customer may also re-set or reallocate the accounts. For instance, the card member can reallocate a "Miscellaneous Category" in to a "Business 2 Account" to keep better track of expenses on a new initiative. In some embodiments, a sleeve associated with the device, for example, may have an RFID or other storage device that contains desired particulars on accounts. The particulars may be modified by the user by interacting the RFID or other storage device on an as-needed basis. Such interaction may occur via any terminal or device that may be used to engage and modify the data stored on the RFID or other storage device. Upon insertion of the device into the sleeve, any modified information in the RFID or other storage device on the sleeve would be transferred to the device 2405. In some embodiments, particular accounts may be accessed to process split-ticket transactions.

In some embodiments, a customer using the various devices and functionality disclosed herein may allocate portions of transactions on a per account basis. For example, a contractor making a large purchase composed of different items for different projects may allocate particular items to particular accounts. An example of such functionality is described in U.S. patent application Ser. No. 11/952,457 titled "System And Method For Associating Financial Transaction Data With A User's Project Data," which is expressly incorporated herein by reference.

Figure 25:
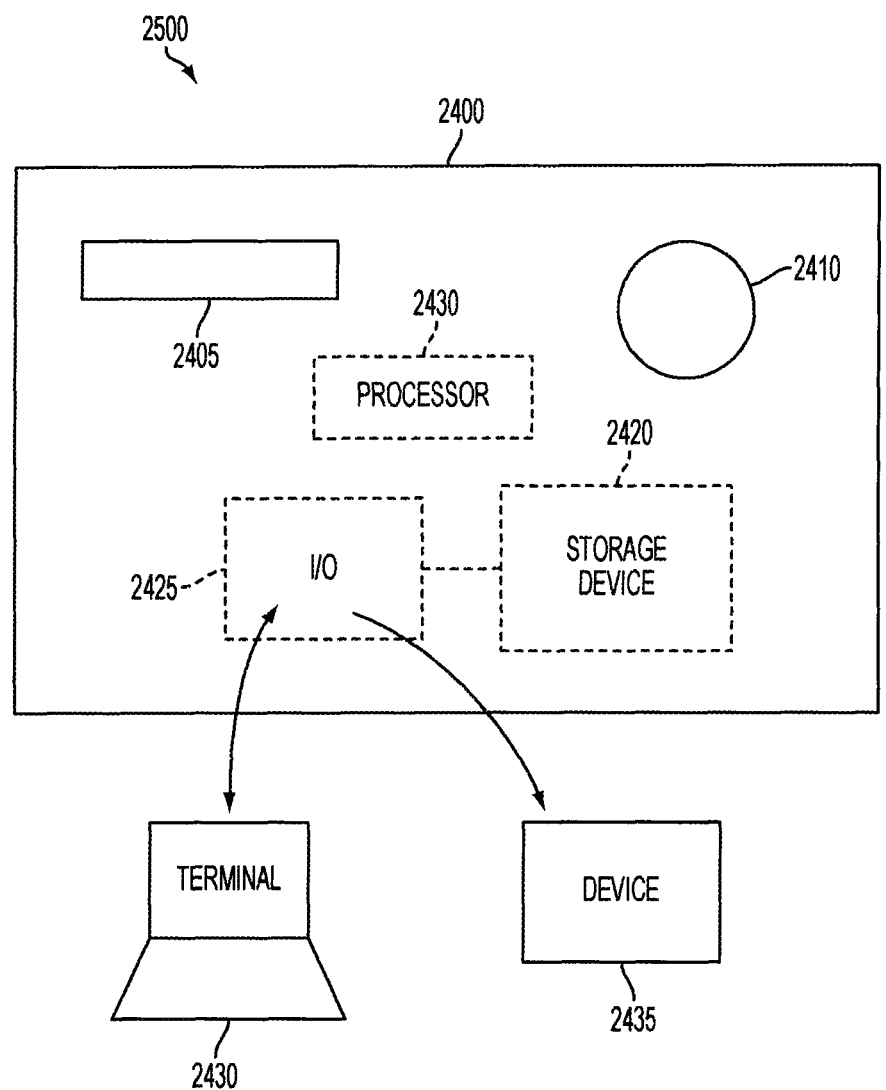

FIG. 25 depicts one embodiment of the internals, for example, of transaction device 2400 shown in FIG. 24. As shown, transaction device 2400 may include a screen 2405 an interaction button or element 2410 that allows the user, for example, to cycle through accounts, for example. In some embodiments, transaction device 2400 may be powered by a battery, cell or other power source. Transaction device 2400 may also include a processor 2430, an I/O element or interface, and a storage device 2420. In some embodiments, processor 2430 may serve to process balances and other transaction or account particulars so that a user may have access to I/O device 2425 may, in some embodiments, permit communication (e.g., wi-fi; RFID, network (e.g., Internet) or other form of communication) between transaction device 2400 and a terminal 2430, which may, in some embodiments, be merchant station or customer station of FIG. 1. In some embodiments, I/O device 2425 may permit interaction between the card and a device 2435, such as, for example, the sleeve of the card. In some embodiments, storage device 2420 may store data and information regarding transactions and accounts, for example. In some embodiments, storage device 2420 may also maintain software, programs or algorithms which may be run or executed by processor 2430 to provide functionality to the user. For example, such software may permit the user to set or define account hierarchies that determine which accounts are to be used and for which transactions. For example, a user may decide to user a particular account for certain types of transactions. Other functionality is of course possible.

Hereinafter, aspects of implementation of the invention will be described. As described above, FIG. 1 shows embodiments of a system of the invention. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example. As described herein, a module performing functionality may comprise a processor and vice-versa.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The embodiments of the present inventions are not to be limited in scope by the specific embodiments described herein. For example, although many of the embodiments disclosed herein have been described with reference to contribution of money or funds to a transactions device, the principles herein are equally applicable to the contribution of any type of benefit, reward or other value that may identified and contributed to a transactions device. In addition, although many of the embodiments disclosed herein have been described with reference to a savings and transactions processing station that is associated with an administrator of financial instrument or device programs, such as a bank, for example, it should be appreciated that various aspects of the invention may be accomplished when various system components are located elsewhere or administered by other individuals or entities. For instance, the account selection processing station 105 described herein may be maintained and administered by a third party service provider. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

What is claimed is:

1. An account transaction device, comprising:
    a top portion having a front side and a back side, wherein the front side includes a first account and the back side includes at least one identifier associated with a second account;
    a bottom portion having a front side and a back side, wherein the front side includes the second account and the back side includes at least one identifier associated with the first account; and
    a hinge connecting the top portion to the bottom portion, wherein the top and bottom portions are relatively movable between a first closed position where the top portion displays the first account and the bottom portion displays the at least one identifier associated with the first account and a second closed position where the top portion displays the at least one identifier associated with the second account and the bottom portion displays the second account;
    wherein, before or during a transaction, an initial account selection to which the transaction is to be posted is capable of being selectively determined by a customer, and
    the initial account selection is capable of being subsequently changed by the customer.

2. The account transaction device of claim 1 wherein the at least one identifier associated with the first account comprises at least one magnetic strip or a RFID chip.

3. The account transaction device of claim 1 wherein the at least one identifier associated with the second account comprises at least one magnetic strip or a RFID chip.

4. The account transaction device of claim 1 wherein the first account number is embossed or otherwise marked on the top portion and the second account number is embossed or otherwise marked on the bottom portion.

5. The account transaction device of claim 1 further comprising a securing means for securing the multi-account transaction device in the first or second closed position.

6. A account transaction device, comprising:
    a top portion having a front side and a back side, wherein the front side includes account information and the back side includes a first identifier associated with a first account number and a second identifier associated with a second account number, and wherein the top portion further comprises a window;
    a bottom portion having a front side and a back side, wherein the front side includes the first account number and the second account number and the back side includes additional account information; and
    a pivoting means connecting the top portion to the bottom portion, wherein the top and second portions are relatively movable between a first position where the first account number is displayed through the window of the top portion and the back side of the top portion displays the first identifier and a second position where the second account number is displayed through the window of the top portion and the back side of the top portion displays the second account number and the back side of the top portion displays the second identifier;
    wherein, before or during a transaction, an initial account selection to which the transaction is to be posted is capable of being selectively determined by a customer, and
    the initial account selection is capable of being subsequently changed by the customer.

7. The account transaction device of claim 6 wherein the first identifier of the first account comprises at least one magnetic strip or a RFID chip.

8. The account transaction device of claim 6 wherein the second identifier of the second account comprises at least one magnetic strip or a RFID chip.

9. The account transaction device of claim 6 wherein the first account number is embossed or otherwise marked on the top portion and the second account number is embossed or otherwise marked on the bottom portion.

10. A account transaction device, comprising:
    a top portion having a front side and a back side, wherein the front side includes account information and the back side includes a first identifier associated with a first account number and a second identifier associated with a second account number;
    a bottom portion having a front side and a back side, wherein the front side includes the first account number and the second account number and the back side includes additional account information; and
    a sliding means connecting the top portion to the bottom portion, wherein the top and second portions are relatively movable between a first position where the first account number is displayed by the front side of the bottom portion and the back side of the top portion displays the first identifier and a second position where the second account number is displayed by the front side of the back portion and the back side of the top portion displays the second account number and the back side of the top portion displays the second identifier;
    wherein, before or during a transaction, an initial account selection to which the transaction is to be posted is capable of being selectively determined by a customer, and
    the initial account selection is capable of being subsequently changed by the customer.

11. The account transaction device of claim 10 wherein the first identifier of the first account comprises at least one magnetic strip or a RFID chip.

12. The account transaction device of claim 10 wherein the second identifier of the second account comprises at least one magnetic strip or a RFID chip.

13. The account transaction device of claim 10 wherein the first account number is embossed or otherwise marked on the top portion and the second account number is embossed or otherwise marked on the bottom portion.

14. A transaction device, comprising:
- a display screen for displaying account information for each of a plurality of accounts;
- an alpha-numeric or numeric identifier located on a face of the transaction device, separate and apart from the display screen, that is associated with at least one account associated with the transaction device;
- an interaction element for enabling the user to cycle through the plurality of accounts, each of the plurality of accounts being either an account, sub-account, or bucket associated with the alpha-numeric or numeric identifier and associated with the user and each of the plurality of accounts having a description of a designation or category associated therewith on the display;
- the interaction element further enabling the user to selectively determine at least one account from the plurality of accounts to use in a transaction, wherein the selective determination occurs either before or during a transaction and the transaction is initially posted against the at least one account;
- wherein further, following the transaction, at least a portion of an amount associated with the transaction and posted to the at least one account is capable of being subsequently altered by the user to be posted to at least one other account through post-transaction decisioning;
- wherein the post-transaction decisioning is received from a single computer interface over a computer network.

15. The transaction device of claim 14 wherein the input/output device enables communication with a terminal or a device.

16. The transaction device of claim 15 wherein the terminal or device comprises a device sleeve.

17. The transaction device of claim 14 wherein the input/output device comprises a RFID device.

18. The transaction device of claim 14 wherein the storage device maintains particulars on the plurality of accounts.

19. The transaction device of claim 14 wherein particulars of the plurality of the accounts are added or deleted via the input/output element.

20. The transaction device of claim 14 wherein the account information displayed comprises a category assigned to the account by the user.

* * * * *